(12) United States Patent
Hu et al.

(10) Patent No.: US 10,977,585 B2
(45) Date of Patent: Apr. 13, 2021

(54) ORDER ALLOCATION SYSTEM AND METHOD

(71) Applicant: BEIJING DIDI INFINITY TECHNOLOGY AND DEVELOPMENT CO., LTD., Beijing (CN)

(72) Inventors: Tao Hu, Beijing (CN); Wei Cui, Beijing (CN); Jun Yin, Beijing (CN); Zhilin Hu, Beijing (CN); Yong Ye, Beijing (CN); Ping Yang, Beijing (CN); Xiaolin Deng, Beijing (CN); Yu Zhang, Beijing (CN); Yangbiao Liu, Beijing (CN); Kuan Shi, Beijing (CN); Zhongyu Cao, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 753 days.

(21) Appl. No.: 15/547,221

(22) PCT Filed: Jan. 29, 2016

(86) PCT No.: PCT/CN2016/072840
§ 371 (c)(1),
(2) Date: Jul. 28, 2017

(87) PCT Pub. No.: WO2016/119749
PCT Pub. Date: Aug. 4, 2016

(65) Prior Publication Data
US 2018/0012153 A1 Jan. 11, 2018

(30) Foreign Application Priority Data

Jan. 29, 2015 (CN) .......................... 201510046647.2
Feb. 13, 2015 (CN) .......................... 201510078862.0
(Continued)

(51) Int. Cl.
*G06Q 10/04* (2012.01)
*G06Q 50/30* (2012.01)

(52) U.S. Cl.
CPC ............. *G06Q 10/04* (2013.01); *G06Q 50/30* (2013.01)

(58) Field of Classification Search
CPC ............................... G06Q 10/04; G06Q 50/30
(Continued)

(56) References Cited

U.S. PATENT DOCUMENTS 7,739,031 B2 * 6/2010 Tengler .............. G01C 21/3667
701/465
8,775,059 B2 7/2014 Heed et al.
(Continued)

FOREIGN PATENT DOCUMENTS

CN       1741090 A      3/2006
CN     101620781 A      1/2010
(Continued)

OTHER PUBLICATIONS

Rajak, Santosh. Baruah, Ujwala. "An Ensemble Model for Predicting Passenger Demand using Taxi Data Set". (Year: 2020).*
(Continued)

*Primary Examiner* — George Chen
*Assistant Examiner* — Lisa Ma
(74) *Attorney, Agent, or Firm* — Metis IP LLC

(57) ABSTRACT

The present disclosure relates to a system and a method of allocating orders. The system may include a non-transitory
(Continued)

computer readable storage medium and a processor. The non-transitory computer may store an executable module. The processor may execute the executable module stored in the computer readable storage medium. The non-transitory computer readable storage medium may include a receiving unit (231) and an order allocation unit (361). The receiving unit (231) may receive order information and user information. The user information may include location information and/or time information. The order allocation unit (361) may allocate an order based on the location information and/or the time information. The method may include receiving order information and user information, wherein the order information and the user information may include location information and/or time information, and allocating an order based on the location information and/or the time information.

16 Claims, 29 Drawing Sheets

(30) Foreign Application Priority Data

| Apr. 8, 2015 | (CN) | 201510163336.4 |
|---|---|---|
| Apr. 13, 2015 | (CN) | 201510172959.8 |
| Jul. 28, 2015 | (CN) | 201510451956.8 |
| Jul. 29, 2015 | (CN) | 201510456730.7 |
| Aug. 20, 2015 | (CN) | 201510516040.6 |
| Aug. 20, 2015 | (CN) | 201510516346.1 |
| Aug. 27, 2015 | (CN) | 201510537192.4 |

(58) Field of Classification Search
USPC .................................................. 705/13
See application file for complete search history.

(56) References Cited

U.S. PATENT DOCUMENTS

| 2003/0187720 | A1 | 10/2003 | Takada | |
|---|---|---|---|---|
| 2009/0313077 | A1* | 12/2009 | Wheeler, IV | G01C 21/26 705/7.14 |
| 2010/0005031 | A1 | 1/2010 | Brody et al. | |
| 2011/0046988 | A1 | 2/2011 | Gosney | |
| 2013/0110393 | A1 | 5/2013 | Heed | |
| 2015/0012310 | A1 | 1/2015 | Shen | |
| 2015/0012320 | A1* | 1/2015 | Juckett | G06Q 50/30 705/7.16 |
| 2015/0161554 | A1 | 6/2015 | Sweeney et al. | |
| 2017/0046644 | A1 | 2/2017 | Zhang et al. | |
| 2017/0228683 | A1* | 8/2017 | Hu | G08G 1/00 |
| 2017/0262770 | A1* | 9/2017 | Purdy | B60W 40/09 |
| 2018/0025407 | A1 | 1/2018 | Zhang et al. | |

FOREIGN PATENT DOCUMENTS

| CN | 102833680 | | 12/2012 | |
|---|---|---|---|---|
| CN | 103218769 | A | 7/2013 | |
| CN | 203165207 | U | 8/2013 | |
| CN | 103489308 | A | 1/2014 | |
| CN | 103514738 | A | 1/2014 | |
| CN | 103680134 | A | 3/2014 | |
| CN | 103680135 | A | 3/2014 | |
| CN | 103985247 | A | 8/2014 | |
| CN | 104123836 | A | 10/2014 | |
| CN | 104157133 | A | 11/2014 | |
| CN | 104183118 | | 12/2014 | |
| CN | 104463509 | A | 3/2015 | |
| CN | 104463650 | A | 3/2015 | |
| CN | 104484787 | A | 4/2015 | |
| CN | 104574018 | A | 4/2015 | |
| CN | 104574947 | A | 4/2015 | |
| CN | 104599218 | A | 5/2015 | |
| CN | 104616086 | A | 5/2015 | |
| CN | 104715426 | A | 6/2015 | |
| CN | 104751271 | A | 7/2015 | |
| CN | 104766262 | A | 7/2015 | |
| CN | 104794553 | A | 7/2015 | |
| CN | 104915855 | A | 9/2015 | |
| CN | 105096166 | A | 11/2015 | |
| CN | 105117777 | A | 12/2015 | |
| CN | 105117842 | A | 12/2015 | |
| CN | 105118013 | A | 12/2015 | |
| CN | 105139228 | A | 12/2015 | |
| EP | 2843598 | A1 | 3/2015 | |
| JP | 1997153098 | A | 6/1997 | |
| JP | 2009294742 | A | 12/2009 | |
| WO | 2016019857 | A1 | 2/2016 | |
| WO | WO-2016119704 | A1 * | 8/2016 | G06Q 50/30 |

OTHER PUBLICATIONS

Extended Search Report in European Application No. 16742811.9 dated Jun. 1, 2018, 8 pages.
First Office Action in Chinese Application No. 201510172959.8 dated Feb. 23, 2018, 10 pages.
First Office Action in Chinese Application No. 201510451956.8 dated Feb. 11, 2018, 15 pages.
Third Office Action in Chinese Application No. 201510537192.4 dated Jun. 14, 2019, 14 pages.
Search Report in Singapore Application No. 11201706188Y dated Jun. 8, 2018, 3 pages.
Written Opinion in Singapore Application No. 11201706188Y dated Jun. 10, 2018, 6 pages.
International Search Report in PCT/CN2016/072840 dated May 6, 2016, 3 pages.
First office action for Chinese application No. 201510046647.2 dated Jun. 21, 2017, 16 pages.
First office action for Chinese application No. 201510078862.0 dated Jun. 28, 2017, 13 pages.
First office action for Chinese application No. 201510163336.4 dated Sep. 4, 2017, 13 pages.

* cited by examiner

ORDER ALLOCATION SYSTEM AND METHOD

CROSS-REFERENCE TO RELATED APPLICATIONS

This application is a U.S. national stage under 35 U.S.C. § 371 of International Application No. PCT/CN2016/072840, filed on Jan. 29, 2016, which claims priority of Chinese Application No. 201510046647.2, filed on Jan. 29, 2015, Chinese Application No. 201510078862.0, filed on Feb. 13, 2015, Chinese Application No. 201510163336.4, filed on Apr. 8, 2015, Chinese Application No. 201510172959.8, filed on Apr. 13, 2015, Chinese Application No. 201510451956.8, filed on Jul. 28, 2015, Chinese Application No. 201510456730.7 filed on Jul. 29, 2015, Chinese Application No. 201510516040.6 filed on Aug. 20, 2015, Chinese Application No. 201510516346.1, filed on Aug. 20, 2015, and Chinese Application No. 201510537192.4, filed on Aug. 27, 2015, the entire contents of each of which are incorporated herein by reference.

TECHNICAL FIELD

The present disclosure is generally related to a system and a method for allocating orders and, more specifically, to a system and a method for allocating orders relating to mobile Internet technology and data processing technology.

BACKGROUND

With the rapid development of the city, taxi-booking demand has become the general needs of all sectors of society. At the same time, with the rapid development of mobile internet, as well as the popularity of smart devices, especially intelligent navigation systems and smart phones, the use of a taxi-booking system platform has become more and more popular, which has brought great convenience to travel. For a taxi-booking system platform, it is a challenging problem to quickly and accurately allocate an order to an appropriate user.

SUMMARY

In one aspect of the present disclosure, an order allocation system is provided. The system may include a non-transitory computer readable storage medium and a processor. The non-transitory computer readable storage medium may be configured to store an executable module. The executable module may include a receiving unit and an order allocation unit. The receiving unit may be configured to receive order information and user information. The user information may include at least one of location information or time information. The order allocation unit may be configured to allocate an order based on at least one of the location information or the time information. The processor may be configured to execute an executable module stored in the computer readable storage medium.

According to some embodiments of the present disclosure, the order allocation system may further include an order receiving range determination unit, a number of orders receiving sub-unit, and an order density acquisition sub-unit. The order receiving range determination unit may be configured to obtain at least one of an order spread region or an order receiving range. The number of orders receiving sub-unit may be configured to obtain the number of orders within the order spread region. The order density acquisition sub-unit may be configured to obtain an order density based on at least one of the order spread region, the order receiving range, or the number of orders.

According to some embodiments of the present disclosure, the order allocation system may further include an order snatching prediction unit. The order snatching prediction unit may be configured to predict a user order snatching rate based on at least one of the location information or the time information.

According to some embodiments of the present disclosure, the order allocation system may further include a distance determination unit and an order snatching prediction unit. The distance determination unit may be configured to obtain a straight line distance or a route distance from a user location to a departure location of the order. The order snatching prediction unit may be configured to predict the user order snatching probability based on at least one of the straight line distance or the route distance.

According to some embodiments of the present disclosure, the order allocation system may further include an acquisition unit and a subscription probability calculation unit. The acquisition unit may be configured to obtain at least one of a historical order spread time of orders or a historical order snatching time of a user. The subscription probability calculation unit may be configured to predict the user order snatching probability based on at least one of the historical order spread time or the historical order snatching time.

According to some embodiments of the present disclosure, the order snatching prediction unit may be further configured to build a user order snatching prediction model based on at least one of the location information or the time information.

According to some embodiments of the present disclosure, the order allocation system may further include an accuracy determination unit. The accuracy determination unit may be configured to determine an accuracy of the order snatching prediction.

According to some embodiments of the present disclosure, the order allocation system may further include an actual order snatching determination unit and an accuracy determination unit. The actual order snatching determination unit may be configured to determine an actual order snatching probability of a user for the order. The accuracy determination unit may be configured to determine the accuracy of the order snatching prediction based on the predicted order snatching probability and the actual order snatching probability of the user.

In another aspect of the present disclosure, a method of allocating orders is provided. The method may include: receiving order information and user information, wherein the order information and the user information may include at least one of location information or time information of an order; and allocating the order based on at least one of the location information or the time information.

In another aspect of the present disclosure, a tangible non-transitory computer readable storage medium configured to store information is provided. When the information is read by a computer, the computer may implement the method of allocating orders. The method may include receiving order information and user information, wherein the order information and the user information may include at least one of location information or time information, and allocating an order based on at least one of the location information or the time information.

According to some embodiments of the present disclosure, the location information may include at least one of a departure location, an original location, a destination, coordinate information, or a geographical region.

According to some embodiments of the present disclosure, the time information may include at least one of an order spread time or an order snatching time of a user.

According to some embodiments of the present disclosure, allocating the order based on the location information may include: obtaining at least one of an order spread region or an order receiving range, and a number of orders; obtaining an order density based on at least one of the order spread region or the order receiving range, and the number of orders; and allocating the order based on the order density.

According to some embodiments of the present disclosure, allocating the order based on at least one of the location information or the time information may include: predicting a user order snatching probability based on at least one of the location information or the time information; and allocating the order based on the user order snatching probability.

According to some embodiments of the present disclosure, predicting the user order snatching probability based on the location information may include: obtaining at least one of a straight line distance or a route distance from a user location to a departure location of the order; and predicting the user order snatching probability based on at least one of the straight line distance or the route distance.

According to some embodiments of the present disclosure, predicting the user order snatching probability based on the time information may include: obtaining at least one of a historical order spread time of orders or a historical order snatching time of a user; predicting the user order snatching probability based on at least one of the historical order spread time or the historical order snatching time.

According to some embodiments of the present disclosure, predicting the user order snatching probability may include: obtaining at least one of the location information or time information of the order; building a user order snatching prediction model based on at least one of the location information or the time information; and predicting the user order snatching probability based on the user order snatching prediction model.

According to some embodiments of the present disclosure, predicting the user order snatching probability may include determining an accuracy of the order snatching prediction.

According to some embodiments of the present disclosure, determining the accuracy of the order snatching prediction may include: obtaining a predicted order snatching probability of a user for the order; determining an actual order snatching probability of the user for the order; and determining the accuracy of the order snatching prediction based on the predicted order snatching probability and the actual order snatching probability of the user.

BRIEF DESCRIPTION OF THE DRAWINGS

The drawings described herein are used to provide a further understanding of the present disclosure, all of which form a part of this specification. It is to be expressly understood, however, that the exemplary embodiment(s) of this disclosure are for the purpose of illustration and description only and are not intended to limit the scope of the present disclosure. The same label in each drawing represents the same parts.

DETAILED DESCRIPTION

Figure 1:
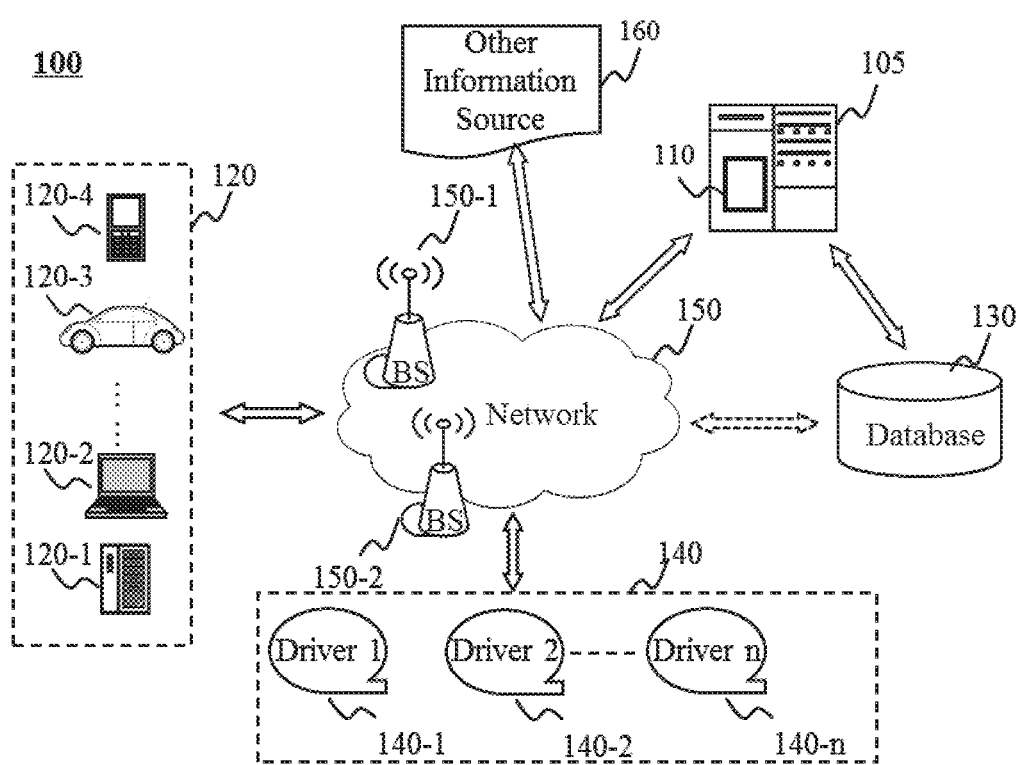
FIG. 1 is a schematic diagram of a network environment including location-based service system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

As used in this disclosure and the following claims, the terms "order snatching rate," "order snatching probability," "user order snatching rate," "user terminal order snatching probability," "order snatching rate of orders," "order snatching probability of orders," and/or "subscription rate," or the like, may all refer to the probability of order snatching operation conducted by users.

As used in this disclosure, uppercase and lowercase letters (e.g., A, D, M, N, P, R, n, t, etc.) of the embodiments and/or accompanying drawings are designations which are merely set for the convenience of description of the disclosure. For the same kind of designation in different embodiments and/or accompanying drawings, it may have the same or different meanings according to actual scenarios. As used in this disclosure, the terms "spread," "send," and/or "distribute," or the like, may all refer to information transmission from the system to a user.

Although the present disclosure makes various references to certain modules in the system according to some embodiments of the present disclosure, any number of different modules may be used and run on a client terminal and/or a server. The modules are illustrative only, and different aspects of the systems and methods may use different modules.

Flowcharts are used in the present disclosure to illustrate operations performed by the system according to some embodiments of the present disclosure. It should be understood that the preceding or following operations may not be necessarily performed exactly in order. Instead, various steps may be processed in reverse sequence and/or simultaneously. Moreover, other operations may also be added into these procedures, or one or more steps may be removed from these procedures.

Some embodiments of the present disclosure may be applied to different transportation systems which may include, but are not limited to one or more of terrestrial transportations, marine transportations, air transportations, space transportations, or the like, or any combination thereof. For example, transportation system of taxi, special car, hitchhiking, bus, train, bullet train, high-speed rail, metro, watercraft, airplane, airship, fire balloon, unpiloted vehicle, express receiving/sending, or the like, uses management and/or allocation method. Application scenarios of different embodiments of the present disclosure may include, but are not limited to, one or more of web pages, browser plug-ins, clients, custom systems, enterprise analysis systems, artificial intelligence robots, or the like, or any combination thereof. It should be understood that application scenarios of the system and method disclosed herein are only some examples or embodiments. Those having ordinary skills in the art, without further creative efforts, may apply these drawings to other application scenarios. For example, other similar order allocation systems.

The terms "passenger," "order requester (party)," "customer," "demander," "service demander," "consumer," "consumer party," "use requester," or the like, described in the present disclosure are used interchangeably to refer to a party which needs or orders services, e.g., individuals, entities, tools, or the like. Also, the terms "driver," "order recipient (party)," "provider," "supplier," "service provider," "servant," "server party," or the like, described in the present disclosure are used interchangeably to refer to a party which provides or assists in providing services, e.g., individuals, tools, other entities, or the like. In addition, the term "user," "terminal," and/or "user terminal" described in the present disclosure may be the party that needs or orders services, or provides or assists in providing services.

FIG. 1 is a schematic diagram of a network environment including a location-based service system according to some embodiments of the present disclosure. The location-based service system 100 may include one or more on-demand service systems 105, passenger terminals 120, databases 130, driver terminals 140, networks 150, and/or other information sources 160. In some embodiments, the on-demand service system 105 may include an order allocation system 110. In some embodiments, the order allocation system 110 may be used to analyze and process collected information to generate an analysis result. The order allocation system 110 may be a server, part of a server, or a server group. Herein, the server group may be centralized (e.g., a data center) or distributed (e.g., a distributed system). The order allocation system 110 may be local or remote. In some embodiments, the order allocation system 110 may, via the network 150 or other communication modes, access the information of the user 120/140, the other information source 160, and/or the database 130.

Each of the passenger terminal 120 and the driver terminal 140 may refer to a user that may be an individual, a device, or other entity relating to service orders, such as a service requester and a service provider. The passenger may be a service requester. In this disclosure, "passenger," "passenger terminal," and "passenger terminal device" may be used interchangeably. The passenger may also include the user of the passenger terminal device 120. In some embodiments, the user of the passenger terminal device may not be the actual passenger. For example, user A of the passenger terminal device 120 may use the passenger terminal device 120 for passenger B to request the on-demand service, accept the on-demand service, or receive other information or instructions sent by the on-demand service system 105. For convenience, the user of the passenger terminal device 120 may also be referred to herein as a passenger. The driver may be a service provider. In this disclosure, "driver," "driver terminal," and "driver terminal device" may be used interchangeably. The driver may also include the user of the driver terminal device 140. In some embodiments, the user of the driver terminal device may not be the actual driver. For example, user C of the driver terminal device 140 may use the driver terminal device 140 for driver D to accept the on-demand service, or receive other information or instructions sent by the on-demand service system 105. For convenience, the user of the driver terminal device 140 may also be referred to herein as a driver. In some embodiments in which a user is specified as a tool, the passenger terminal device 120 may include but is not limited to a desktop computer 120-1, a laptop 120-2, a motor vehicle built-in device 120-3, a mobile device 120-4, or the like, or any combination thereof. The motor vehicle built-in device 120-3 may further be a carputer or the like. In some embodiments, these users may also be other smart terminals, which may include but is not limited to a smart home device, a wearable device, a smart mobile device, or any other smart device. The smart home device may include but is not limited to a smart lighting device, a smart electrical appliance control device, a smart monitoring device, a smart TV, a smart camera, a smart phone, a smart interphone, or the like, or any combination thereof. The wearable device may include but is not limited to a smart bracelet, a smart watch, a smart footgear, smart glasses, a smart helmet, a smart headband, smart clothing, a smart backpack, a smart accessory, or the like, or any combination thereof. The smart mobile device may include but is not limited to a vehicle-mounted device (a carputer or a car TV, etc.), a game device, a GPS device, a POS device, or the like, or any combination thereof. The driver terminal device 140 may also include one or more similar devices.

In some embodiments, the database 130 may refer to any device with a storage function in general. The database 130 may mainly be used to store data collected from the user 120/140 and various data generated during the working of the order allocation system 110. The database 130 or other storage devices in the system may refer to any media with read/write functions in general. The database 130 or other storage devices of the system may be internal or external to the system. The database 130 may be local or remote. The database 130 may include but is not limited to a hierarchical database, a networked database, a relational database, or the like, or any combination thereof. The database 130 may digitize information, and then store the digitized information in the storage device by an electrical method, a magnetic method, an optical method, or the like. The database 130 may be used to store various types of information such as a system, software, a program, and data. The database 130 may be a device that stores information by electrical energy method, e.g., various memories, a random access memory (RAM), a read-only memory (ROM), etc. The random access memory may include but is not limited to a decade counting tube, a selectron, a delay line memory, a Williams tube, a dynamic random access memory (DRAM), a static random access memory (SRAM), a thyristor random access memory (T-RAM), a zero-capacitor random access memory (Z-RAM), or the like, or any combination thereof. The read only memory may include but is not limited to a bubble memory, a twistor memory, a film memory, a plated wire memory, a magnetic-core memory, a drum memory, a CD-ROM, a hard disk, a tape, a NVRAM, a phase-change memory, a magneto-resistive random access memory, a ferroelectric random access memory, a nonvolatile SRAM, a flash memory, an electrically erasable programmable read-only memory (EEPROM), an erasable programmable read-only memory, a mask read only memory, a floating connected gate random access memory, a nano random access memory, a racetrack memory, a resistive random access memory, a programmable metallization unit, or the like, or any combination thereof. The database 130 may be a device that stores information by magnetic energy method, e.g., a hard disk, a soft disk, a tape, a magnetic core storage, a bubble memory, a U-Disk, a flash memory, etc. The database 130 may be a device that stores information by an optical method, e.g., a CD, a DVD, etc. The database 130 may be a device that stores information by the magneto-optical method, e.g., a magneto-optical disk, etc. Access modes of the database 130 may include random access mode, serial access mode, read-only access mode, or the like, or any combination thereof. The database 130 may be a non-permanent memory or a permanent memory. The storage devices described above is only examples. The storage devices used in the system are not intended to be limiting.

The database 130 may be interconnected or communicated with the network 150, or directly connected to or communicated with the on-demand service system 105 or a part of the system 105 (e.g., the order allocation system 110), or any combination thereof. In some embodiments, the database 130 may be set up in the background of the on-demand service system 105. In some embodiments, the database 130 may be independent and directly connected to the network 150. The connection or communication between the database 130 and other modules of the system may be wired or wireless. The network 150 may provide a channel for information exchange. When the database 130 is connected to or communicated with the network 150, the user 120/140 may access information in the database 130 via the network 150. The access permission of each device to the database 130 may be limited. For example, the on-demand service system 105 or a part of the system 105 (e.g., the order processing engine 110) may have the highest access permission to the database 130, and reading/modifying public or personal information in the database 130 are allowed. When certain conditions are satisfied, the passenger terminal device 120 or the driver terminal device 140 may be allowed to read a part of the public information or personal information relating to the user. For example, the on-demand service system 105 may update/modify public or the user related personal information in the database 130 based on one or more experiences of a user (a passenger or a driver) using the on-demand service system 105. As another example, when a driver receives a service order from a passenger, the driver may view some information about the passenger in the database 130. The driver may not autonomously modify the information about the passenger in the database 130 and may only report to the on-demand service system 105 that may decide whether to modify the information about the passenger in the database 130 or not. As still another example, when a passenger receives a service providing a request from a driver, the passenger may view some information (e.g., user rating information, driving experiences, etc.) about the driver in the database 130. The passenger may not autonomously modify the information about the driver in the database 130 and may only report to the on-demand service system 105 that may decide whether to modify the information about the driver in the database 130 or not.

The network 150 may be a single network or a combination of multiple networks. The network 150 may include but is not limited to a local area network, a wide area network, a public network, a dedicated network, a wireless local area network, a virtual network, a metropolitan area network, a public switched telephone network, or the like, or any combination thereof. The network 150 may include a variety of network access points, such as wired or wireless access points, a base station, or network switching points. A data source may be connected to the network 150 through the access points. Information may be sent via the network.

The other information source 160 may be a source used to provide other information for the system 110. The other information source 160 may be used to provide the system with service-related information, such as weather conditions, traffic information, legal regulatory information, news events, life information, life guide information, etc. The other information source 160 may exist in the form of a single central server, multiple servers connected via a network, or multiple personal devices. When the information source exists in the form of multiple personal devices, by employing a user-generated contents method, such as uploading text, voice, image, or video to a cloud server, an information source may be generated by the multiple personal devices and the cloud server. The other information source 160 may be interconnected or communicated with the network 150, or directly connected to or communicated with the on-demand service system 105 or a part of the system 105 (e.g., the order allocation system 110), or any combination thereof. When the other information source 160 is connected to or communicated with the network 150, the user 120/140 may access information in the other information source 160 via the network 150. The connection or communication between the other information source 160 and other modules of the system may be wired or wireless.

Taking transportation service as an example, the other information source 160 may include a municipal services system containing geographical information and city service information, a real-time traffic broadcasting system, a weather broadcasting system, a news network, etc. The other information source 160 may be a physical information source, such as a common speedometer, a sensing device, an IOT (Internet of Things) device, a vehicle-mounted speedometer, an on-board diagnostic system, a radar speedometer, a temperature and humidity sensor, etc. The other information source 160 may also be a source used to obtain news, information, real-time road information, etc. For example, the other information source 160 may be a network information source that may include but is not limited to a Usenet-based Internet newsgroup, a server on the Internet, a weather information server, a road condition information server, etc. Specifically, for food delivery service, the other information source 160 may be a system storing multiple food service providers in a certain region, a municipal service system containing map information and city service information, a traffic road condition system, a weather broadcasting system, a news network, etc. The examples described herein are and not intended to limit the scope of the information source or type of services. Any device or network that provides information of the services may be designated as an information source in the present disclosure.

In some embodiments, according to the location-based service system 100, the information exchange between different parts of the system may be performed in an order pattern. The object of an order may be a product. In some embodiments, the product may be tangible or intangible. For the tangible product, it may be any product with any shape or size, e.g., food, medicine, daily necessities, chemical products, electrical appliances, clothing, cars, real estates, luxury goods, or the like, or any combination thereof. The intangible product may include but is not limited to service products, financial products, knowledge products, Internet products, or the like, or any combination thereof. For the Internet product, it may be any product that satisfies the user's requirements on information, entertainment, communication, or business. The Internet products may be classified using various classification methods. In some embodiments, the Internet products can be classified by bearer platform, which may include but is not limited to personal host products, Web products, mobile Internet products, commercial host platform products, built-in products, or the like, or any combination thereof. The mobile Internet product may be software, a program, or a system used in a mobile terminal. The mobile terminal may include but is not limited to a notebook, a tablet computer, a mobile phone, a personal digital assistant (PDA), an electronic watch, a POS machine, a carputer, a TV, or the like, or any combination thereof. For example, all kinds of social software used on computers or mobile phones may be shopping software, travel software, entertainment software, learning software, investment software, etc. The travel software may also be a trip software, a vehicle booking software, a map software, etc. The vehicle booking software may be used to book cars (e.g., taxis, buses, etc.), trains, subways, ships (e.g., a vessel, etc.), aerocrafts (e.g., airplanes, space shuttles, rockets, etc.), fire balloons, or the like, or any combination thereof.

It should be noted that the above description of the location-based service system 100 is merely provided for the purpose of illustration, and not intended to limit the scope of the present disclosure. For persons having ordinary skills in the art, modules may be combined in various ways, or connected with other modules as sub-systems, and various modifications and transformations in form and detail may be conducted under the teaching of the present disclosure. However, those modifications and transformations may not depart from the spirit and scope of this disclosure. For example, the database 130 may be a cloud computing platform with data storage function including but not limited to a public cloud platform, a private cloud platform, a community cloud platform, a hybrid cloud platform, etc. All such transformations are within the protection scope of the present disclosure.

Figure 2:
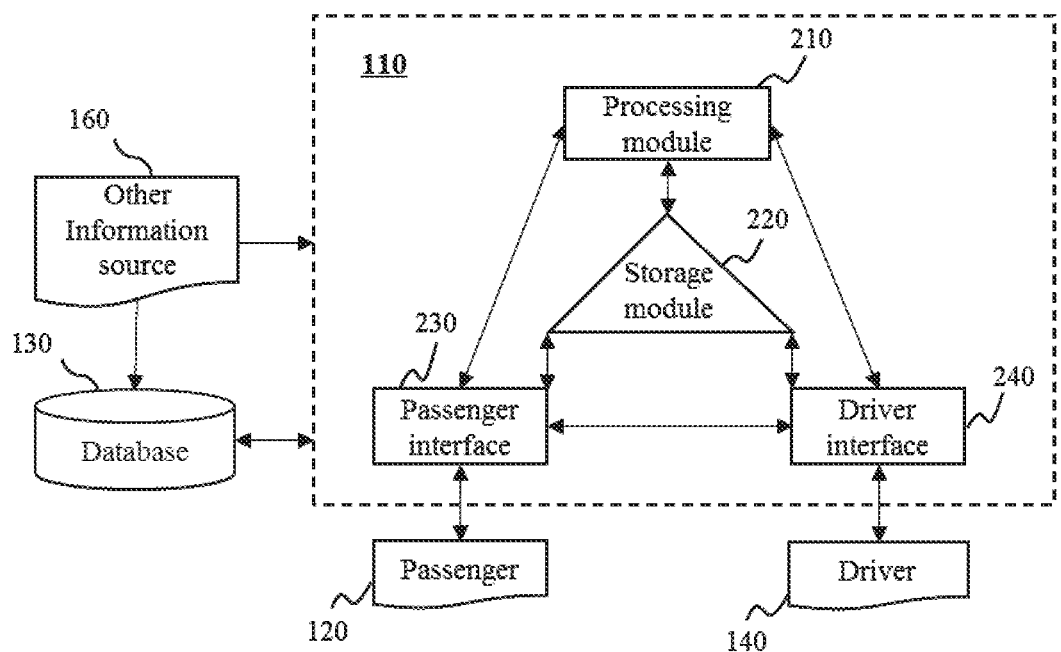
FIG. 2 is a schematic diagram of the order allocation system according to some embodiments of the present disclosure.

FIG. 2 is a schematic diagram of the order allocation system 110 according to some embodiments of the present disclosure. For convenience, the order allocation system 110 of the on-demand service system 105 is taken as an example. For convenience, the order allocation system 110 is illustrated by taking a taxi-booking service system as an example. The order allocation system 110 may include one or more processing modules 210, storage modules 220, passenger interfaces 230, and/or driver interfaces 240. The modules of the order allocation system 110 may be centralized or distributed. One or more of the modules of the order allocation system 110 may be local or remote. In some embodiments, the order allocation system 110 may be a webpage server, a file server, a database server, a FTP server, an application server, a proxy server, a mail server, or the like, or any combination thereof.

In some embodiments, the processing module 210 may be configured to process related information. The processing module 210 may acquire information from the passenger interface 230, the driver interface 240, the storage module 220, the database 130, the other information source 160, etc. The processing module 210 may send processed information to the passenger interface 230 and/or the driver interface 240, and may store the processed information in the database 130, the storage module 220, or other backed up databases or storage devices. The information processing method may include but is not limited to storing, sorting, screening, transforming, calculating, searching, predicting, training, or the like, or any combination thereof. In some embodiments, the processing module 210 may include but is not limited to a central processing unit (CPU), an application-specific integrated circuit (ASIC), an application specific instruction set processor (ASIP), a physics processing unit (PPU), a digital processing processor (DSP), a field-programmable gate array (FPGA), a programmable logic device (PLD), a processor, a microprocessor, a controller, a microcontroller, or the like, or any combination thereof.

It should be noted that the processing module 210 or the database 130 may be physically present in the system, or may perform corresponding functions via a cloud computing platform. In some embodiments, the cloud computing platform may include but is not limited to a data storing based storage cloud platform, a data processing based computing cloud platform, or an integrated cloud computing platform of data storing and processing. The cloud platform used by the system may be a public cloud platform, a private cloud platform, a community cloud platform, a hybrid cloud platform, etc. For example, according to actual needs, some of the order information and/or non-order information received by the system may be calculated and/or stored by the cloud platform. Other order information and/or non-order information may be calculated and/or stored by a local processing module and/or a system database. In some embodiments, the passenger interface 230 and the driver interface 240 may be used to respectively receive the information sent from the passenger 120 and the driver 140. The information herein may include but is not limited to service request information, service response information, habits/preferences information of a user, user location information, or the like, or any combination thereof. The service request information may be information of a request for an order by a user (e.g., a taxi-booking request of a passenger, an order accepting request of a driver, etc.), other request information of the user (e.g., a request for obtaining an order density of a certain region which is sent to the system from a driver), etc. The service response information may be information related to a user's agreement to accept an order, information related to the cancellation of an accepted order by a user, information related to successful acceptance of an order by a user, information related to a user's failure to accept an order, etc. The habits/preferences information of the user may be a preference of a passenger for drivers, an acceptable wait time of the passenger, a preference of the passenger to carpooling passengers, a preference of the passenger for vehicle types, or a preference of a driver for a departure location, a destination, a departure time, etc. The form of the information may include but is not limited to text, audio, video, pictures, or the like, or any combination thereof. The input mode of the information may include handwriting, gesture, image, speech, video, electromagnetic wave, or other data input mode, or any combination thereof. The received information may be stored in the database 130 or the storage module 220, calculated and processed by the processing module 210, or any combination thereof.

In some embodiments, location information related to a user may be acquired by a positioning system. For example, using one or more positioning technologies, information of the user including a current location, a starting point, a motion status, speed, etc. may be obtained. The positioning technology may include but is not limited to global positioning system (GPS) technologies, global navigation satellite system (GLONASS) technologies, Beidou navigation system technologies, Galileo positioning system technologies, Quasi-Zenith satellite systems (QAZZ), base-station positioning technologies, Wi-Fi positioning technologies, various location and speed detection systems of vehicles, etc.

In some embodiments, the passenger interface 230 and the driver interface 240 may be configured to output information processed by the processing module 210. The information herein may be optimized location information, direct information of an order, processing information of an order, direct information of a user, processing information of a user, etc. The form of the information may include but is not limited to text, audio, video, picture, or the like, or any combination thereof. The output information may be sent to the passenger 120 and/or the driver 140. Alternatively, if the output information is not sent to the passenger 120 and/or the driver 140, it may be stored in the database 130 or the storage module 220.

It should be understood that the system shown in FIG. 2 may be implemented in a variety of ways. In some embodiments, the system may be implemented by hardware, software, or a combination of them. The hardware part may be implemented using specific logic circuits. The software part may be stored in memory and executed by an appropriate instruction execution system, such as a microprocessor or a specifically designed hardware. It will be understood for those skilled in the art that the methods and systems described above may be implemented by computer-executable instructions and/or control codes in a processor. For example, the codes may be provided on a carrier medium (e.g., a disk, a CD, a DVD-ROM, etc.), a programmable memory such as a read-only memory (e.g., firmware), or a data carrier such as an optical signal carrier or an electronic signal carrier. The system and its modules of the present disclosure may be implemented by hardware circuits, e.g., very large scale integrated circuits or gate arrays, semiconductors such as logic chips or transistors, programmable hardware devices such as field-programmable gate arrays or programmable logic devices, etc. The system and its modules may be implemented by software executed by various processors. The system and its modules may also be implemented by a combination (e.g., firmware) of the hardware circuits and the software.

It should be understood that the system shown in FIG. 2 is not limited to the taxi-booking service system. Rather, the system may also be applied to other traffic service systems or other service systems, such as a food ordering service system, a door-to-door service system, a reservation service system, etc. The present disclosure is not intended to be limiting.

It should be noted that the above description of the order allocation system 110 is merely provided for the purpose of illustration, and not intended to limit the scope of the present disclosure. For persons having ordinary skills in the art, modules may be combined in various ways or connected with other modules as sub-systems, and various modifications and transformations in form and detail may be conducted under the teaching of the present disclosure. However, those modifications and transformations may not depart from the spirit and scope of this disclosure. In some embodiments, the processing module 210, the storage module 220, the passenger interface 230, and the driver interface 240 may be different modules embodied in one system or one module which may implement two or more functions of the modules. For example, the passenger interface 230 and/or the driver interface 240 may be a module with input and output functions. The passenger interface 230 and/or the driver interface 240 may also be an input module and an output module regarding the passenger/driver. As another example, the processing module 210 and the storage module 220 may be two modules or a module with processing and storage functions. As still another example, each module may share a single storage module. Each module may also have its storage module. All such transformations are within the protection scope of the present disclosure.

Figure 3:
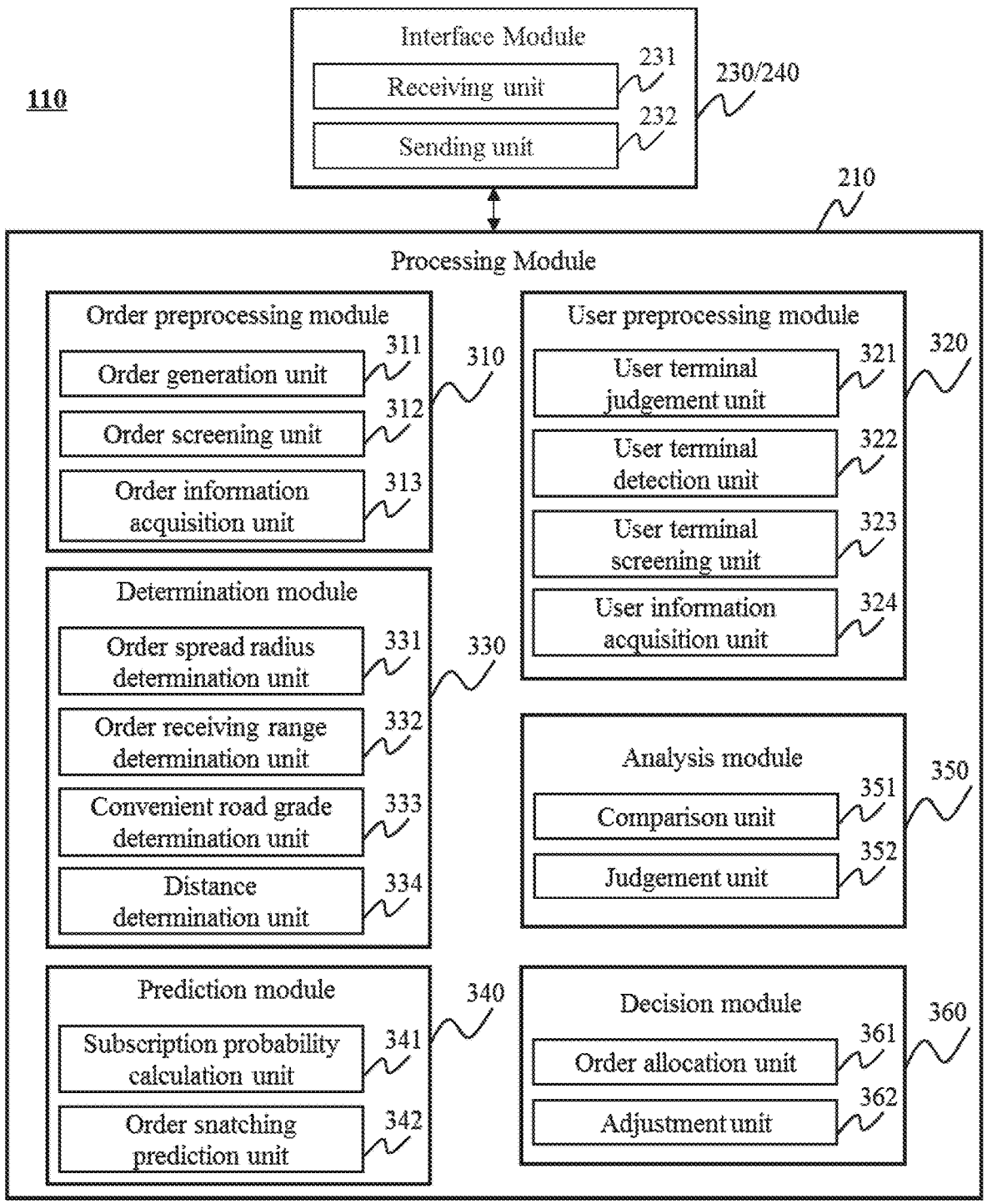
FIG. 3 is a schematic diagram of the order allocation system according to some embodiments of the present disclosure.

FIG. 3 is a schematic diagram of the order allocation system 110 according to some embodiments of the present disclosure. As shown in the figure, the order allocation system 110 may include one or more interface modules 230/240 and processing modules 210. Refer to FIG. 2, the interface module 230/240 may be used for information interaction and may include one or more passenger interfaces 230 and/or driver interfaces 240. In some embodiments, the interface module 230/240 may further include one or more receiving units 231 and sending units 232. The receiving unit 231 may be configured to receive information from the passenger 120 and the driver 140. The sending unit 232 may be configured to output the information that is analyzed and processed by the processing module 210. Detailed descriptions may be found in corresponding figures.

In some embodiments, the processing module 210 may further include one or more order preprocessing modules 310, user preprocessing modules 320, determination modules 330, prediction modules 340, analysis modules 350, and decision modules 360. The order preprocessing module 310 may be configured to preprocess order information. The order preprocessing module 310 may further include one or more order generation units 311, order screening units 312, and/or order information acquisition units 313. The user preprocessing module 320 may be configured to preprocess the user information. The user preprocessing module 320 may further include one or more user terminal judgment units 321, user terminal detection units 322, user terminal screening units 323, and/or user information acquisition units 324. The order information acquisition unit 313 and the user information acquisition unit 324 may be collectively referred to as acquisition units (not shown in the figure). The determination module 330 may be configured to determine some location-related information. The determination module 330 may further include one or more order spread radius determination units 331, order receiving range determination units 332, convenient road grade determination units 333, and/or distance determination units 334. The prediction module 340 may be configured to predict a user intention to snatch an order. The prediction module 340 may further include one or more subscription probability calculation units 341 and order snatching prediction units 342. The analysis module 350 may be configured to perform analytical judgment based on order features determined by the determination module 330 and/or the prediction module 340. The analysis module 350 may further include one or more comparison units 351 and judgment units 352. The decision module 360 may be configured to perform order allocation and/or other processes based on the output of the analysis module 350. The decision module 360 may further include one or more order allocation units 361 and adjustment units 362.

Regarding the embodiments of the order allocation system 110 in FIG. 3, since it is substantially similar to the embodiments of the order allocation process, relevant descriptions of the system 110 may be found in the embodiments of the order allocation process.

Figure 4:
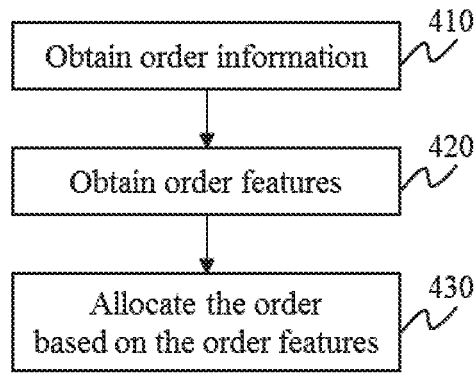
FIG. 4 is a flowchart of an exemplary process for allocating orders according to some embodiments of the present disclosure.

FIG. 4 is a flowchart of an exemplary process for allocating orders according to some embodiments of the present disclosure. For the convenience of understanding, the order allocation system 110 may be illustrated according to the description of, for example, taxi-booking service system. In some embodiments, the order allocation process may be executed by the on-demand service system 105 or a part of the system (e.g. the order allocation system 110). As show in FIG. 4, order information may be obtained from the user 120/140 (as shown in FIG. 1) through the interface module 230/240 in step 410. In some embodiments, in step 410, information in the database 130 and/or other information sources 160 (as shown in FIG. 1) may also be obtained. Taking taxi service order as an example, the order information may include but is not limited to the information of the order itself, the user information, other information, etc. The information of the order itself may include but is not limited to an order number, a departure location (or an original location), a destination, a departure time, an arrival time, an acceptable wait time, a number of passengers, a determination as to whether the passenger has luggage or not, mileage, a price, a price raised by a consumer, a price adjusted by a service provider, a price adjusted by a system, a reward usage condition, a term of payment (e.g., cash payment, debit card payment, online payment, remittance payment, etc.), an order completion status, an order selection of a service provider, an order transmitting status of a consumer, or the like, or any combination thereof. The user information may refer to information related to the user 120/140. The user information may include but is not limited to a name, a nickname, gender, a nationality, age, contact information (a telephone number, a mobile phone number, social media account information (e.g., Wechat account, QQ™ account, Linkedin, etc.), other ways through which the user may be contacted, etc.), an occupation, a rating, a usage time, driving experience, a vehicle age, a vehicle type, a vehicle condition, a license plate number, a driving license number, a certification status, user habit/preference, a feature for extra services (e.g., trunk size, panoramic sunroof, other extra features, etc.), or the like, or any combination thereof. The other information may include information that is not controlled by the consumer or the service provider or temporal/emergent information. For example, the other information may include but is not limited to a weather condition, an environment condition, a road condition (e.g., road closure due to security, road construction, or other reasons), a traffic condition, or the like, or any combination thereof.

In some embodiments, a part of the order information may be real-time order information or historical order information. In some embodiments, the real-time order information may be order information at a certain time or in a certain time period. The time period may be several seconds, several minutes, several hours, or a user-defined time period based on preference. The time period may be a specified time period, such as a workday, a day off, a holiday or festival, a peak hour, an off-peak hour, etc. The historical order information may include previous information related to an order, such as the number of order requests, the number of order acceptances, a transaction volume, an order snatching rate, a successful order snatching rate, a contract breaking rate, an appointment breaking rate, a deal rate, user habit/preference, or the like, or any combination thereof.

In step 420, one or more order features may be processed by the processing module 210 based on the received order information. The order features may include direct information and processed information of the order, or the like. The direct information of the order may be the order information itself, the user information, other information, or the like, or any combination thereof. Specifically, the related description may be found in the present disclosure. The processed information of the order may be obtained using one or more data processing methods. The processed information of the order may include but is not limited to a user's order snatching time, an order snatching rate, a successful order snatching rate, a contract breaking rate, an appointment breaking rate, a deal rate, an order density, an order competition rate, an order buffer time, an order broadcasting time, an acceptable order spread range of the user, a convenient road grade, a road distance, a distance between the user's current location and a departure location, accuracy of predicting order snatching rate, or the like, or any combination thereof. The information processing methods may include but are not limited to storing, classifying, screening, transforming, calculating, searching, predicting, training, or the like, or any combination thereof.

For convenience, prediction models and machine learning used in some embodiments of order information processing may be illustrated below. In some embodiments, the prediction model may be qualitative or quantitative. A quantitative prediction model may be based on a time series forecasting method or a causal method. The time series forecasting method may further include an average smoothing method, a trend extrapolation method, a seasonal variation prediction method, a Markov time series forecasting method, or the like, or any combination thereof. The causal method may further include a unitary regression method, a multiple regression method, an input-output method, etc. In some embodiments, the prediction model may include but is not limited to a weighted arithmetic average model, a trend average prediction model, an exponential smoothing model, an average development speed model, a unitary linear regression model, a high-low point model, or the like, or any combination thereof. In some embodiments, equations, algorithms and/or models used for processing information may be continuously optimized using machine learning algorithms. According to different learning modes, the machine learning algorithms may be supervised learning, unsupervised learning, semi-supervised learning, or reinforced learning. According to various algorithms, the machine learning algorithms may be regression algorithm-based learning, instance-based learning, formalized learning, decision tree learning, Bayesian learning, clustering algorithm-based learning, associated rule learning, neural network learning, deep learning, dimension reduction algorithm-based learning, etc. Specifically, the regression algorithm model may be ordinary least square, logistic regression, stepwise regression, multivariate adaptive regression splines, or locally estimated scatterplot smoothing. The instance-based model may be a k-nearest neighbor, learning vector quantization, self-organizing map, etc. The formalized model may be a RIDge regression, least absolute shrinkage and selection operator (LASSO), or elastic net. The decision tree model may be classification and regression tree, ID3 (iterative dichotomiser 3), C4.5, Chi-squared automatic interaction detection (CHAID), decision stump, random forest, MARS, gradient boosting machine (GBM), etc. The Bayesian model may be a naive Bayesian algorithm, averaged one-dependence estimators, a Bayesian belief network (BBN), etc. A kernel-based algorithm model may be a support vector machine, radial basis function, linear discriminate analysis, etc. The clustering algorithm model may be a k-Means algorithm, an expectation maximization algorithm, etc. The associated rule model may be an Apriori algorithm, an Eclat algorithm, etc. The neural network model may be perceptron neural network, back propagation, Hopfield network, self-organizing map, learning vector quantization, etc. The deep learning model may be a restricted Boltzmann machine, deep belief networks (DBN), convolutional networks, stacked autoencoders, etc. The dimension reduction algorithm model may be principle component analysis, partial least square regression, Sammon map, multi-dimensional scaling, projection pursuit, etc.

In step 430, the order may be allocated based on the order features. In some embodiments, the order allocation system 110 may send information, through the interface module 230/240, to one or more driver terminals 140, passenger terminals 120, third party platforms, etc. The sent information may include but is not limited to the direct information and/or the processed information of the order. The direct information of the order may include but is not limited to the information of the order itself, the user information, and/or other information. The processed information of the order may include but is not limited to a user's order snatching time, an order snatching rate, a successful order snatching rate, a contract breaking rate, an appointment breaking rate, a deal rate, an order density, an order competition rate, an order buffer time, an order broadcasting time, an acceptable order spread range of the user, a convenient road grade, a road distance, a distance between the user's current location and a departure location, accuracy of predicting order snatching rate, or the like, or any combination thereof. The form of the sent order information may include but is not limited to text, pictures, audio, video, or the like, or any combination thereof.

It should be understood that the order allocation process may not be limited to the taxi-booking service system. The order allocation process may also be applied in other traffic service system or other service systems, such as a food ordering service system, a door-to-door service system, a reservation service system, etc. It is not intended to limit the scope of the present disclosure.

It should be noted that the above description about the order allocation process is merely provided for the purpose of illustration, and not intended to limit the scope of the present disclosure. For persons having ordinary skills in the art, various modifications may be conducted to the order allocation process under the teaching of the present disclosure. However, those modifications may not depart from the spirit and scope of this disclosure. For example, some steps may be added or removed. As another example, the order information may be preprocessed after step 410. Some fuzzy data may be removed in preprocessing procedure using methods such as data cleaning, data integration, data transformation, and/or data reduction. In some embodiments, the methods of removing fuzzy data may include but are not limited to discriminant methods, eliminating methods, averaging methods, leveling methods, ratio methods, moving average methods, exponential smoothing methods, differential methods, or the like, or any combination thereof. For example, in some embodiments, a certain feature may be continuously adjusted and/or optimized. As another example, a step of storing data may be added in the process of order allocation. All such modifications are within the protection scope of the present disclosure.

Figure 5:
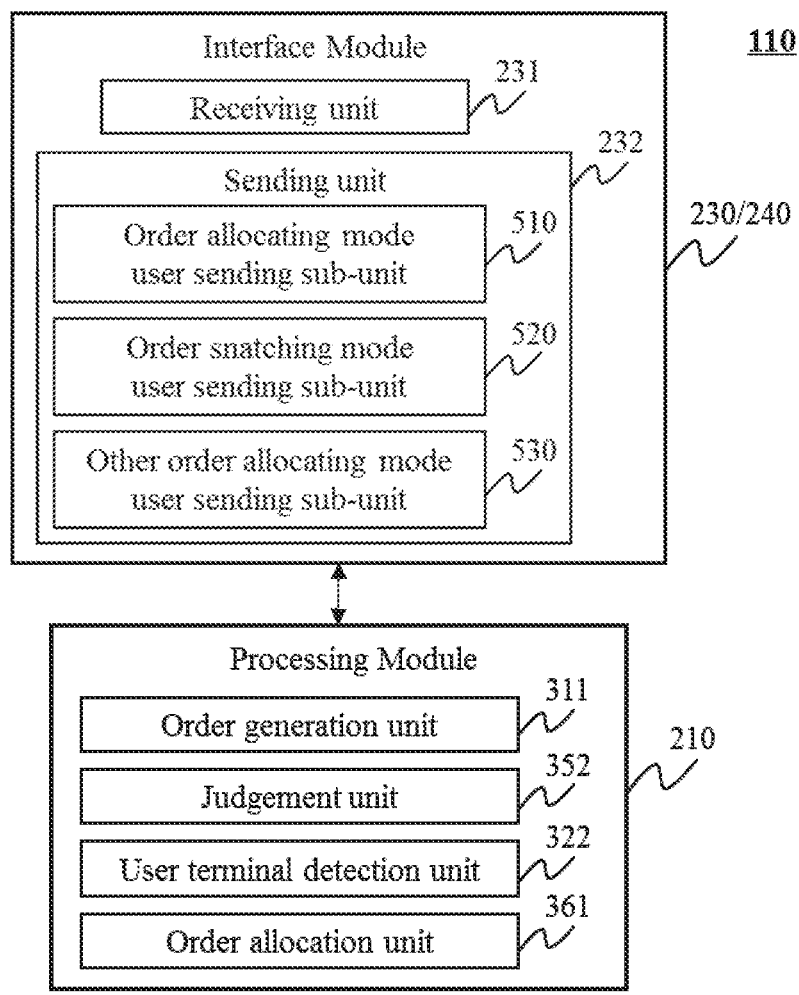
FIG. 5 is a schematic diagram of the order allocation system according to some embodiments of the present disclosure.

FIG. 5 is a schematic diagram of the order allocation system 110 according to some embodiments of the present disclosure. As shown in the figure, the order allocation system 110 may include one or more order generation units 311, judgment units 352, and/or sending units 232. In some embodiments, the sending unit 232 may further include one or more order allocating mode user sending sub-units 510, order snatching mode user sending sub-units 520, and/or other order allocating mode user sending sub-units 530.

In some embodiments, the order generation unit 311 may be configured to generate an order based on a taxi-booking request of an order requester.

In some embodiments, the judgment unit 352 may be configured to determine whether or not a user in the order allocating mode exists within a range in which the distance to the departure location of the order is less than a first preset threshold.

In some embodiments, the order allocating mode user sending sub-unit 510 may be configured to send the order to a user that satisfies a condition in the order allocating mode when a terminal in the order allocating mode exists within the range of the first preset threshold.

In some embodiments, the order snatching mode user sending sub-unit 520 may be configured to, when there is no user in the order allocating mode within the range of the first preset threshold, obtain a user in the order snatching mode within a range in which the distance to the departure location of the order is less than a second preset threshold, and send the order to the user that satisfies the condition in the order snatching mode. In some embodiments, the first preset threshold may be less than the second preset threshold.

In some embodiments, the order allocating mode user sending sub-unit 510 may be further configured to screen out a user who satisfies a preset matching condition among the multiple users in the order allocating mode, and send the order to the user when there are multiple users in the order allocating mode within the range of the first preset threshold. In some embodiments, the preset matching condition may include the shortest distance to the departure location of the order, the shortest time of arriving at the departure location of the order, the shortest road congestion time, the best user credit/rating, the maximum number of user order snatching times, the highest user loyalty, or the like, or any combination thereof.

In some embodiments, the order allocation system 110 may further include the other order allocating mode user sending sub-unit 530 which may be configured to, after a first preset time period, successively send the order to other users in the order allocating mode based on the preset matching condition described above. The other users in the order allocating mode may be multiple users in the order allocating mode illustrated above excluding those screened out among the users.

In some embodiments, the order allocation system 110 may further include one or more user terminal detection units 322 which may be configured to, before any user accepting the order, detect whether or not a user in the order allocating mode exists within a range in which the distance to the departure location of the order is less than the first preset threshold at second preset time interval.

In some embodiments, the order allocation system 110 may further include one or more order allocation units 361 which may be configured to, when a user in the order allocating mode accepts the order, allocate the order to the user in the allocating mode and stop sending the order. When a user in the order snatching mode snatches the order, the order allocation unit 361 may wait for a third preset time period and may determine whether or not there is a user in the order allocating mode accepting the order in the third preset time period. If there is a user in the order allocating mode accepting the order in the third preset time period, the order may be allocated to the user in the order allocating mode. If there is no user in the order allocating mode accepting the order in the third preset time period, the order may be allocated to the user in the order snatching mode.

In some embodiments, the order allocation unit 361 may be further configured to, when there are multiple users in the order snatching mode snatching the order, screen out a user who satisfies the preset matching condition among the multiple users in the order snatching mode and allocate the order to the user.

Figure 6:
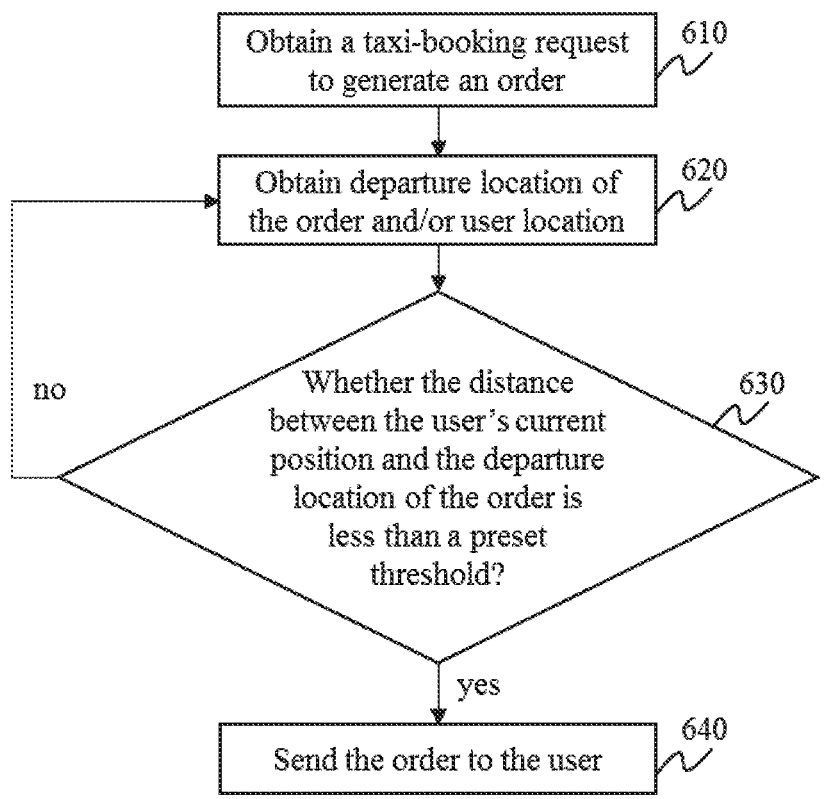
FIG. 6 is a flowchart of an exemplary process for allocating orders according to some embodiments of the present disclosure.

For the embodiments of the order allocation system 110, since it is substantially similar to the embodiments of the order allocation process, the description may be simplified. Descriptions of the order allocation system 110 may be found in the embodiments of the order allocation process (as shown in FIG. 6). It should be noted that the above description of the order allocation system 110 is merely provided for the purpose of illustration, and not intended to limit the scope of the present disclosure. For persons having ordinary skills in the art, various modifications and variations in form and detail may be conducted to the order allocation system 110 under the teaching of the present disclosure. However, those modifications and variations may not depart from the spirit and scope of this disclosure. For example, in some embodiments, the order allocation system 110 may also include a storage module. The storage module may be internal or an external device of the system. The storage module may exist in the system or complete the corresponding functions using a cloud computing platform. In some embodiments, each module or unit may be combined in various ways or connected with other modules as subsystems. For example, the sending sub-units 510-530 may be integrated together as the sending unit 232. As another example, in the processing module, the order generation unit 311, the judgment unit 352, the user terminal detection unit 322, and the order allocation unit 361 may be used individually, arbitrarily combined into a new unit, integrated into one processing module 210, or the like. All such modifications are within the protection scope of the present disclosure.

FIG. 6 is a flowchart of an exemplary process for allocating orders according to some embodiments of the present disclosure. As shown in FIG. 6, in step 610, the taxi-booking request of the order requester may be obtained. For example, the taxi-booking request of the requester may be obtained by the order receiving unit 231. According to the taxi-booking request, an order may be generated by the order generation unit 311. It should be noted that in some embodiments, the order allocation system 110 may directly process existing orders stored in the system itself or transmitted from other sources, i.e., step 610 may be omitted.

In step 620, departure information of the order and/or location information of a user may be obtained. For example, in some embodiments, the departure information of the order and the location information of the user may be obtained by the receiving unit 231. In some embodiments, the departure information of the order may be extracted by the order information acquisition unit 313 in FIG. 3. The location of the user may be extracted by the user information acquisition unit 324 in FIG. 3. The user described herein may be a passenger or a driver. To facilitate understanding of this disclosure, the driver is taken as an example in the following description. In some embodiments, the driver may choose one or both of two order-waiting modes including the order allocating mode and the order snatching mode. In an embodiment of the order allocating mode, an order may be only sent to a most suitable terminal (e.g., the terminal which has the shortest distance to the departure location of the order). If the terminal has no response or order acceptance, the order may be sent to another terminal. In an embodiment of the order snatching mode, an order may be sent to multiple terminals simultaneously, so that the order may be snatched by the multiple terminals.

In step 630, whether there is a user whose distance to the departure location of the order is less than a preset threshold may be determined. For example, whether there is a user whose distance to the departure location of the order is less than the preset threshold may be determined by the judgment unit 352. In some embodiments, the preset threshold may be a value or a value range. There may be one or more preset thresholds. The preset threshold may be set artificially or obtained using machine learning by the order allocation system 110. The preset threshold may remain unchanged or dynamically updated according to actual situations. In some embodiments, the user may be a driver in the order allocating mode, or a driver in the order snatching mode. To facilitate understanding of this disclosure, the driver in the order allocating mode is taken as an example in the following description. In these embodiments, in step 630, whether there is a user in the order allocating mode whose distance to the departure location of the order is less than the preset threshold may be determined by the judgment unit 352. If there is a user that satisfies the condition in the order allocating mode, the process may proceed to step 640. If not, the process may return to step 620.

In step 640, the order may be sent to users that satisfy the condition in the order allocating mode. For example, the order may be sent to users that satisfy the condition in the order allocating mode by the sending unit 232. In some embodiments, the order may be sent to the user in the order allocating mode by the order allocating mode user sending sub-unit 510. In some embodiments, there may be only one user in the order allocating mode. The order may then be directly sent to the user by the order allocation system 110. In some other embodiments, there may be multiple users in the order allocating mode. One or more matching conditions may then be used for screening out a most suitable user. The order may be sent to the most suitable user. In some embodiments, the matching condition(s) may include the shortest distance to the departure location of the order, the shortest time arriving at the departure location of the order, the shortest road congestion time, the best user credit/rating, the maximum number of user order snatching times, the highest customer loyalty, or the like, or any combination thereof.

In some embodiments, after the order being sent to a user that satisfies the condition in the order allocating mode in step 640, the order may be successively sent to other users in the order allocating mode at the first preset time interval based on the matching condition(s) in an ascending order by the users' distance to the departure location of the order. The other users in the order allocating mode may be multiple users in the order allocating mode excluding user(s) screened out from the multiple users. For example, if there are multiple users in the order allocating mode within a range of the preset threshold, firstly the order may be sent to a user whose distance to the departure location of the order is the shortest. The system may then wait for the first preset time period (e.g., N seconds, N may be any number greater than 0). Within the N seconds, the order may not be spread to new terminals but be continually spread to the users to whom the order have already been spread. After the first preset time period, the order may be successively sent to other users in the order allocating mode in ascending order of the users' distance to the departure location of the order.

If there is no user satisfying the condition in the order allocating mode, the process may return to step 620, the location information of the users in the order snatching mode may be obtained. Then in step 630, whether there is a user in the order snatching mode whose distance to the departure location of the order is less than a preset threshold may be determined by the judgment unit 352. The preset threshold herein (the second preset threshold) may be the same as or different from the preset threshold (the first preset threshold) of the users in the order allocating mode. For example, the first preset threshold may be less than the second preset threshold. Merely by way of example, the first preset threshold may be set as n kilometers, and the second preset threshold may be set as n+m kilometers, wherein n and m may be both greater than 0.

In step 640, the order may be sent to user(s) that satisfy the condition in the order snatching mode. For example, the order may be sent to the user(s) that satisfy the condition in the order snatching mode by the order snatching mode user sending sub-unit 520. In some embodiments, there may be only one user in the order snatching mode. The order may then be allocated to the user. In some embodiments, multiple users in the order snatching mode may snatch the order simultaneously. Then a most suitable user satisfying the preset matching condition may be screened out among the multiple users in the order snatching mode. The order may be sent to the most suitable user. The preset matching condition may include the shortest distance to the departure location of the order, the shortest time arriving at the departure location of the order, the shortest road congestion time, the best user credit/rating, the maximum number of user order snatching times, the highest customer loyalty, or the like, or any combination thereof.

In some embodiments, after the order being sent to the user in the order snatching mode, a step of determining whether there is a user satisfying the condition in the order allocating mode may be added. For example, before the order being accepted by any user in the order snatching mode, at every second preset time interval, whether there is a user in the order allocating mode whose distance to the departure location of the order is less than the first preset threshold may be detected by the user terminal detection unit 322. Specifically, in some embodiments, if there is no user in the order allocating mode within a range of the first preset threshold, the order may be sent to the user(s) that satisfy the condition in the order snatching mode. When the order is sent to the user(s) in the order snatching mode, at every second preset time interval, whether there is a user in the order allocating mode whose distance to the departure location of the order is less than the first preset threshold may be detected. If a user in the order allocating mode is detected, the order may be sent to the user in the order allocating mode simultaneously.

In some embodiments, the order allocation process shown in FIG. 6 may further include a step of distributing the order. For example, if the order is accepted by a user in the order allocating mode, the order distributing step may include:

A01, when the order is accepted by a user in the order allocating mode, the order may be allocated to the user in the order allocating mode. The order sending may be stopped. Specifically, when the order is accepted by a user in the order allocating mode, the order may be allocated to the user in the order allocating mode immediately. Then the order sending may be stopped simultaneously.

When the order is accepted by a user in the order snatching mode, the order distributing step may further include:

B01, when the order is snatched by a user in the order snatching mode, the system may wait for the third preset time period. Specifically, when there is a user in the order snatching mode snatching the order, the order may not be allocated to the user immediately. Instead, the system may wait for a third preset time period (e.g., 7 seconds). In the third preset time period, the order may not be spread to a new user. The order may be continually spread to the users to whom the order have already been spread.

B02, whether there is a user in the order allocating mode accepting the order in the third preset time period may be determined.

B03, if there is a user in the order allocating mode accepting the order in the third preset time, the order may be allocated to the user in the order allocating mode.

B04, if there is no user in the order allocating mode accepting the order in the third preset time, the order may be allocated to the user in the order snatching mode.

It should be noted that the above description of the order allocation process is merely provided for illustration, and not intended to limit the scope of the present disclosure. For persons having ordinary skills in the art, various modifications may be conducted to the order allocation procedure under the teaching of the present disclosure. However, those modifications may not depart from the spirit and scope of this disclosure. The steps in FIG. 6 may be executed in a changed sequence. For example, some steps may be omitted or added. Multiple steps may be integrated into one step. A step may be divided into multiple steps. For example, steps 610 and 620 may not be differentiated strictly, i.e., the step of generating orders or obtaining the departure location of the order and/or the user location may be optional. As another example, in the process of order allocation at the first time, the users in the order snatching mode may be determined before determining the users in the order allocating mode. As still another example, in the process of order allocation, steps such as data preprocessing and data storing may be added. All such variations are within the protection scope of the present disclosure.

Figure 7:
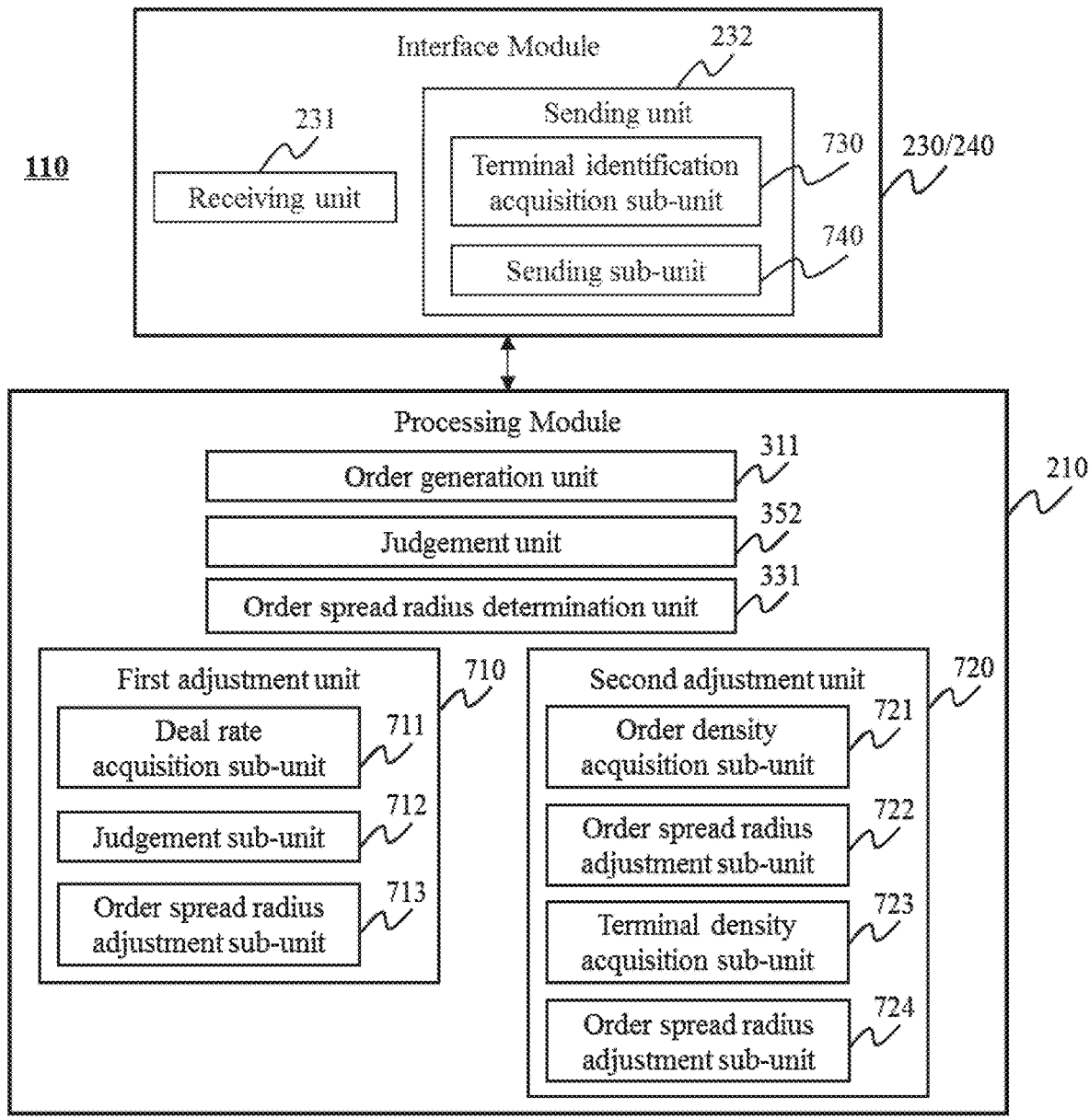
FIG. 7 is a schematic diagram of the order allocation system according to some embodiments of the present disclosure.

FIG. 7 is a schematic diagram of the order allocation system 110 according to some embodiments of the present disclosure. As shown in this figure, the order allocation system 110 may include one or more receiving units 231, order generation units 311, judgment units 352, and/or sending units 232.

In some embodiments, the receiving unit 231 may be configured to receive a taxi-booking request from an order requester.

In some embodiments, the order generation unit 311 may be configured to generate order information based on the taxi-booking request, wherein the order information includes at least a departure location.

In some embodiments, the judgment unit 352 may be configured to determine whether an $n^{th}$ preset time comes, wherein n may be an integer no less than 1 and no larger than N, and N may be an integer greater than 1.

In some embodiments, the sending unit 232 may be configured to send the order information to all users within an $n^{th}$ preset region of order spread, when the judgment unit 352 determines that the $n^{th}$ preset time comes.

In some embodiments, the sending unit 232 may include one or more terminal identification acquisition sub-units 730 and sending sub-units 740.

Thereinto, the terminal identification acquisition sub-unit 730 may be configured to when the $n^{th}$ preset time comes, obtain the terminal identifications of all users within the $n^{th}$ preset region of order spread. The sending sub-unit 740 may be configured to send the order information to the user based on the terminal identifications obtained by the terminal identification acquisition sub-unit 730.

In some embodiments, the order allocation system 110 may further include one or more order spread radius determination units 331, which may be configured to determine each preset order spread radius based on a first successful order rate in historical data.

In some embodiments, the order allocation system 110 may further include one or more first adjustment units 710. The first adjustment unit 710 may further include one or more deal rate acquisition sub-units 711, judgment sub-units 712, and order spread radius adjustment sub-units 713.

The deal rate acquisition sub-unit 711 may be configured to obtain a second successful order rate with respect to the order(s) sent within a preset time period. The judgment sub-unit 712 may be configured to determine whether the second successful order rate is less than a preset threshold. The order spread radius adjustment sub-unit 713 may be configured to adjust each order spread radius and/or each preset time when the judgment sub-unit 712 determines that the second successful order rate is less than the preset threshold.

In some embodiments, the order allocation system 110 may further include one or more second adjustment units 720. The second adjustment unit 720 may include one or more order density acquisition sub-units 721, order spread radius adjustment sub-units 722, terminal density acquisition sub-units 723, and/or order spread radius adjustment sub-units 724.

The order density acquisition sub-unit 721 may be configured to obtain an order density within a preset region after the order generation unit 311 generating the order information based on the taxi-booking request. The spread radius adjustment sub-unit 722 may be configured to adjust each preset order spread radius and/or each preset time based on the acquired order density. The terminal density acquisition sub-unit 723 may be configured to obtain a user density within a preset region after the order generation unit 311 generating the order information based on the taxi-booking request. The order spread radius adjustment sub-unit 724 may be configured to adjust each preset order spread radius and/or each preset time based on the acquired terminal density.

Regarding the embodiments of the order allocation system 110, since it is substantially similar to the embodiments of the order allocation process, the description may be simplified. Descriptions of the system may be found in the embodiments (i.e., FIG. 8-FIG. 10) of the order allocation process. It should be noted that the above description of the order allocation system 110 is merely provided for the purpose of illustration, and not intended to limit the scope of the present disclosure. For persons having ordinary skills in the art, various modifications and variations in form and detail may be conducted to the order allocation system 110 under the teaching of the present disclosure. However, those modifications and variations may not depart from the spirit and scope of this disclosure. For example, in some embodiments, upon similar functions being completed, some units may be added or removed. In some embodiments, each unit may be combined in various ways or connected with other modules as sub-systems. All such modifications are within the protection scope of the present disclosure.

Figure 8:
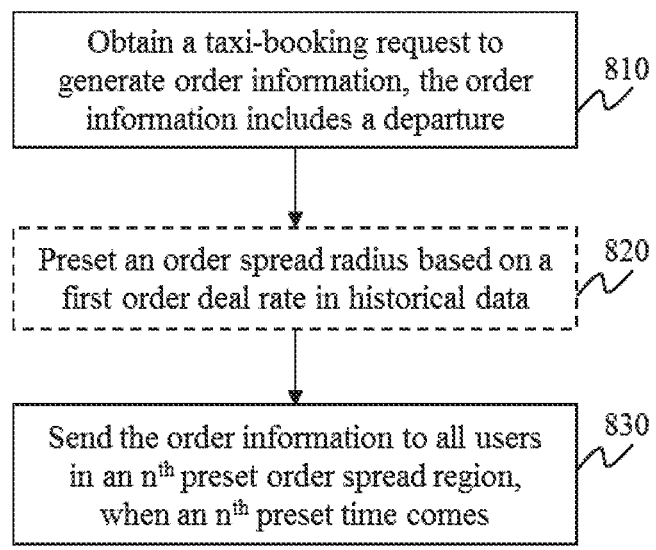
FIG. 8 is a flowchart of an exemplary process for allocating orders according to some embodiments of the present disclosure.

FIG. 8 is a flowchart of an exemplary process for allocating orders according to some embodiments of the present disclosure. As shown in FIG. 8, in step 810, the taxi-booking request of an order requester may be obtained. The order information may be generated based on the taxi-booking request. For example, the taxi-booking request of the requester may be received by the order receiving unit 231. According to the taxi-booking request, the order information may be generated by the order generation unit 311. Relevant descriptions of the order information may be found in the present disclosure. In this embodiment, the order information may include at least a departure location. It should be noted that in some embodiments, the order allocation system 110 may directly process existing orders stored in the system itself or transmitted from other sources, i.e., step 810 may be omitted.

In step 820, each preset order spread radius may be determined according to the first order deal rate in the historical data. For example, each preset order spread radius may be determined according to the first order deal rate in the historical data by the order spread radius determination unit 331. As another example, each preset order spread radius may be determined by analyzing the deal rate in order-related historical data. To facilitate understanding of this disclosure, some embodiments may be illustrated below, which are not intended to limit the scope of the present disclosure.

For example, by analyzing the deal rate in order-related historical data, an order spread region, where the deal rate is between 80%-100%, may be determined. A first preset order spread radius may be designated as an order spread radius of 200 meters corresponding to the order spread region. An order spread region where the deal rate is between 60%-80% may be determined. A second preset order spread radius may be designated as an order spread radius of 400 meters corresponding to the order spread region. An order spread region where the deal rate is between 40%-60% may be determined. A third preset order spread radius may be designated as an order spread radius of 800 meters corresponding to the order spread region. An order spread region where the deal rate is between 20%-40% may be determined. A fourth preset order spread radius may be designated as an order spread radius of 1000 meters corresponding to the order spread region. An order spread region where the deal rate is between 0%-20% may be determined. A fifth preset order spread radius may be designated as an order spread radius of 1500 meters corresponding to the order spread region. In some embodiments, step 820 may be optional, i.e., the process of order allocation may be completed without pre-setting an order spread radius.

In step 830, when the $n^{th}$ preset time comes, the order information may be sent to all users in the $n^{th}$ preset order spread region. The preset time herein may be any time point set according to actual needs. In some embodiments, the $n^{th}$ preset time may correspond to the $n^{th}$ time point. The $n^{th}$ preset order spread region may be designated as a region that centers on the departure location of the order with the $n^{th}$ preset order spread radius, wherein n may be an integer no less than 1 and no larger than N, and N may be an integer larger than 1. The $N^{th}$ (when n=N) preset order spread radius may be the longest effective order spread distance. The $N^{th}$ preset order spread region may be the largest effective order spread region, i.e., no user may obtain the order information when the order information is sent to a region beyond the $N^{th}$ preset order spread region.

In some embodiments, the $(n+1)^{th}$ preset time may be later than the $n^{th}$ preset time. The $(n+1)^{th}$ preset order spread radius may be greater than the $n^{th}$ preset order spread radius. A user closer to the departure location of the order may then receive the order information earlier and with more times. Meanwhile, a user farther from the departure location of the order may receive the order information later and with fewer times. In some embodiments, the $(n+1)^{th}$ preset order spread radius may not be greater than the $n^{th}$ preset order spread radius. A user further from the departure location of the order may then obtain the order information earlier and with more times. Meanwhile, a user closer to the departure location of the order may obtain the order information later and with fewer times.

In some embodiments of step 830, when the $n^{th}$ preset time comes, firstly the terminal identifications of all users in the $n^{th}$ preset order spread region may be obtained by the terminal identification acquisition sub-unit 730. The order information may then be sent to the users according to the terminal identifications. The order information may then be known by all users in the preset order spread region. To facilitate understanding of this disclosure, some embodiments may be illustrated below, which are not intended to limit the scope of the present disclosure.

For example, for a taxi-booking request, an order information corresponding to the taxi-booking request may be generated at Aug. 3, 2015, 08:55:10. The terminal identification of all users in the first preset order spread region may then be obtained when a first preset time 08:55:11 comes. In addition, the order information may be sent to all users in the first preset order spread region according to the terminal identifications. When a second preset time 08:55:18 comes, the terminal identification of all users in the second preset order spread region may be obtained. The order information may then be sent to all users in the second preset order spread region according to the terminal identifications. When a third preset time 08:55:25 comes, the terminal identification of all users in the third preset order spread region may be obtained. The order information may then be sent to all users in the third preset order spread region according to the terminal identifications. Similarly, when an $n^{th}$ preset time comes, firstly the terminal identifications of all users in the $n^{th}$ preset order spread region may be obtained. The order information may then be sent to the users according to the terminal identifications.

In some embodiments, when a $(n-1)^{th}$ preset time comes, after the order information being sent to all users in the $(n-1)^{th}$ preset order spread region, if a user in the $(n-1)^{th}$ preset order spread region successfully snatches the order before the $n^{th}$ preset time, the order information may not be continually sent to the users in the $n^{th}$ preset order spread region at the $n^{th}$ preset time, or only to part of the users.

It should be noted that the above description of the order allocation process is merely provided for the purpose of illustration, and not intended to limit the scope of the present disclosure. For persons having ordinary skills in the art, various modifications may be conducted to the order allocation procedure under the teaching of the present disclosure. However, those modifications may not depart from the spirit and scope of this disclosure. The steps in FIG. 8 may be executed in a changed sequence. For example, some steps may be omitted, or some steps may be added. Multiple steps may be integrated into one step. A step may be divided into multiple steps. For example, step 820 may be omitted. As another example, a step of analyzing a deal rate of historical orders may be added to the process of order allocation. Obviously, the deal rate of historical orders may be alternatively obtained from elsewhere. As still another example, in the process of order allocation, steps such as data pre-processing, and data storing may be added. As still another example, after step 830, step(s) of adjusting each preset order spread radius and/or each preset time may be added. All such modifications are within the protection scope of the present disclosure.

Figure 9:
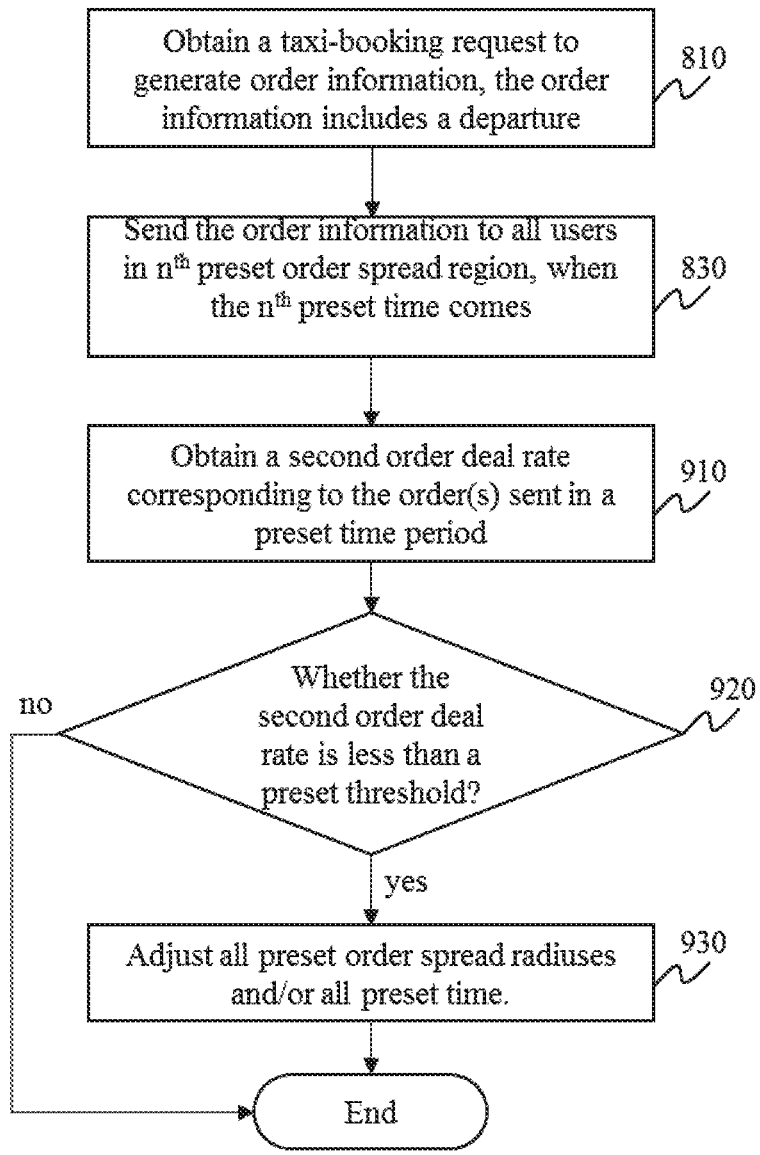
FIG. 9 is a flowchart of an exemplary process for allocating orders according to some embodiments of the present disclosure.

FIG. 9 is a flowchart of an exemplary process for allocating orders according to some embodiments of the present disclosure. Descriptions of step 810 and 830 may be found in FIG. 8. In step 910, a second order deal rate corresponding to the order(s) sent in a preset time period may be obtained. For example, the second order deal rate corresponding to the order(s) sent in the preset time period may be obtained by the deal rate acquisition sub-unit 711. The preset time period may be less than or equal to the running time of the order allocation process in FIG. 8. In step 920, whether the second order deal rate is less than a preset threshold may be determined. For example, whether the second order deal rate is less than the preset threshold may be determined by the judgment sub-unit 712. If so, the process may proceed to step 930. If not, the process may conclude. In step 930, each preset order spread radius and/or each preset time may be adjusted. For example, each preset order spread radius and/or each preset time may be adjusted by the order spread radius adjustment sub-unit 713. When adjusting each preset order spread radius, each preset order spread radius may be re-determined according to other historical data (which is different from the historical data shown in FIG. 8). Alternatively, each preset order spread radius chosen previously may be slightly adjusted according to empirical value(s). In this embodiment, the deal rate of orders may be designated as an indicator used to examine the implementation effect of the order allocation process shown in FIG. 8. Any other indicator(s) may also be used as a basis, which may include but are not limited to an order canceling rate, user credit/ evaluation, etc.

Figure 10:
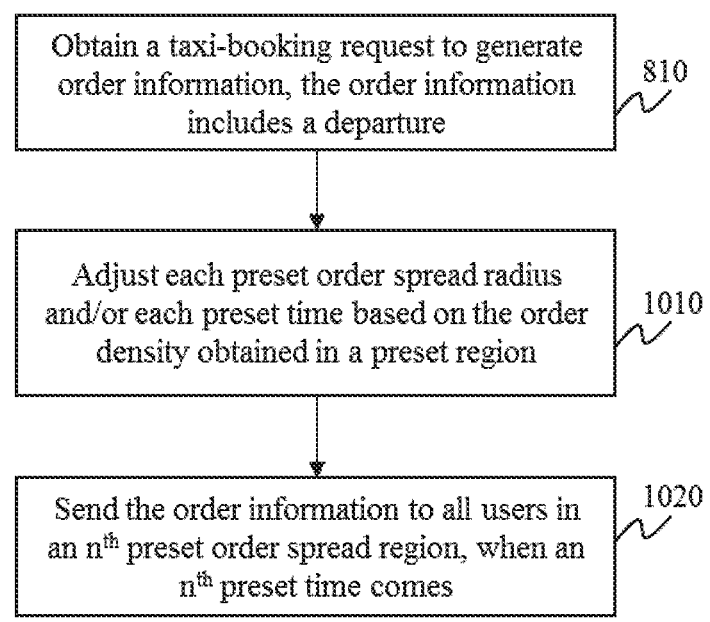
FIG. 10 is a flowchart of an exemplary process for allocating orders according to some embodiments of the present disclosure.

FIG. 10 is a flowchart of an exemplary process for allocating orders according to some embodiments of the present disclosure. Descriptions of step 810 may be found in FIG. 8. In step 1010, each preset order spread radius and/or each preset time may be adjusted. For example, each preset order spread radius and/or each preset time may be adjusted by the second adjustment unit 720. In some embodiments, an order density in a preset region may be obtained by the order density acquisition sub-unit 723. Each preset order spread radius and/or each preset time may then be adjusted by the order spread radius adjustment sub-unit 722 according to the order density. In some embodiments, a user density in the preset region may be obtained by the terminal density acquisition sub-unit 723. Each preset order spread radius and/or each preset time may then be adjusted by the order spread radius adjustment sub-unit 724 according to the user density. In some embodiments, each preset order spread radius and/or each preset time may be adjusted according to the order density and the user density simultaneously. In some embodiments, the order density and/or the user density may be a ratio of the number of orders and/or the number of users of the preset region to an area of the preset region. The number of orders in the preset region may be the number of orders that are associated with departure locations within the preset region.

In step 1020, when an $n^{th}$ preset time or an adjusted $n^{th}$ preset time comes, the order information may be sent to all users in an $n^{th}$ preset order spread region that are determined based on an $n^{th}$ preset order spread radius. Alternatively, all users in an $n^{th}$ preset order spread region that are determined based on an adjusted $n^{th}$ preset order spread radius. In some embodiments, the preset order spread region may be a region which centers on the departure location of the order and is smaller than or equal to the $n^{th}$ preset order spread region (the largest effective order spread region).

To facilitate understanding of this disclosure, some embodiments may help to illustrate how to adjust each preset order spread radius and/or each preset time according to an order density and/or a user density in the preset region. However, these embodiments are not intended to limit the scope of the present disclosure.

In some embodiments, when the order density and/or the user density in the preset region is greater than the first threshold, each preset order spread radius may be lengthened. When the order density and/or the user density in the preset region is less than the first threshold, each preset order spread radius may be shortened. For example, an effective order spread region may be divided into five gradient order spread regions. Each of the preset order spread radiuses may be 200 meters, 400 meters, 800 meters, 1000 meters, and 1500 meters. When the order density and/or the user density in the preset region is greater than the first threshold, each preset order spread radius may be adjusted to 230 meters, 500 meters, 900 meters, 1200 meters, and 1500 meters. When the order density and/or the user density in the preset region is less than the first threshold, each preset order spread radius may be adjusted to 150 meters, 300 meters, 500 meters, 800 meters, and 1500 meters.

In some embodiments, when the order density and/or the user density in the preset region is greater than the first threshold, a part of the preset times may be delayed. For example, a second preset time and a third preset time may be delayed. When the order density and/or the user density in the preset region is less than the first threshold, a part of the preset times may be advanced. For example, the second preset time and the third preset time may be advanced.

It should be noted that the above description of the order allocation process is merely provided for the purpose of illustration, and not intended to limit the scope of the present disclosure. For persons having ordinary skills in the art, modifications may be conducted to the order allocation procedure under the teaching of the present disclosure. However, those modifications may not depart from the spirit and scope of this disclosure. The steps in FIG. Ten may be executed in a changed sequence. For example, some steps may be omitted. Some steps may be added. Multiple steps may be integrated into one step. A step may be divided into multiple steps. For example, in practical application, each preset order spread radius and/or each preset time may be adjusted by other ways or by determining a better adjustment method through trial and error. All such modifications are within the protection scope of the present disclosure.

Figure 11:
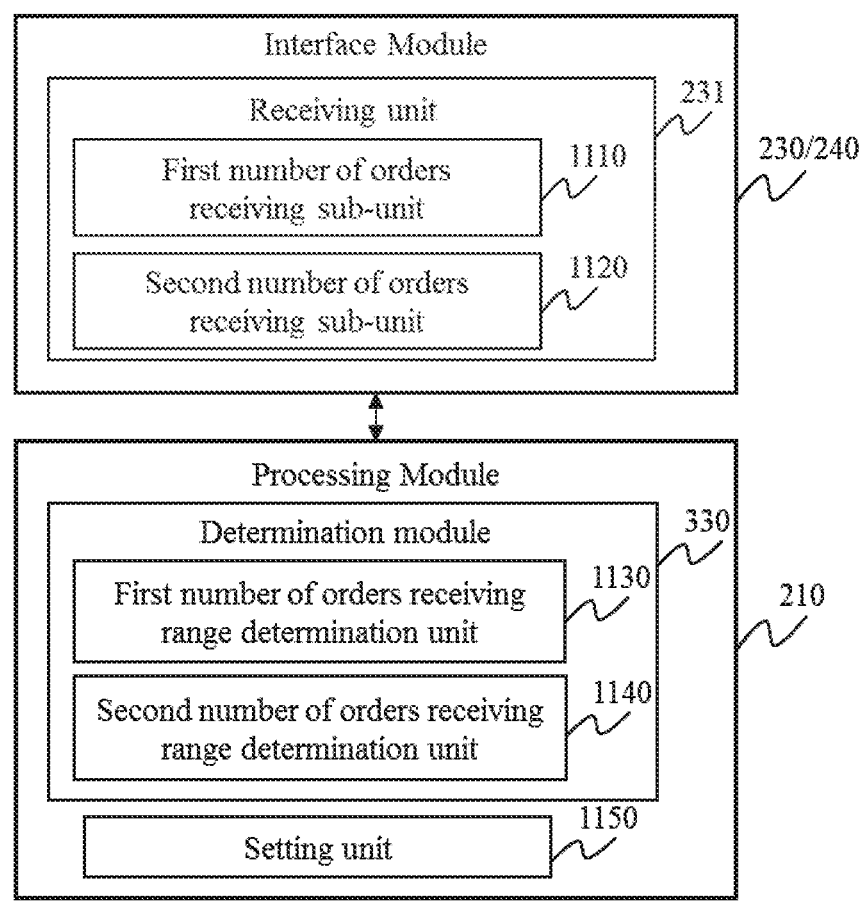
FIG. 11 is a schematic diagram of the order allocation system according to some embodiments of the present disclosure.

FIG. 11 is a schematic diagram of the order allocation system 110 according to some embodiments of the present disclosure. As shown in the figure, the order allocation system 110 may include one or more first number of orders receiving range determination units 1130, first number of orders receiving sub-units 1110, second number of orders receiving sub-units 1120, second number of orders receiving range determination units 1140, and selectable setting units 1150.

The first number of orders receiving range determination unit 1130 may be configured to determine a default order receiving a range of a first number of users. The first number of orders receiving sub-unit 1110 may be configured to obtain a first average number of orders for the first number of users within the default order receiving range. The second number of orders receiving sub-unit 1120 may be configured to obtain a second average number of orders for a second number of users within the default order receiving range. The second number of orders receiving range determination unit 1140 may be configured to determine an order receiving range for the second number of users based on the first average number of orders and the second average number of orders. The selectable setting unit 1150 may be configured to designate an order receiving range as a default order receiving range.

Regarding the embodiments of the order allocation system 110, since it is substantially similar to the embodiments of the order allocation process, the description may be simplified. Descriptions of the system may be found in the embodiments (in FIG. 12) of the order allocation process. It should be noted that the above description of the order allocation system 110 is merely provided for the purpose of illustration, and not intended to limit the scope of the present disclosure. For persons having ordinary skills in the art, various modifications and variations in form and detail may be conducted to the order allocation system 110 under the teaching of the present disclosure. However, those modifications and variations may not depart from the spirit and scope of this disclosure. For example, in some embodiments, upon similar functions being completed, some units may be added or removed. Each unit may be combined in various ways or connected with other modules as sub-systems. All such modifications are within the protection scope of the present disclosure.

Figure 12:
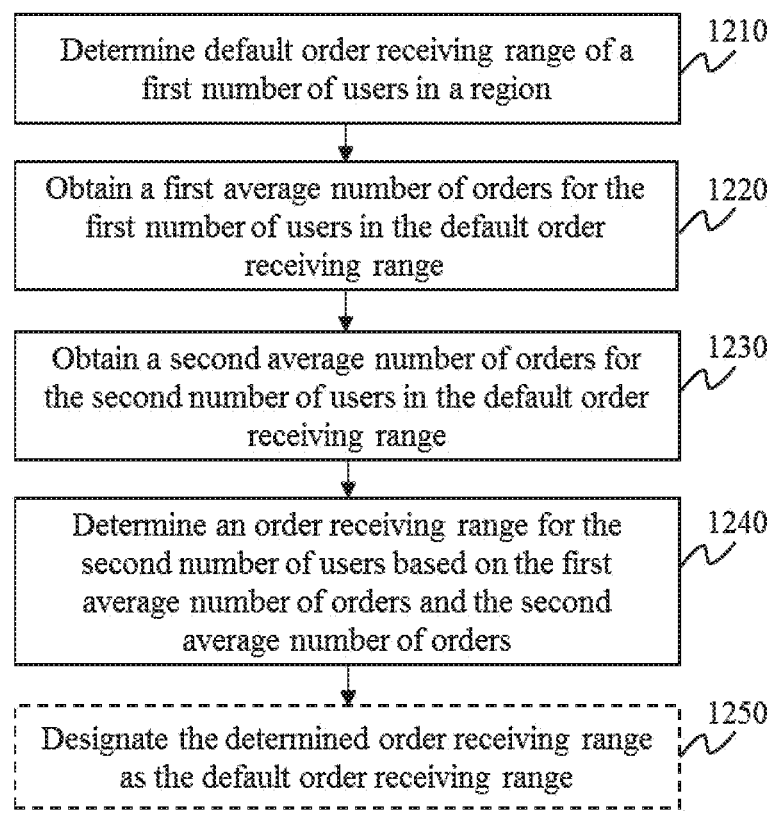
FIG. 12 is a flowchart of an exemplary process for allocating orders according to some embodiments of the present disclosure.

FIG. 12 is a flowchart of an exemplary process for allocating orders according to some embodiments of the present disclosure. As shown in the figure, in step 1210, a default order receiving range of a first number of users in a region may be determined. In some embodiments, the region may be an administrative region or an artificial setting range. The area of the region may be constant or adjusted according to actual situations. In some embodiments, the default order receiving range may be a preset range. Sending orders to the user(s) within the default order receiving range may facilitate the users to obtain a reasonable number of orders at any time. The user(s) and the order requesters may then establish and complete the order(s) efficiently. For example, the default order receiving range may be set as any distance within a range from 1 kilometer to 5 kilometers. Meanwhile, the default order receiving range may be designated as a larger or smaller range according to different application scenarios and situations. In some embodiments, the first number of users may be regarded as being a statistical sample. The first number may be equal to or less than the number of all users in the region. For example, the first number may be 80% or greater or less than 80% of the number of all users in the region.

In some embodiments, the default order receiving range may be directly set by the order allocation system 110 or by a user. For example, when the order receiving range of the first number of orders in the region is set as different values, an average number of orders which are completed in unit time (e.g., 1 hour, 1 day, etc.) by the users in the region may be counted by the order allocation system 110. An order receiving range which has the greatest average number of orders may be set as the default order receiving range. As another example, each user in the region may choose a preferred order receiving range for himself/herself. The default order receiving range in the region may then be determined by performing statistics analysis (e.g., averaging) based on different preferred order receiving a range of different users by the order allocation system 110.

In step 1220, a first average number of orders for the first number of users in the default order receiving range may be obtained. For example, the first average number of orders for the first number of users in the default order receiving range may be obtained by the first number of orders receiving sub-unit 1110. In some embodiments, the order allocation system 110 may determine the first average number of orders by performing statistics analysis (e.g., averaging) based on the number of orders received by each user of the first number of users in the default order receiving range. The first average number of orders may be acquired by obtaining the number of orders which have been received by the users and shown or to-be-shown at a time point. The first average number of orders may also be acquired by obtaining the number of orders which have been received by the users in a time period (e.g., 10 minutes to 1 hour, or any time period).

In step 1230, a second average number of orders for the second number of users in the default order receiving range may be obtained. For example, the second average number of orders for the second number of users in the default order receiving range may be obtained by the second number of orders receiving sub-unit 1120. The second number may be less than, greater than, or equal to the first number. In some embodiments, the second number may be less than the first number. In some embodiments, when the first number of users are representative users in the region, the second number may be greater than or equal to the first number. The first number of users are representative users in the region may mean that an average number of orders of most or all of the order recipients in the region may be inferred credibly according to the average number of orders for the first number of users. There may be many criteria to determine whether the first number of order recipients are representative order recipients. For example, the region may be divided into equal-sized sub-regions. A certain number of users may then be chosen from each sub-region (the numbers may be the same or different from each other). In some embodiments, the sum of the numbers may be the first number. Since the users are chosen according to uniform geographical distribution, the users may be regarded as the representative users. It should be understood that the first number of order recipients may represent the users in a higher grade with smaller sub-regions.

In step 1240, an order receiving range for the second number of users may be determined based on the first average number of orders and the second average number of orders. For example, the order receiving a range of the second number of users may be determined according to the first average number of orders and the second average number of orders by the second number of orders receiving range determination unit 1140. The order receiving a range of the users may be of any shape, which may include but is not limited to a circle, oval, rectangle, square, triangle, or any other shape. For example, if the order receiving range is a circle scope that centers on a user, the order receiving a range of the user may be determined by determining the radius of the circle scope. As another example, the order receiving range may be a square scope that centers on a user shown in a map. The region may then be divided into small square blocks for processing. In this situation, the order receiving a range of the user may be determined by determining the side length of the square scope.

According to some embodiments of the present disclosure, the order receiving a range of the second number of users may be determined based on a coefficient which represents a relationship between the first average number of orders and the second average number of orders. To facilitate understanding of this disclosure, some embodiments may be illustrated below, which are not intended to limit the scope of the present disclosure.

In some embodiments, the order receiving range may be determined based on a certainty factor. In some embodiments, the certainty factor may be a ratio of the first average number of orders to the second average number of orders. If the first average number of orders is greater than the second average number of orders, the order receiving a range of the users may be enlarged. Meanwhile, the certainty factor may be greater than 1. The enlarged order receiving range may then be determined by multiplying the radius described above (or side length) of the users by the certainty factor. If the first average number of orders is less than the second average number of orders, the order receiving a range of the users may be narrowed. Meanwhile, the certainty factor may be less than 1. The narrowed order receiving range may then be determined by multiplying the radius (or side length) of the users described above by the certainty factor. If the first average number of orders is equal to the second average number of orders, the certainty factor may be equal to 1. No processing may then be performed. The determination of the order receiving range described in above embodiments may be expressed as equation 1:

$$R2 = R1\frac{N1}{N2}, \quad \text{(Equation 1)}$$

wherein R1 may be the radius (or side length) corresponding to the default order receiving range of the users; N1 may be the first average number of orders, N2 may be the second average number of orders, and R2 may be the radius (or side length) determined by the users.

In some embodiments, the certainty factor may be determined by processing the ratio of the first average number of orders to the second average number of orders. For example, since the first average number of orders and the second average number of orders both reflect the number of orders of the order receiving range as areas, the certainty factor may be determined by extracting a root of the ratio of the first average number of orders to the second average number of orders. In some embodiments, a more accurate average number of orders may be determined when determining the radius length or the side length. The order receiving range described in these embodiments may be determined based on Equation 2:

$$R2 = R1\sqrt{\frac{N1}{N2}}, \quad \text{(Equation 2)}$$

wherein R1 may be the radius (or side length) corresponding to the default order receiving range of the users; N1 may be the first average number of orders, N2 may be the second average number of orders, and R2 may be the radius (or side length) determined by the users.

In some embodiments, an upper limit value and/or a lower limit value of the certainty factor may be preset. For example, the upper limit value may be 1.5 or any other reasonable value, while the lower limit value may be 0.5 or any other reasonable value. If the calculated certainty factor is between the upper limit value and the lower limit value, the certainty factor may be used. If the calculated certainty factor is greater than the upper limit value, the upper limit value may be designated as the certainty factor. If the calculated certainty factor is less than the lower limit value, the lower limit value may be designated as the certainty factor.

In some embodiments, the order receiving range may be determined only based on the numerical relationship between the first average number of orders and the second average number of orders. For example, if the first average number of orders is greater than the second average number of orders, the enlarged order receiving range may be obtained by multiplying the above-described radius (or side length) of the order recipient by a first preset value (e.g., 1.2, or any reasonable value). If the first average number of orders is less than the second average number of orders, the narrowed order receiving range may be obtained by multiplying the above-described radius (or side length) of the order recipient by a second preset value (e.g., 0.8, or any reasonable value). If the first average number of orders is equal to the second average number of orders, the default order receiving range may be designated as the determined order receiving range. The order receiving range described in these embodiments may be determined based on equation 3:

$$\begin{cases} R2 = R1^*a(N1 > N2) \\ R2 = R1^*b(N1 < N2) \end{cases}, \quad \text{(Equation 3)}$$

wherein R1 may be the radius (or side length) corresponding to the default order receiving range of the users, N1 may be the first average number of orders, N2 may be the second average number of orders, a may be the first preset value, b may be the second preset value, and R2 may be the radius (or side length) determined by the users.

According to some embodiments of the present disclosure, if the order receiving a range of the second number of users is determined, the process may proceed to step 1250. In step 1250, the determined order receiving range may be designated as the default order receiving range.

In some embodiments, the order allocation process shown in FIG. 12 may be executed in real time or dynamically. For example, the process may be executed in real time when the users request new orders from the order allocation system 110 each time. The process may also be executed in real time when the order allocation system 110 sends new orders to the users each time. In some embodiments, the order receiving range may be dynamically adjusted continuously. As another example, in order to decrease the calculation amount of the order allocation system 110, the process may be executed at periodical time intervals (e.g., every 5 minutes, or any preset time period). Meanwhile, the process may be executed in response to the request of the users and the order allocation system 110.

It should be noted that the above description about the order allocation process is provided merely for the purpose of illustration, and not intended to limit the scope of the present disclosure. For persons having ordinary skills in the art, various modifications and variations may be conducted to the order allocation process under the teaching of the present disclosure. However, those modifications may not depart from the spirit and scope of this disclosure. For example, the steps in FIG. 12 may be executed in a changed sequence. For example, some steps may be omitted. Some steps may be added. Multiple steps may be integrated into one step. A step may be divided into multiple steps. For example, steps 1220 and 1230 may be executed in random rank or simultaneously. Step 1250 may be omitted. Steps 1220 and 1230 may be integrated into one step. Step 1240 may be divided into two steps. One of the two steps may be used to compare the first average number of orders and the second average number of orders. The other step may be used to determine the order receiving a range of the users. All such modifications are within the protection scope of the present disclosure.

Figure 13:
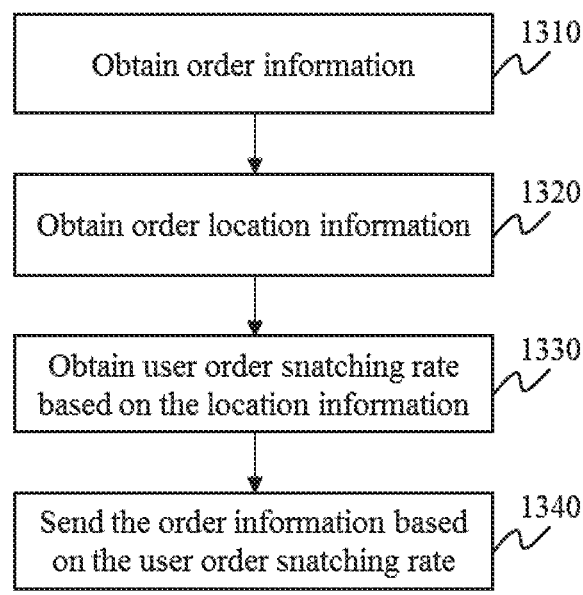
FIG. 13 is a flowchart of an exemplary process for allocating orders according to some embodiments of the present disclosure.

FIG. 13 is a flowchart of an exemplary process for allocating orders according to some embodiments of the present disclosure. In step 1310, the order information may be obtained. For example, the order information may be received by the receiving unit 231 of the order allocation system 110. The order information may include but is not limited to the information of the order itself, the user information, and other information. The information of the order itself may include an order number, a departure location, an ordering time, a departure time, an arrival time, an acceptable wait time, a mileage, a passenger number, a determination as to whether the passenger has luggage or not, a price, a term of payment (e.g., cash payment, a debit card payment, online payment, remittance payment, etc.), a price increased by a consumer, a price adjusted by a service provider, a price adjusted by a system, a reward/coupons usage condition, an order completion status, an order selection of a service provider, an order sending status of a consumer, or the like, or any combination thereof. The user information may include but is not limited to a name, a nickname, gender, a nationality, age, contact information (a telephone number, a mobile phone number, social media account information (e.g., Wechat account, QQ™ account, Linkedin, etc.), other ways through which the user may be contacted, etc.), location information (e.g., coordinate information, direction information, motion state information, etc.), an occupation, a rating, a usage time, driving experience, a vehicle age, a vehicle type, a vehicle condition, a license plate number, a driving license number, a certification status, user habit/preference, a feature (e.g., trunk size, panoramic sunroof, other features, etc.) for extra services, or the like, or any combination thereof. The other information may include information that is not controlled by the consumer or the service provider, or temporal/emergency information. The other information may include but is not limited to weather conditions, environment conditions, road conditions (e.g., road closure due to security, road construction, or other reasons), traffic conditions, or the like, or any combination thereof.

In some embodiments, a part of the order information may be real-time information or historical order information. The real-time information may be the order information in a certain time or in a certain time period. The time period may be several seconds, several minutes, several hours, or the user-defined time period based on the preference. The time period may also be a certain time period, such as workday, day off, holidays and festivals, peak hours, off-peak hours, etc. The historical order information may include previous information related to the order, such as the number of completed orders, the number of order requests, the number of accepted orders, an order completion rate, an order snatching rate, a contract cancellation rate, or the like, or any combination thereof.

Is step 1320, the order location information may be obtained based on the order information. In some embodiments, the order location information may be the coordinate information of the order requester, the coordinate information of the order recipient, the traffic map information of the city, the road distance between the order requester and the order recipient, or the like, or any combination thereof. Relevant descriptions of the road distance may be found in descriptions elsewhere in the present disclosure. In some embodiments, the order location information may be a departure location and a destination of the order, the destination of the user terminal, the current motion status information of the user, the convenient road grade of the user determined based on strategies, or the like, or any combination thereof. Relevant descriptions of the convenient road grade may be found in descriptions elsewhere in the present disclosure. In some embodiments, the order location information may also include the departure location, the original location, the destination of the order, the current location of the user terminal, the distance between the order departure location and the user terminal, or the like, or any combination thereof.

In step 1330, the user order snatching rate may be obtained based on the location information. In some embodiments, the order snatching rate of the user terminal may be obtained using a pre-established prediction model, according to the location information, the time information, the historical order information, or the like, or any combination thereof. Relevant descriptions of the prediction model may be found in descriptions elsewhere in the present disclosure.

In step 1340, the order information may be sent to the user terminal based on the order snatching rate information of the user. For example, the order information may be sent to the user terminal based on the order snatching rate information of the user by the sending unit 232. In some embodiments, whether to allocate the order to the terminal may be determined based on the order snatching rate of the user. In some embodiments, the order information may be sent to the user terminal based on the order snatching rate of the user. In some embodiments, the orders may be successively sent to multiple user terminals according to an ascending order by the order snatching rate of the user.

It should be noted that the above description about the order allocation process in FIG. 13 is merely provided for the purpose of illustration, and not intended to limit the scope of the present disclosure. For persons having ordinary skills in the art, various modifications and variations in form and detail may be conducted to the order allocation process under the teaching of the present disclosure. However, those modifications and variations may not depart from the spirit and scope of this disclosure. For example, steps may be integrated in various ways. As another example, the order location information may also be any related information of the order location, such as the previous order information of the order location. All such modifications and variations are within the protection scope of the present disclosure.

Figure 14:
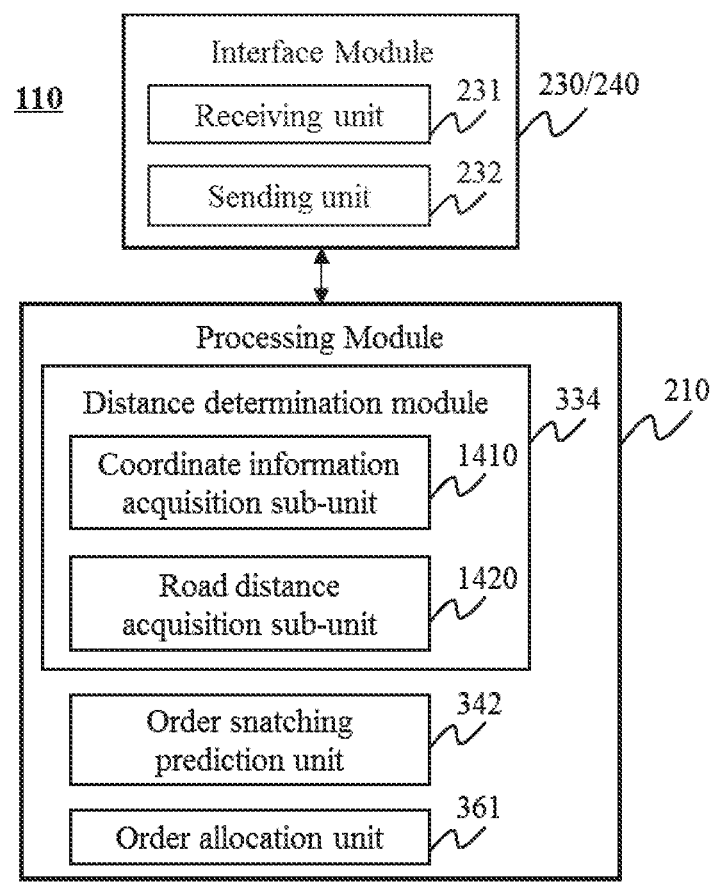
FIG. 14 is a schematic diagram of the order allocation system according to some embodiments of the present disclosure.

FIG. 14 is a schematic diagram of the order allocation system 110 according to some embodiments of the present disclosure. The order allocation system 110 may include one or more interface modules 230/240 and processing modules 210. The interface module 230/240 may further include one or more receiving units 231 and sending units 232. The processing unit 210 may further include one or more distance determination units 334, order snatching prediction units 342, order allocation units 361, or the like, or any combination thereof. The distance determination unit 334 may also include one or more coordinate information acquisition sub-units 1410 and road distance acquisition sub-units 1420. Relevant descriptions of the interface module 230/240, the receiving unit 231, and the sending unit 232 may be found in descriptions elsewhere in the present disclosure.

In some embodiments, the coordinate information acquisition sub-unit 1410 may be configured to obtain the coordinate information of the order requester, each order recipient within a preset range of the coordinate information, and the coordinate information of each order recipient, after receiving a taxi-booking request from a passenger. In some embodiments, the coordinate information may include absolute coordinate information, relative coordinate information, relative polar coordinate information, or the like, or any combination thereof. The coordinate information may also be any ordered pair or combined data value that may reflect the geographic location relationship.

In some embodiments, the road distance acquisition sub-unit 1420 may be configured to obtain a city where the order is located, and further obtain the traffic map information of the city, according to the order request sent by the order requester. The road distance between the order requester and each order recipient may be obtained, according to the traffic map information of the city of the order requester, the coordinate information of the order requester which is obtained by the coordinate information acquisition sub-unit 1410, and the coordinate information of each order recipient who is within a preset range. In some embodiments, the road distance may be a straight line distance between the order requester and the order recipient. The road distance may also be an actual vehicle driving distance from the order recipient to the order requester which may be acquired from a positioning system and/or actual road condition information.

In some embodiments, the order snatching prediction unit 342 may be configured to predict the order snatching probability of each order recipient, according to the road distance between each order recipient and the order requester, and the related feature information of the historical orders of each order recipient in a preset time period. Specifically, the order snatching prediction unit 342 may be configured to predict the order snatching probability of each order recipient using a pre-established prediction model. In some embodiments, the prediction model may be established based on the related information of the historical orders of the order recipients within a preset time period. In some embodiments, the road distance may be a predictive variable. The order snatching probability of the order recipient may be a target variable in the prediction model. In some embodiments, the related feature information of the historical order may include the city where the historical order was generated, the time when the historical order was generated, the road congestion condition of the historical order, and worth of the historical order, or the like, or any combination thereof.

In some embodiments, the prediction model may be qualitative or quantitative. The quantitative prediction model may be based on a time series forecasting method or a casual method. The time series forecasting method may further include an average smoothing method, a trend extrapolation method, a seasonal variation prediction method, a Markov time series forecasting method, or the like, or any combination thereof. The causal method may further include a unitary regression method, a multiple regression method, or an input-output method. In some embodiments, the prediction model may include but is not limited to a weighted arithmetic average model, a trend average prediction model, an exponential smoothing model, an average development speed model, a unitary linear regression model, a high-low point model, or the like, or any combination thereof. In some embodiments, equations, algorithms, and/or models used for information processing may be continuously optimized using machine learning algorithms.

In some embodiments, the order snatching prediction unit 342 may also be configured to optimize the pre-established prediction model using machine learning algorithms, based on the order related information acquired in real-time online and the road distance between the order recipient and the order requester of the corresponding order. Relevant descriptions of the machine learning algorithm may be found in descriptions elsewhere in the present disclosure.

In some embodiments, the order allocation unit 361 may be configured to allocate the order corresponding to the taxi-booking request to the order recipient according to the predicted order snatching probability of each order recipient by the order snatching prediction unit 342. Specifically, the order allocation unit 361 may be configured to extract the order snatching probability that is greater than a preset threshold, and allocate the order information corresponding to the taxi-booking request to the order recipient corresponding to each extracted order snatching probability.

In some embodiments, the order allocation system 110 may also include a historical data acquisition module, a prediction model building module, a map information updating module, etc. In some embodiments, before the order snatching prediction unit 342 predicting the order snatching probability for each order recipient using the pre-established prediction model, the historical data acquisition module may be used to obtain the related feature information of the historical orders of each order recipient in a preset time period, and the road distance between the order recipient and the order requester of each historical order.

In some embodiments, the prediction model building module may designate the related feature information of the historical orders and the road distance between the order recipient and the order requester which are obtained by the historical data acquisition module as training data. The prediction model building module may then train the training data using a linear regression model to obtain an order snatching prediction model. In some embodiments, the linear regression model may be one of the logistic regression model and the support vector machine model. To facilitate understanding of the disclosure, the following description may further illustrate the linear regression model by taking the logistic regression model as an example.

The logistic regression model is widely used for binary classification problems. In some embodiments of the present disclosure, the logistic regression model may be used to determine the level of competition probability. The logistic regression equation is as follows:

$$\Sigma_i [y_i \log P(y=1|x) + (1-y_i) \log P(y=0|x)], \quad \text{(Equation 4)}$$

wherein $$P(y=1|x) = \frac{1}{1+\exp(-wx)}, P(y=0|x) = \frac{\exp(-wx)}{1+\exp(-wx)},$$

x may be the predictive variable, y may be the target variable, y=1 may indicate that order snatching may be predicted; y=0 may indicate that order non-snatching may be predicted, and w may be a model parameter. In some embodiments, w may be estimated using a maximum likelihood method. For example, various feature data of the historical order related features (e.g., the city where the historical order was generated, the time when the historical order was generated, the road congestion condition of the historical order, the worth of the historical order, or the like, or any combination thereof) may be extracted as the predictive variable x. The competitive probability of a newly initiated order may be extracted as the target variable y. In some embodiments, the competition probability of a new order may be predicted by training the historical order transaction information using the logistic regression model. In some embodiments, the accuracy of the logistic regression model may also be continuously improved by continuously increasing the features as to whether the new order is snatched or not.

In some embodiments, the map information updating module may update the traffic map information of the city where the order is located according to a preset time period. In some embodiments, the map information updating module may update the traffic map information of the city where the order requester is located based on the preset time period. Using the updated traffic map information of the city, the change of the map information due to the transformation of the traffic route via the traffic construction of the city may be prevented. The road distance from the order requester to each order recipient may then be obtained accurately.

It should be noted that the above description of the order allocation system 110 in FIG. 14 is merely provided for the purpose of illustration, and not intended to limit the scope of the present disclosure. For persons having ordinary skills in the art, various modifications and variations in form and detail may be conducted under the teaching of the present disclosure. However, those modifications and variations may not depart from the spirit and scope of this disclosure. Modules/units may be combined in various ways or connected with other modules as sub-systems. For example, the order allocation system 110 may also include a historical data acquisition module, a prediction model building module, a map information updating module, etc. As another example, the order allocation system 110 may only have a processing function without the receiving unit and the sending unit. All such modifications and variations are within the protection scope of the present disclosure.

Figure 15:
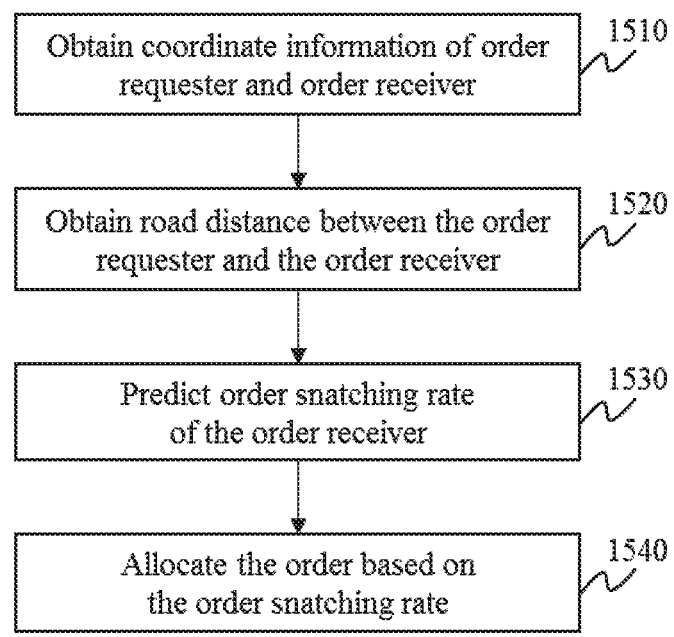
FIG. 15 is a flowchart of an exemplary process for allocating orders according to some embodiments of the present disclosure.

FIG. 15 is a flowchart of an exemplary process for allocating orders according to some embodiments of the present disclosure. In step 1510, the coordinate information of the order requester and the order recipient may be obtained. For example, after receiving a taxi-booking request sent from an order requester, the coordinate information acquisition sub-unit 1410 may obtain the coordinate information of the order requester, each order recipient in a preset range of the coordinate information, and the coordinate information of each order recipient.

In some embodiments, the coordinate information of the order requester may be added to the taxi-booking request sent from the order requester. After the taxi-booking request sent from the order requester is received, the coordinate information of the order requester may then be obtained from the taxi-booking request. By receiving the coordinate information of the order requester in real time, the location information of each order recipient in the preset range may be determined and uploaded in real time by the positioning system and/or the base station.

In some embodiments, the taxi-booking request sent from the order requester may include a departure location, a starting point, a destination, a user identification of the order requester, or the like, or any combination thereof. The user identification of the order requester may include a mobile phone number, an identity (id for short), a media access control (MAC for short) address, or the like, or any combination thereof. Detailed descriptions of the order information may be found in descriptions elsewhere in the present disclosure.

In some embodiments, the scope of the preset range may be set and adjusted according to the traffic condition, specific urban area, or other information of the city where the order requester is located. For example, if the city where the order requester is located is Daxing district of Beijing and the traffic condition is well, the scope of the preset range may be set larger. If the city where the order requester is located is Haidian district of Beijing and the traffic condition is crowded, the scope of the preset range may be set smaller. It is not intended to be limiting of the present disclosure.

In some embodiments, the coordinate information may include absolute coordinate information, relative coordinate information, relative polar coordinate information, or the like, or any combination thereof. The coordinate information may also be any ordered pair or combined data value that may reflect the geographic location relationship.

In step 1520, the road distance between the order requester and the order recipient may be obtained. For example, the road distance acquisition sub-unit 1420 may obtain the road distance between the order requester and each order recipient according to the traffic map information of the city where the order requester is located, the coordinate information of the order requester, and the coordinate information of each order recipient.

In some embodiments, an actual road distance from the order requester to each order recipient may be determined according to the traffic map information of the city where the order requester is located, the coordinate information of the order requester, and the coordinate information of each order recipient in the preset range of the order requester. In the stage of order allocating, the order may be allocated according to the actual road distance from the order requester to each order recipient when other factors are determined. The order recipient may then obtain the order information more accurately.

In step 1530, the order snatching rate of the order recipient may be predicted. For example, the order snatching prediction unit 342 may predict the order snatching rate of the order recipient, according to the road distance corresponding to each order recipient and the related feature information of the historical orders of the order recipient in a preset time period.

In some embodiments, when the taxi-booking system is in the stage of order allocating, the order snatching prediction unit 342 may predict the order snatching probability of the order recipient according to the road distance corresponding to each order recipient and other order related feature information of the order recipient. The order may be allocated based on the order snatching probability of the order recipient. For example, by ranking the order snatching probability, the order may be sent to the order recipient in the descending order by the order snatching probability. In some embodiments, the order recipients may be screened based on a preset threshold of order snatching probability.

In some embodiments, the related feature information of the order may include the order recipient related feature information, the order related feature information, etc.

In some embodiments, in step 1530, the order snatching probability of each order recipient may be predicted based on the pre-established prediction model. The prediction model may be established based on the related information of the historical orders of the order recipients in a preset time period. The road distance may be the predictive variable in the prediction model. The order snatching probability of the order recipient may be the target variable in the prediction model. In some embodiments, the related feature information of the historical order may include the city where the historical order was generated, the time when the historical order was generated, the road congestion condition of the historical order, or the worth of the historical order, or any combination thereof. Relevant descriptions of the prediction model may be found in descriptions elsewhere in the present disclosure.

In some embodiments, before predicting the order snatching probability of each order recipient based on the pre-established prediction model, the following steps may also be included:

Firstly, the road distance acquisition sub-unit 1420 may obtain the related feature information of the historical orders of each order recipient in the preset time period and the road distance of the order recipient of each historical order. The order snatching prediction unit 342 may then designate the related feature information of the historical orders and the road distance corresponding to the order recipient of each historical order as training data. The order snatching prediction unit 342 may also train the training data using a linear regression model to obtain the order snatching prediction model. In some embodiments, after obtaining the order snatching prediction model, the pre-established prediction model may be optimized using machine learning algorithms according to the related feature information of the order obtained in real time online and the road distance corresponding to the order recipient of the related order.

In some embodiments, various feature data of the historical orders related features may be extracted as the predictive variable. The order snatching results of the historical orders may be taken as the target variable. By conducting the linear regression model training with the predictive variable and the target variable, the order snatching prediction model of the order snatching probability may be obtained.

In some embodiments, the linear regression model may be one of the logistic regression model and the support vector machine model. Relevant descriptions of the logistic regression model may be found in the embodiments of the order allocation system (as shown in FIG. 14).

In some embodiments, the order snatching prediction may be divided into two stages containing offline training and online real-time computing. In the offline training stage, various feature data of the historical orders related features, such as driver related features and order related features may be extracted as the predictive variable. The order competing probability may be taken as the target variable. The prediction model may then be obtained by conducting the model training to the historical data. In the online real-time computing stage, the model may be applied online. The related feature information of the real-time extracted order and the road distance of the order recipient of the corresponding order may be determined. The pre-established prediction model may be optimized using machine learning algorithms. Relevant descriptions of the machine learning algorithm may be found in descriptions elsewhere in the present disclosure.

In step 1540, the order corresponding to the taxi-booking request may be allocated to the order recipient according to the order snatching rate of each order recipient. For example, the order allocation unit 361 may allocate the order corresponding to the taxi-booking request to the order recipient according to the order snatching probability of each order recipient.

In some embodiments, the order corresponding to the taxi-booking request may include the order requester's departure location, original location, destination, user identification, a time when the order is generated, departure time, road distance from the order requester to each order recipient, or the like, or any combination thereof.

In some embodiment, in step 1540, the order snatching probability that is higher than a preset threshold may be obtained. The order corresponding to the taxi-booking request may then be allocated to the order recipient corresponding to each order snatching probability.

In some embodiments, the current order may be sent to the order recipient in the descending order by the order snatching probability. For example, when multiple orders including the current order are sent to the order recipient and the order snatching probability of the historical order related to the current order is smaller than the order snatching probability of the historical order related to other current orders, the current order may then be determined as unworthiness or of low worth to the order recipient. Thus, order snatching probability larger than a preset threshold may be chosen. An order corresponding to the taxi-booking request may then be allocated to the order recipient corresponding to each chosen order snatching probability.

In some embodiments, the order allocation process may also include updating the traffic map information of the city where the order requester is located based on a preset time period. For example, using the updated traffic map information of the city, the change of the map information due to the transformation of the traffic route via the traffic construction of the city may be prevented. The road distance between the order requester and each order recipient may then be obtained accurately.

It should be noted that the above description of the order allocation process in FIG. 15 is merely provided for the purpose of illustration, and not intended to limit the scope of the present disclosure. For persons having ordinary skills in the art, various modifications and variations in form and detail may be conducted under the teaching of the present disclosure. However, those modifications and variations may not depart from the spirit and scope of this disclosure. For example, steps may be integrated in various ways. As another example, the road distance between the order requester and the order recipient may be obtained by other determination methods other than the coordinate determination. As still another example, the order snatching rate of the order recipient may be trained using the decision tree model. All such modifications and variations are within the protection scope of the present disclosure.

Figure 16:
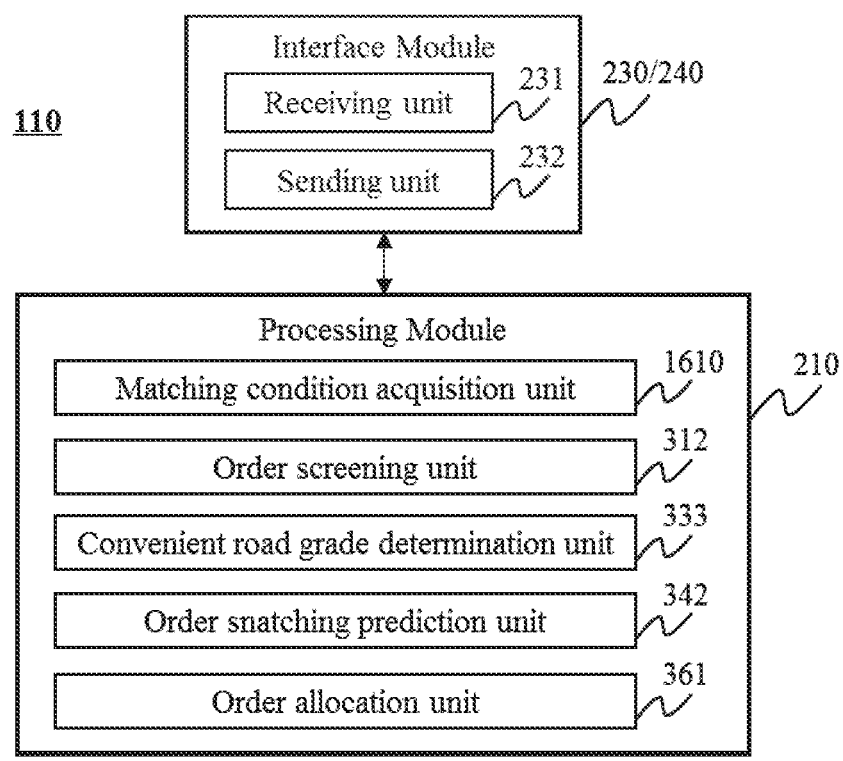
FIG. 16 is a schematic diagram of the order allocation system according to some embodiments of the present disclosure.

FIG. 16 is a schematic diagram of the order allocation system 110 according to some embodiments of the present disclosure. As shown in the figure, the order allocation system 110 may include one or more interface modules 230/240 and processing modules 210. The interface module 230/240 may further include one or more receiving units 231 and sending units 232. The processing module 210 may further include one or more matching condition acquisition units 1610, order screening units 312, convenient road grade determination units 333, order snatching prediction units 342, order allocation units 361, or the like, or any combination thereof. Relevant descriptions of the interface module 230/240, the receiving unit 231, and the sending unit 232 may be found in the descriptions elsewhere of the present disclosure.

In some embodiments, the matching condition acquisition unit 1610 may be configured to obtain an order matching condition corresponding to the user. The order matching condition may include a matching range, a matching time, etc. In some embodiments, the matching range of the order may be determined based on the city or the region where the user is located, the current location of the user, the current motion status of the user, and the current destination of the driver. In some embodiments, the matching time may be determined based on the current schedule of the driver.

In some embodiments, the matching condition acquisition unit 1610 may further include an order matching condition receiving unit, an order matching condition determination unit, or the like, or any combination thereof. The order matching condition receiving unit may be configured to receive the order matching condition uploaded by the user. The order matching condition determination unit may be configured to determine the order matching condition corresponding to the user based on the information such as the current motion status or the geographic location of the user, or a preset rule.

In some embodiments, the order screening unit 312 may be configured to conditionally match the current order based on the order matching condition corresponding to the user and screen out the order which matches the order matching condition. In some embodiments, the current order may be the order to be allocated of the taxi-booking platform.

In some embodiments, the convenient road grade determination unit 333 may be configured to determine the convenient road grade corresponding to each order based on each order screened out by the order screening unit 312 and a preset strategy.

In some embodiments, the convenient road grade determination unit 333 may further include an order address acquisition unit, a terminal address acquisition unit, and a convenient road grade judgment unit. The order address acquisition unit may be configured to obtain the departure and the destination of the screened out order(s). The terminal address acquisition unit may be configured to obtain the current destination of the user. The convenient road grade judgment unit may be configured to determine the convenient road grade of the current destination of the user corresponding to the departure and the destination of the order according to the preset strategy. In some embodiments, the convenient road grade may include direct and indirect arrivals. Specifically, specific settings of the convenient road grade may be set and divided more accurately according to the user needs. For example, the convenient road grade may be divided into five grades, i.e., A, B, C, D and E, based on the actual driving distance (i.e., the route distance) of the driver and/or the actual driving time required. The route distance of the user (driver) and/or the actual driving time required may be used to determine a preset strategy of determining the convenient road grade of the user corresponding to the order.

In some embodiments, the order snatching prediction unit 342 may be configured to predict the order snatching probability of the user using the pre-established order snatching prediction model according to the convenient road grade of the order.

In some embodiments, the order allocation unit 361 may be configured to determine whether to allocate the screened out order to the user or not based on the order snatching probability predicted by the order snatching prediction unit 342.

In some embodiments, the order allocation unit 361 further include a judgment unit and an allocation unit. The judgment unit may be configured to determine whether the order snatching probability is higher than the preset threshold. The allocation unit may be configured to determine that the order conforms to the order allocation condition and allocate the screened out an order to the user when the judgment result of the judgment unit indicates that the order snatching probability is higher than the preset threshold. In some embodiments, the allocation unit may also be configured to allocate the orders which conform to the order allocation condition to the user in the descending order by the order snatching probability of the orders, when there are multiple orders conforming to the order allocation condition among the screened out orders.

In some embodiments, the order allocation system 110 may further include a historical data acquisition module, a prediction model building module, or the like, or any combination thereof. The historical data acquisition module may be configured to obtain order-related historical data of the user within a preset time period. The prediction model building module may be configured to designate the order-related historical data as the training data and obtain the order snatching probability prediction model using the linear regression model to train the training data.

In some embodiments, the order-related historical data may include a convenient road grade feature of each historical order corresponding to the user.

In some embodiments, the linear regression model may be one of the logistic regression model and the support vector machine model. To facilitate understanding of the disclosure, the linear regression model used in the prediction model building module may be further illustrated by, for example, taking the logistic regression model as the linear regression training model.

The logistic regression model is widely used for binary classification problems. When the predictive variable X satisfies X=x and the target variable Y satisfies Y=1, the probability is given by equation 5:

$$P=(Y=1|X=x)=1/(1+\exp(-w^*x)), \quad \text{(Equation 5)}$$

when the predictive variable X satisfies X=x and the target variable Y satisfies Y=0, the probability may be given by equation 6:

$$P=(Y=0|X=x)=1/(1+\exp(-w^*x)), \quad \text{(Equation 6)}$$

wherein X may be a predictive variable, Y may be a target variable; Y=1 may indicate that order snatching may be predicted; Y=0 may indicate that order non-snatching may be predicted, and w may be a model parameter.

In some embodiments, the order-related historical data (e.g., order related features in order broadcasting, driver related features, order and driver related features, or the like, or any combination thereof) may be extracted as the predictive variable X. The competitive probability of a newly initiated order may be designated as the target variable Y. In some embodiments, the competition probability of a new order may be predicted by training the historical order transaction information using the logistic regression model. In some embodiments, the accuracy of the logistic regression model may also be continuously improved by continuously adding the related features such as whether the new order is snatched or not.

In some embodiments, the prediction model building module may also be configured to optimize the order probability prediction model using machine learning algorithms based on order-related data acquired in real-time online. In some embodiments, the order-related data acquired in real time may include a convenient road grade feature of the user corresponding to the order. Relevant descriptions of the machine learning algorithm may be found in descriptions elsewhere in the present disclosure.

It should be noted that the above description of the order allocation system 100 in FIG. 16 is merely provided for illustration, and not intended to limit the scope of the present disclosure. For persons having ordinary skills in the art, various modifications and variations in form and detail may be conducted under the teaching of the present disclosure. However, those modifications and variations may not depart from the spirit and scope of this disclosure. For example, modules may be combined in various ways or connected with other modules as sub-systems. As another example, the order allocation system 110 may directly screen the order without the matching condition acquisition unit 1610. As still another example, the order allocation system 110 may also include the historical data acquisition module, the prediction model building module, or the like, or any combination thereof. As still another example, the interface module 230/240 may be omitted. All such modifications and variations are within the protection scope of the present disclosure.

Figure 17:
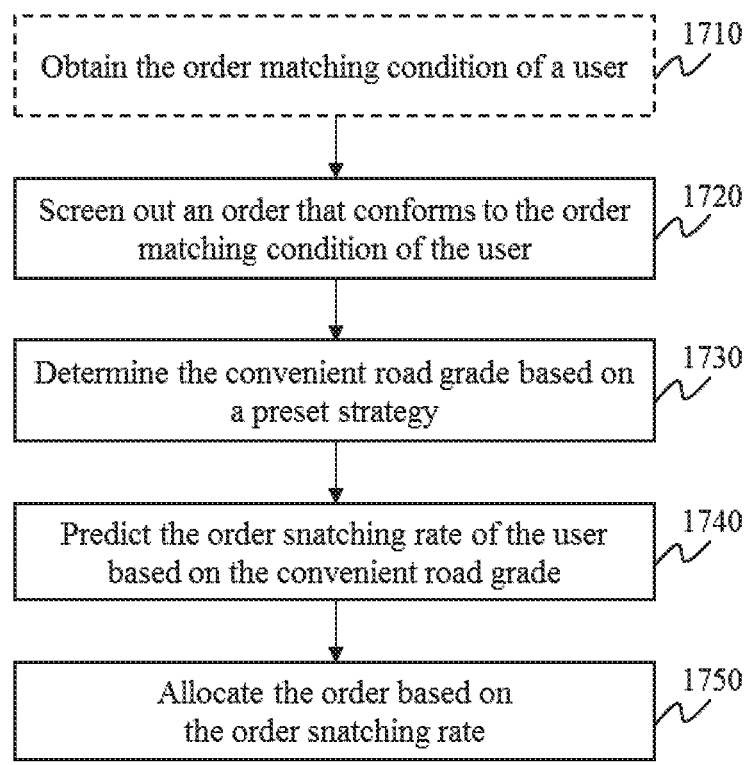
FIG. 17 is a flowchart of an exemplary process for allocating orders according to some embodiments of the present disclosure.

FIG. 17 is a flowchart of an exemplary process for allocating orders according to some embodiments of the present disclosure. The process may include following steps:

In step 1710, the order matching condition of a user may be obtained. For example, the matching condition acquisition unit 1610 may obtain the order matching condition of the user. In some embodiments, a method of acquiring the order matching condition may include receiving order matching condition uploaded by a user. In some embodiments, a method of acquiring the order matching condition may include monitoring the current motion state information (e.g., travel speed, travel direction, etc.) of a user. The order matching condition of the user may then be determined by a preset rule based on the current motion state information of the user. In some embodiments, the preset rule may be set according to a driver acceptable distance gap and time gap. In some embodiments, step 1710 may be omitted. In some embodiments, the acquisition of the order matching condition of a user may be optional.

In step 1720, the current order may be matched according to the order matching condition of the user. An order that conforms to the order matching condition may then be screened out. For example, the order screening unit 312 may match the current order according to the order matching condition of the user and screen out an order that conforms to the order matching condition. In some embodiments, the current order may be an order waiting to be allocated in the taxi-booking platform. After generating the corresponding order according to the taxi-booking request, the taxi-booking platform may match the current order according to the order matching condition corresponding to a terminal. An order that conforms to the order matching condition among orders that are waiting to be allocated in the platform may be screened out. The screened order may then be allocated to the terminal.

In some embodiments, the order matching condition may include conditions such as matching the scope of the order, matching the time of the order, etc. Specifically, the matching scope of the order may be determined according to a city/district where a user stays, the current geographical location of the terminal, the current motion state of the terminal, and the current destination of a driver associated with the terminal. The matching time may be determined according to the current time arrangement of the driver.

In step 1730, for each screened out order, the convenient road grade of the user corresponding to the order may be determined based on a preset strategy. For example, the convenient road grade determination unit 333 may determine the convenient road grade of the user corresponding to the each screened out order.

In some embodiments, the process of determining the user convenient road grade according to the preset strategy may also include obtaining the departure and the destination of the screened out order, obtaining the current destination of the user, determining the current destination convenient road grade of the user corresponding to the departure and the destination of the order according to the preset strategy, etc. Relevant descriptions of the convenient road grade may be found in the descriptions elsewhere in the present disclosure.

In some embodiments, the order information may include but is not limited to the information of the order itself, the user information, and other information. The information of the order itself may include an order number, a departure location, an ordering time, a departure time, an arrival time, an acceptable wait time, mileage, a number of passengers, a determination as to whether the passenger has luggage or not, a price, a term of payment (e.g., cash payment, debit card payment, online payment, remittance payment, etc.), a price raised by a consumer, a price adjusted by a service provider, a price adjusted by a system, a reward/coupon usage condition, an order completion status, an order selection of a service provider, an order transmitting status of a consumer, or the like, or any combination thereof. A starting point of the order may be typed in or spoken out by a passenger using software activated by the passenger in a passenger terminal of the taxi-booking system platform. The starting point of the order may also be determined by the positioning system. The technology used in the positioning system may include but is not limited to a global positioning system (GPS) technology, a Quasi-Zenith Satellite System (QAZZ) technology, a base station positioning technology, a Wi-Fi positioning technology, any positioning and speed measuring system built in vehicles, or the like. In some embodiments, the starting point of the order may also be determined by other information where appropriate. The other information may include but is not limited to a bus station, a subway station, a particular intersection, a particular building, two-dimensional code information posted at one of the locations listed above, etc.

In step 1740, the order snatching rate of the user may be predicted based on the convenient road grade of each order using the pre-established order snatching prediction model. For example, the order snatching rate may be calculated by the order snatching prediction unit 342. The convenient road grade of an order may be determined by the convenient road grade determination unit 333.

In step 1750, whether to allocate the screened out order to the user or not may be determined based on the order snatching rate. For example, the order allocation unit 361 may determine whether to allocate the screened out order to the user or not based on the order snatching rate predicted by the order snatching prediction unit 342.

In some embodiments, in step 1750, specifically, whether the order snatching probability is greater than a preset threshold may be determined. If the order snatching probability is greater than the preset threshold, the order satisfying the order allocating condition may be determined. The screened out order may then be allocated to the user.

In some embodiments, if there are multiple orders satisfying the order allocation condition among the screened orders, the order satisfying the order allocation condition may be allocated to the user in the descending order by the order snatching probability.

In some embodiments, the order allocation process may also include obtaining the order-related historical data of the user in a certain time period, taking the order-related historical data as the training data, training the training data using the linear regression model, and obtaining the order snatching prediction model. In some embodiments, the order-related historical data may include the convenient road grade feature of the user corresponding to each historical order.

In some embodiments, the linear regression model may be one of the logistic regression model and the support vector machine model. Relevant descriptions of the logistic regression model may be found in the embodiments of the system 110 in the present disclosure.

In some embodiments, after the order snatching prediction model is obtained, the order snatching prediction model may be optimized using machine learning algorithms based on the order-related data acquired in real-time online. In some embodiments, the order-related data acquired in real-time online may include the convenient road grade feature of the order corresponding to the terminal.

In some embodiments, the order snatching prediction may be divided into two stages containing offline training and online real-time computing. In the offline training stage, at the time of order spreading, various features including the order related features, the driver related features, the order, and the driver related features, etc., may be extracted as the predictive variable. Whether the driver snatches the order or not may be taken as the target variable. The model training may be conducted to the historical data of order spreading and order snatching. The prediction model may then be obtained. In the online real-time computing stage, the model may be applied online. The convenient road grade of the user corresponding to the order extracted in real-time may be determined. The pre-established prediction model may then be optimized using machine learning algorithms. Relevant descriptions of machine learning algorithms may be found in descriptions elsewhere in the present disclosure.

It should be noted that the above description about the order allocation process in FIG. 17 is merely provided for the purpose of illustration, and not intended to limit the scope of the present disclosure. For persons having ordinary skills in the art, various modifications and variations in form and detail may be conducted under the teaching of the present disclosure. However, those modifications and variations may not depart from the spirit and scope of this disclosure. For example, steps may be merged in various ways. As another example, step 1710 may be omitted, which means that the order matching condition corresponding to the user may be the default condition without being uploaded or set by the user. As still another example, the order snatching rate of the order recipient may be trained by a decision tree model. All such modifications and variations are within the protection scope of the present disclosure.

Figure 18:
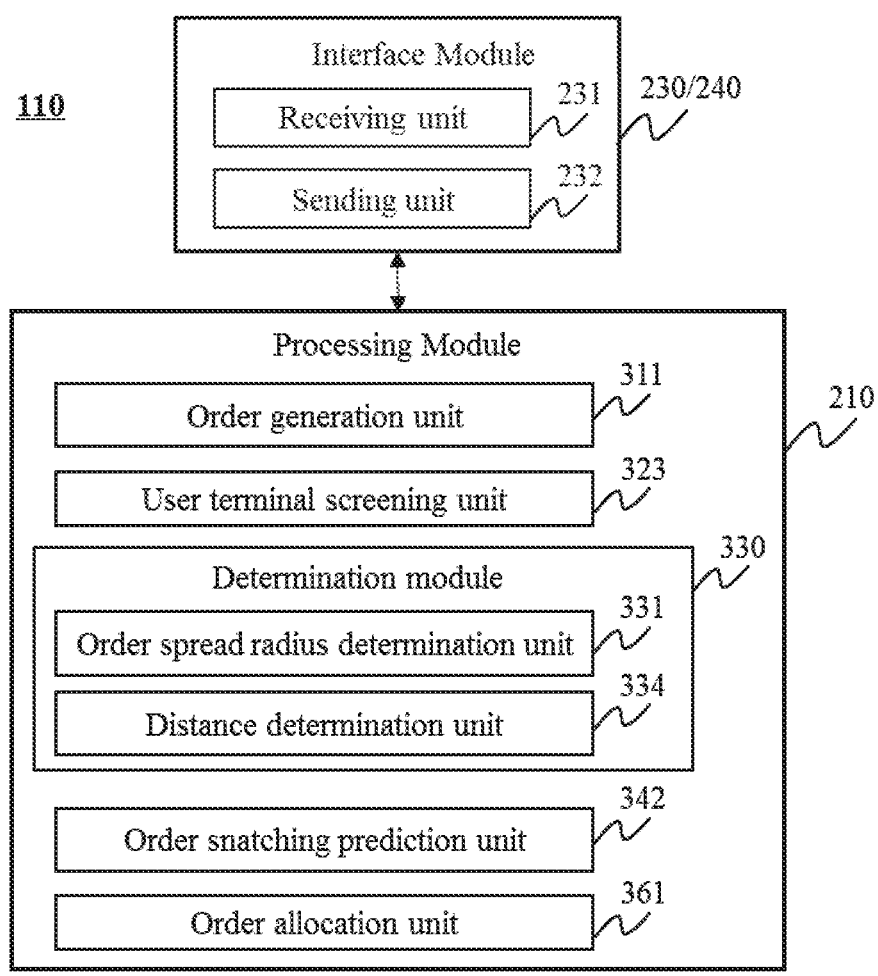
FIG. 18 is a schematic diagram of the order allocation system according to some embodiments of the present disclosure.

FIG. 18 is a schematic diagram of the order allocation system 110 according to some embodiments of the present disclosure. The order allocation system 110 may include one or more interface modules 230/240 and processing modules 210. The interface module 230/240 may further include one or more receiving units 231 and sending units 232. The processing module 210 may further include one or more order generation units 311, user terminal screening units 323, determination modules 330, order snatching prediction units 342, and order allocation units 361. The determination module 330 may further include one or more order spread radius determination units 331 and distance determination units 334. Relevant descriptions of the interface module 230/240, the receiving unit 231, and the sending unit 232 may be found in descriptions elsewhere in the present disclosure.

In some embodiments, the order generation unit 311 may be configured to generate an order based on the taxi-booking request when receiving the taxi-booking request from a user terminal.

In some embodiments, the user terminal screening unit 323 may be configured to obtain at least one user terminal within the order spread range according to the departure location of the order.

In some embodiments, the order spread radius determination unit 331 may be configured to obtain the order-related historical data in a first preset time period of a preset region. The current order spread range may then be determined based on the order-related historical data and the time information of the current order. In some embodiments, the range in which the order snatching probability is greater than the preset threshold in the preset time period may be determined as the current order spread range based on the departure location.

In some embodiments, the distance determination unit 334 may be configured to determine the distance between the current location of the terminal and the departure location of the order regarding to each user terminal obtained by the user terminal screening unit 323.

In some embodiments, the order snatching prediction unit 342 may be configured to obtain the order snatching probability of the user terminal using the pre-established order snatching prediction model, based on the distance and the current time information.

In some embodiments, the order allocation unit 361 may be configured to allocate the order based on the order snatching probability of the at least one user terminal. Specifically, when the at least one user terminal only includes one terminal, the order may be sent to the terminal. When the at least one user terminal includes multiple terminals, the order may be sent to the multiple terminals in the descending order by the order snatching probability of the multiple terminals.

In some embodiments, the order allocation system 110 may also include a prediction model building unit. The prediction model building unit may use the order-related historical data as the feature data. The prediction model building unit may use the linear regression model to train the feature data. The order snatching prediction model may then be obtained. The order-related historical data may include transaction distance of each transaction order, transaction time of each transaction order, driving time from the terminal to the departure location of the order, order snatching distance of each order canceled after response, order snatching time, order canceling time, distance from the terminal to the departure location of the order when the order is canceled, or the like, or any combination thereof. The linear regression model may be one of the Logistic regression model and the support vector machine model. The linear regression model may also be other models.

In some embodiments, the order allocation system 110 may also include a model optimization unit. The model optimization unit may be configured to optimize the order snatching prediction model using machine learning algorithms according to the order-related data acquired in real time. Relevant descriptions of machine learning algorithm may be found in descriptions elsewhere in the present disclosure.

It should be noted that the above description of the order allocation system 110 in FIG. 18 is merely provided for the purpose of illustration, and not intended to limit the scope of the present disclosure. For persons having ordinary skills in the art, various modifications and variations in form and detail may be conducted under the teaching of the present disclosure. However, those modifications and variations may not depart from the spirit and scope of this disclosure. For example, modules may be combined in various ways or connected with other modules as sub-systems. As another example, the determination module 330 may directly use the default order spread radius without the order spread radius determination unit. As still another example, the order allocation system 110 may directly screen the existing orders without the order generation unit 311. All such modifications are within the protection scope of the present disclosure.

Figure 19:
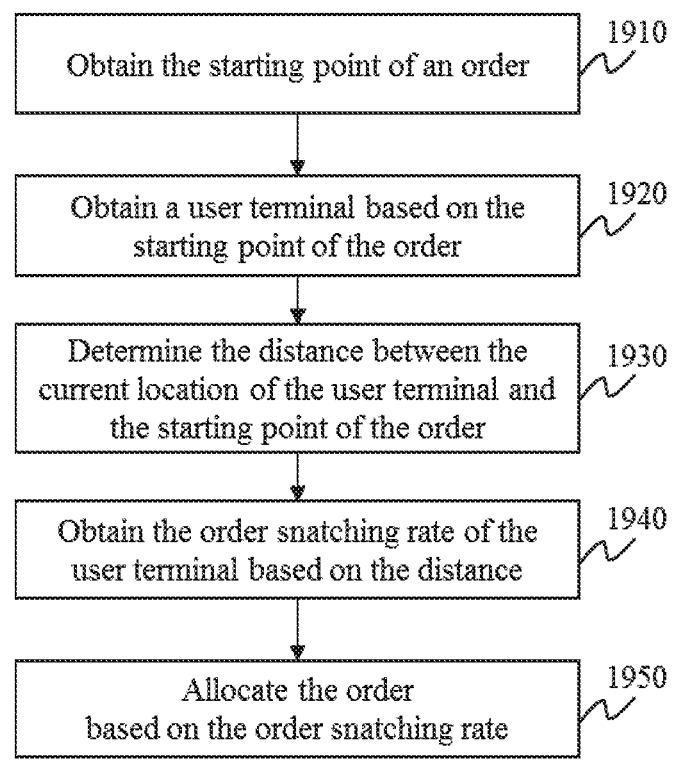
FIG. 19 is a flowchart of an exemplary process for allocating orders according to some embodiments of the present disclosure.

FIG. 19 is a flowchart of an exemplary process for allocating orders according to some embodiments of the present disclosure. The process may include the following steps.

In step 1910, after receiving the taxi-booking request of the user terminal, the order may be generated according to the taxi-booking request. The starting point of an order may then be obtained. For example, after receiving the taxi-booking request of the user terminal, the order generation unit 311 may generate an order according to the taxi-booking request and obtain the starting point of the order.

In step 1920, at least one user terminal in the order spread range of the order may be obtained according to the starting point of the order. For example, the user terminal screening unit 323 may be configured to obtain at least one user terminal in the order spread range of the order according to the starting point of the order. In some embodiments, the range where the order snatching probability of the order is greater than a preset threshold in a preset time period may be designated as the current order spread range based on the starting point. To facilitate understanding of the disclosure, an example is illustrated hereinafter. Merely by way of example, in order to increase the deal rate of the order, the preset threshold may be set as 100%. The order snatching probability of each order spread in the order spread range in the preset time period (e.g., yesterday) may then be determined as 100%. Specifically, the order spread range of the current order at the current time point may be determined according to the order-related historical data in the preset time period. The terminal(s) may be preliminary screened according to the order spread range (e.g., the longest order spread distance). The taxi-booking system may only send the order information to the terminal(s) in the order spread range and conduct order matching for the driver(s) most suitable to the order based on an optimum distance.

In step 1930, for each obtained terminal, the distance between the current location of the terminal and the departure location of the order may be determined. For example, for each obtained terminal, the distance determination unit 334 may determine the distance between the current location of the terminal and the departure location of the order. Specifically, the current location of the user terminal may be obtained using the positioning technology and sent to the taxi-booking system. The distance between the current location of the terminal and the departure location of the order may then be determined by the taxi-booking system. In some embodiments, the distance may be a straight line distance between the user terminal and the departure location of the order. The distance may also be an actual vehicle driving distance from the user terminal to the departure location of the order which may be acquired based on the positioning system and/or the actual road condition information.

In step 1940, the order snatching rate of the terminal may be obtained based on the distance and the current time information using the pre-established order snatching prediction model. For example, the order snatching prediction unit 342 may obtain the order snatching probability of the terminal according to the distance and the current time information using the pre-established order snatching prediction model. In some embodiments, the order snatching probability of the terminal regarding the order may be predicted according to the distance and the current time information obtained in step 1930. In some embodiments, the order snatching probability may be further predicted according to the distance between the departure location and the destination of the user, worth of the order, road condition information, etc. The order snatching probability of the terminal regarding the order may be influenced by the distance, the current time information, etc. The current time information may reflect the features such as a peak hour, a flat-peak hour, etc. For example, as 8:00 a.m. to 9:00 a.m. is peak hour, the order spread range and the order snatching probability may be surely influenced. The corresponding order snatching probability may be higher with the closer distance.

In step 1950, the order may be allocated according to the order snatching rate of at least one terminal. For example, the order allocation unit 361 may be configured to allocate the order according to the order snatching probability of at least one terminal. In some embodiments, if the at least one user terminally includes only one terminal, the order may be sent to the terminal. If the at least one user terminal includes multiple terminals, the order may be sent to the multiple terminals in the descending order by the order snatching probability of the multiple terminals.

In some embodiments, the following steps may also be included before step 1920.

Firstly, the order-related historical data of the preset region in the first preset time period may be obtained. The order-related historical data may include each transaction order's transaction distance, transaction time, elapsed time of the terminal to arrive at the departure location of the order, order snatching distance of each cancelled order after responding, order snatching time, order canceling time, distance between the terminal and the departure location of the order when the order is canceled, or the like, or any combination thereof. In some embodiments, the preset region may be a geographic region such as different regions of a city or different cities.

The order spread range of the current order may then be determined according to the order-related historical data and the time information of the current order. Specifically, the order-related historical data may be analyzed. For example, statistics analysis on the order-related historical data by the hour and region may be performed. The longest order spread distance (i.e., an order spread scope) of the order in different regions and different time periods may be obtained. The order spread range of the current order may be further determined according to the current order information such as the time information, the departure information, etc. The longest order spread distance in different regions and different time periods may be obtained in the two steps described above.

In some embodiments, the order spread range may be dynamically and continually updated. In some embodiments, the order spread range may be predicted according to the corresponding features such as whether the new order is snatched, an order snatching distance, an order snatching time, an order snatching region, etc. For example, the order spread range of the order received today may be predicted according to the order-related historical data of yesterday.

In some embodiments, before step 1920, the order snatching prediction model may be obtained by taking the order-related historical data as the feature data and training the feature data using the linear regression model. The linear regression model may be one of a logistic regression model and a support vector machine model. The linear regression model may also be any other model. Relevant descriptions of the logistic regression model may be found in descriptions elsewhere in the present disclosure.

In some embodiments, before step 1920, the order snatching prediction model may also be optimized using machine learning algorithms based on the order-related data obtained in real-time online. The accuracy of the logistic regression model may also be continuously improved by continuously adding the related features such as whether the new order is snatched or not. The order snatching prediction may be divided into two stages containing off-line training and online real-time computing. In the offline training stage, various feature data (e.g. the order related features, the terminal related features, the order and terminal related features, etc.) may be extracted as the predictive variable when the order is spreading. Whether the terminal snatches the order or not may be taken as the target variable. The model training may be conducted to the historical data of the order spreading and the order snatching. The order snatching prediction model may then be obtained. In the online real-time computing stage, the model may be applied online. The road distance between the current departure location of the order and the current location of the terminal may be determined. Relevant descriptions of the machine learning algorithm may be found in descriptions elsewhere in the present disclosure.

It should be noted that the above description of the order allocation process in FIG. 19 is merely provided for the purpose of illustration, and not intended to limit the scope of the present disclosure. For persons having ordinary skills in the art, various modifications and variations in form and detail may be conducted under the teaching of the present disclosure. However, those modifications and variations may not depart from the spirit and scope of this disclosure. For example, steps may be integrated in various ways. As another example, the order spread scope may be updated at any time. As still another example, the order snatching rate of the order recipient may be trained using a decision tree model. All such modifications and variations are within the protection scope of the present disclosure.

Figure 20:
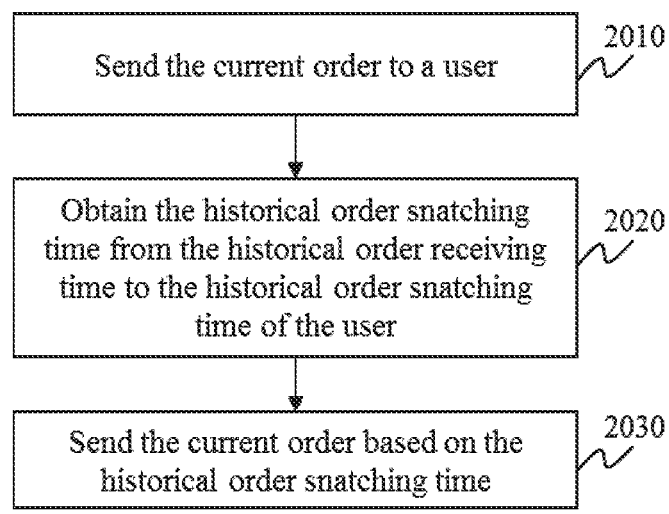
FIG. 20 is a flowchart of an exemplary process for allocating orders according to some embodiments of the present disclosure.

FIG. 20 is a flowchart of an exemplary process for allocating orders according to some embodiments of the present disclosure. As shown in the figure, the current order may be sent to a user in step 2010. For example, the sending unit 232 (as shown in FIG. 3) may send the current order to the user. Relevant descriptions of order types, order information, etc., may be found in the present disclosure. In step 2020, the historical order snatching time from the historical order receiving time to the historical order snatching time of the user may be obtained. For example, the user information acquisition unit 324 (as shown in FIG. 3) may obtain the historical order snatching time of the user. The historical order snatching time may refer to the order snatching time from the order receiving time to the order snatching time of historical order(s). For example, if there are multiple historical orders, the historical order snatching time of all the historical orders or a part thereof in a preset time period may be obtained. In step 2030, the current order may be sent based on the historical order snatching time. For example, the determination module 330 (as shown in FIG. 3) may send the current order based on the historical order snatching time.

In some embodiments, step 2030 may further include the following two steps:

C01, it may be determined that the user does not snatch the order at a preset time. For example, a timer may be set for the user. Whether the user snatches the order or not at the preset time may be determined. If the user snatches the order, the historical order snatching time from the order receiving time to the order snatching time of the user may be recorded.

C02, the order snatching rate of the user after the preset time may be determined based on the historical order snatching time. In some embodiments, the order snatching rate may be determined according to the following steps: determining the order snatching times of the user regarding all historical orders, determining the order snatching times of the user after the preset time, and determining the order snatching rate of the user after the preset time. In some embodiments, the order snatching rate may be determined according to the following steps: determining multiple order snatching time periods based on the historical order snatching time, determining the order snatching rate of the user in the order snatching time period that contains the historical order snatching time, and determining the order snatching rate of the user in the order snatching time period after the preset time. In some embodiments, the order snatching rate in the order snatching time period that contains the historical order snatching time may be determined based on the order snatching times of the user regarding to all the historical orders and the order snatching times of the user in the order snatching time period that contains the historical order snatching time.

In some embodiments, the deal rate of the current order may be primarily determined based on the order snatching rate. For example, the deal rate of the current order may be determined as $P_{deal\ rate}=1-(1-P_1)\times(1-P_2)\times(1-P_n)$, wherein $P_{deal\ rate}$ is the deal rate of the current order and $P_n$ is the order snatching rate of the user n after the preset time. The current order may then be sent based on the deal rate. For example, multiple current orders containing the current order may be sent in the descending order by the numerical value of order snatching rate×(1−deal rate). Higher priority may be achieved when the order snatching rate is higher. In some embodiments, higher priority may be achieved when the deal rate of the order is lower. In some embodiments, the order snatching rate and the deal rate may be considered synthetically.

Figure 21A:
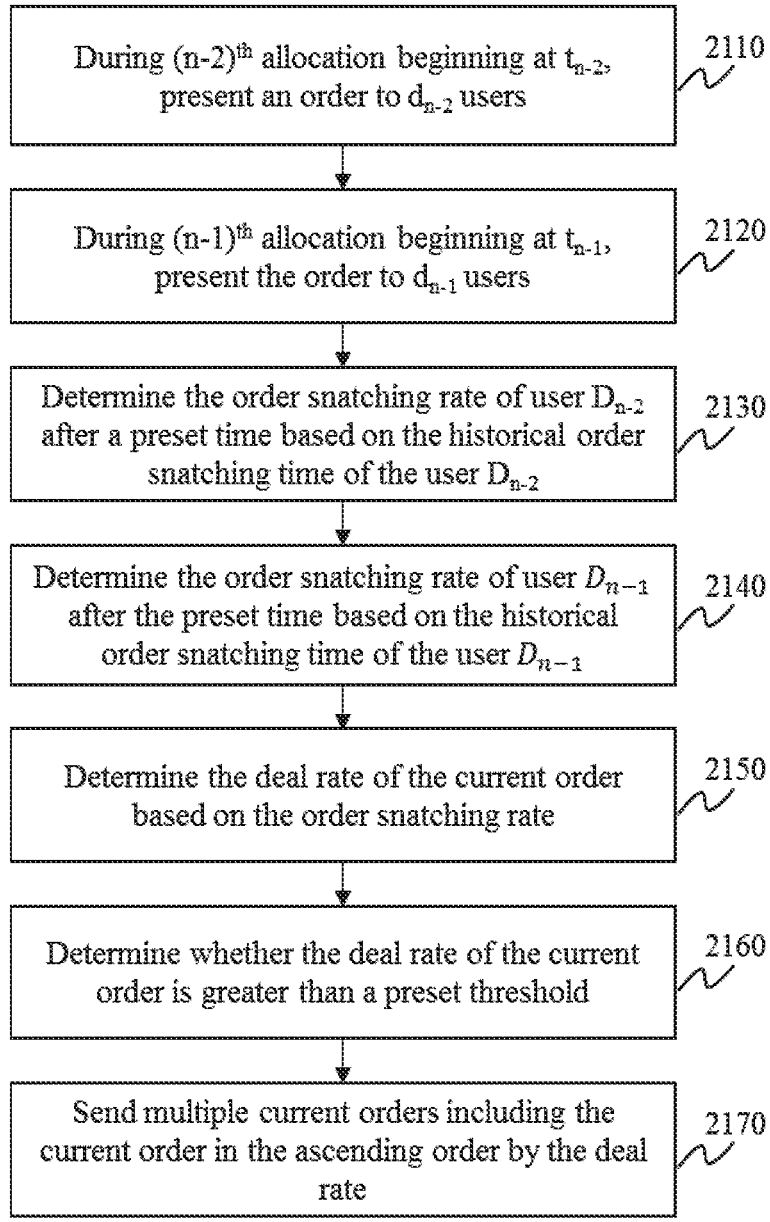
FIG. 21A is a flowchart of an exemplary process for allocating orders according to some embodiments of the present disclosure.

FIG. 21A is a flowchart of an exemplary process for allocating orders according to some embodiments of the present disclosure. For convenience, FIG. 21A may be taken as an example to illustrate the order allocation process, which is not intended to be limiting.

In step 2110, during the $(n-2)^{th}$ allocation beginning at the time $t_{n-2}$, an order may be presented or spread to $d_{n-2}$ users. It should be noted that the symbol $D_{n-2}$ may represent a user of the $d_{n-2}$ users.

In step 2120, during the $(n-1)^{th}$ allocation beginning at the time $t_{n-1}$, the order may be presented and spread to $d_{n-1}$ users. It should be noted that the symbol $D_{n-1}$ may represent a user of the $d_{n-1}$ users.

In step 2130, if the user $D_{n-2}$ does not snatch the order in the preset time within the time period from $t_{n-2}$ to $t_n$ during the $n^{th}$ allocation beginning at the time $t_n$, the order snatching rate of the user $D_{n-2}$ after the preset time may be determined based on the historical order snatching time from the order receiving time to the order snatching time of the user $D_{n-2}$ regarding the historical order, such as P (i.e., the user $D_{n-2}$ snatches the order after the time $t_n$). Specifically, the order snatching rate may be determined as equation 7 (e.g., a conditional probability computational equation):

$$P(\text{the user } D_{n-2} \text{ snatches the order after } t_n) = P(\text{the user } D_{n-2} \text{ snatches the order after } t_{n-2}) \times P(\text{the user } D_{n-2} \text{ snatches the order after } t_n | \text{the user } D_{n-2} \text{ snatches the order after } t_{n-2}), \quad \text{(Equation 7)}$$

wherein P (the user $D_{n-2}$ snatches the order after $t_{n-2}$) may represent the order snatching rate of the user $D_{n-2}$ regarding the current order. It is understood for those skilled in the art that the order snatching rate may represent an order snatching intention, which may depend on multiple factors in general including a distance between the starting point of the current order and the current location of the user $D_{n-2}$, a distance between the starting point of the current order and the destination, whether the starting point of the order is near a current driving route of the user $D_{n-2}$, or the like, or any combination thereof.

When the user $D_{n-2}$ is willing to snatch the order, P (the user $D_{n-2}$ snatches the order after $t_n$|the user $D_{n-2}$ snatches the order after $t_{n-2}$) may represent the probability of conducting the order snatching operation that needs more time than the time from $t_{n-2}$ to t. It is understood for those skilled in the art that the probability may represent an order snatching capability, which may depend on multiple factors in general including the user $D_{n-2}$ spends more time to listen in to the current order, the user $D_{n-2}$ spends more time to decide whether to snatch the order or not, the user $D_{n-2}$ spends more time to conduct the order snatching operation due to cautiously driving, etc.

According to some embodiments of the present disclosure, P (the user $D_{n-2}$ snatches the order after $t_n$|the user $D_{n-2}$ snatches the order after $t_{n-2}$) may be determined as the follows methods.

Method 1

Firstly, the order snatching times of the user $D_{n-2}$ for all historical orders may be determined. For example, the order snatching times of the user $D_{n-2}$ for the historical orders in a past time period (e.g., a week, a month, a year, etc.) may be determined.

Secondly, the order snatching times of the user $D_{n-2}$ after a preset time may be determined. For example, the order snatching times of the user $D_{n-2}$ after to in the past time period (e.g., a week, a month, a year, etc.) may be determined.

Thirdly, according to the two order snatching times, P (the user $D_{n-2}$ snatches the order after $t_n$|the user $D_{n-2}$ snatches the order after $t_{n-2}$) may be determined. For example, P (the user $D_{n-2}$ snatches the order after $t_n$|the user $D_{n-2}$ snatches the order after $t_{n-2}$) may be a quotient of the latter order snatching times to the former snatching times.

Method 2

Firstly, the order snatching rate of the user $D_{n-2}$ in the order snatching time period that contains the historical order snatching time may be determined.

Specifically, the order snatching times of the user $D_{n-2}$ for all historical orders may be determined. The order snatching times of the user $D_{n-2}$ in the order snatching time period that contains the historical order snatching time may be determined. The order snatching rate of the user $D_{n-2}$ in the order snatching time period that contains the historical order snatching time may then be determined based on the two order snatching times. For example, the order snatching rate of the user $D_{n-2}$ in the order snatching time period that contains the historical order snatching time may be a quotient of the latter order snatching times to the former snatching times.

Figure 21B:
FIG. 21B is a schematic diagram of an exemplary distribution of order snatching time according to some embodiments of the present disclosure.

FIG. 21B is a schematic diagram of an exemplary distribution of historical order snatching time according to some embodiments of the present disclosure. In some embodiments, the probability described above may be determined based on the distribution of historical order snatching time shown in FIG. 21B. As shown in FIG. 21B, regarding the historical orders broadcasted at the time $t_{n-2}$, the order snatching rate corresponding to the order snatching time period may be determined based on a probability density curve at each follow-up time point. For example, the order snatching rate of the user $D_{n-2}$ within the historical order snatching time from $t_n$ to $t_{n+1}$ may be determined as the area of the graph that is surrounded by the probability density curve and x-axis within the historical order snatching time from $t_n$ to $t_{n+1}$. Similarly, the order snatching rate of the user $D_{n-2}$ within the historical order snatching time from $t_{n-1}$ to $t_{n+2}$ may be determined as the area of the graph that is surrounded by the probability density curve and x-axis within the historical order snatching time from $t_{n+1}$ to $t_{n-2}$.

Secondly, the sum of the order snatching rate of the user $D_{n-2}$ within the order snatching time period after the preset time may be determined. For example, the sum of and the order snatching rate of the user $D_{n-2}$ in the historical order snatching time from $t_n$ to $t_{n+1}$ and the order snatching rate of the user $D_{n-2}$ in the historical order snatching time from $t_{n+1}$ to $t_{n+2}$ may be determined. The probability may be determined as the area of the graph that is surrounded by the probability density curve and x-axis within the historical order snatching time from $t_n$ to $t_{n+2}$.

In step 2140, if the user $D_{n-1}$ does not snatch the order in the preset time from $t_{n-1}$ to $t_n$ during the $n^{th}$ allocation beginning at $t_n$, the order snatching rate of the user $D_{n-1}$ after the preset time may be determined based on the historical order snatching time from the order receiving time to the order snatching time of the user $D_{n-1}$ for the historical orders, e.g., P (the user $D_{n-1}$ snatches the order after $t_n$).

It should be understood that for those skilled in the art, step 1240 is similar to step 1230, and it will not be further described herein. Meanwhile, it should also be understood that for those skilled in the art, steps 1240 and 1230 may not be performed in a strict sequence. For example, step 1240 may be performed before step 1230. Steps 1240 and 1230 may be performed simultaneously.

In step 2150, the deal rate of the current order may be determined based on the order snatching rate determined in step 2130 and the order snatching rate determined in step 2140. For example, the deal rate may be determined based on Equation 8:

$$P_{deal\ rate} = 1(1 - P(\text{the user } D_{n-2} \text{ snatches the order after } t_n)) \times (1 - P(\text{the user } D_{n-1} \text{ snatches the order after } t_n)), \quad \text{(Equation 8)}$$

Alternatively or additionally, before the deal rate of the current order is determined, whether the order snatching rate determined in step 1230 and the order snatching rate determined in step 1240 are greater than the preset threshold of order snatching rate may be determined. In some embodiments, the influence of the users with lower order snatching rate to the deal rate may be avoided. The order snatching threshold may be a numerical value or a numerical interval.

In step 1260, whether the deal rate of the current order determined in the judgment step 1250 is greater than the preset deal rate threshold may be determined. If the deal rate of the current order determined in step 1250 is greater than the preset deal rate threshold, it may indicate that the current order has already been presented or spread to enough users. Sending of the current order may then be stopped during the $n^{th}$ allocation, and the process may conclude. If the deal rate of the current order determined in step 1250 is no greater than the preset deal rate threshold, the process may proceed to step 2170.

In step 2170, multiple current orders may be sent in the ascending order by the deal rate determined in step 1250. The current orders with lower deal rate during the $n^{th}$ allocation may then be presented or spread with more times. For example, multiple current orders containing the current order may be sent in descending order by the numerical value of order snatching rate×(1−deal rate). Higher priority may be achieved when the order snatching rate is higher. In some embodiments, higher priority may also be achieved when the deal rate of the order is lower. In some embodiments, the order snatching rate and the deal rate may be considered synthetically.

It should be noted that the above description of the order allocation process is merely provided for the purposes of illustration, and not intended to limit the scope of the present disclosure. For persons having ordinary skills in the art, variations may be conducted to the order allocation process under the teaching of the present disclosure. However, those variations may not depart from the spirit and scope of this disclosure. For example, the steps in FIG. 21A may be executed in a changed sequence. Some steps may be omitted. Some steps may be added. Multiple steps may be integrated into one step. A step may be divided into multiple steps. For example, steps 2120 and 2130 may be performed in various sequences or simultaneously. Steps 2120 and 2130 may be integrated into one step. All such variations are within the protection scope of the present disclosure.

Figure 22:
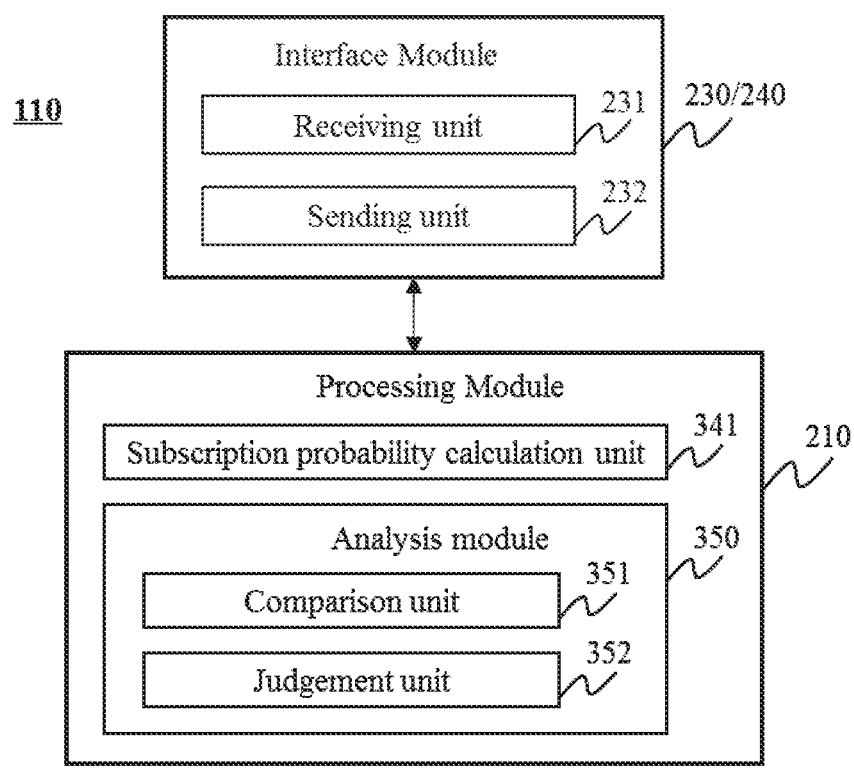
FIG. 22 is a schematic diagram of the order allocation system according to some embodiments of the present disclosure.

FIG. 22 is a schematic diagram of the order allocation system 110 according to some embodiments of the present disclosure. As shown in the figure, the order allocation system 110 may include one or more interface modules 230/240 and processing modules 210. The interface module 230/240 may further include one or more receiving units 231 and sending units 232. The processing module 210 may further include one or more subscription probability calculation units 341 and analysis modules 350. The analysis module 350 may further include one or more comparison units 351 and judgement units 352.

In some embodiments, the receiving unit 231 may be configured to receive the taxi-booking request sent from a user terminal.

In some embodiments, the sending unit 232 may be configured to generate the order information based on the taxi-booking request acquired by the receiving unit 231 and send the order information to a first terminal. Specifically, the order information may be sent to the first terminal according to an order allocation strategy. The order information may include a preset range based on a departure location. The order information may be sent to any terminal in the preset range.

In some embodiments, the subscription probability calculation unit 341 may be configured to obtain a probability of the order information being subscribed based on an initial order snatching rate and an order snatching attenuation character of the first terminal. The initial order snatching rate of the first terminal may be an initial order snatching rate generated based on the order information. The order snatching attenuation character of the first terminal may be acquired in advance based on the order-related historical data of the first terminal. Specifically, the subscription probability calculation unit 341 may generate the initial order snatching rate $s(t_0)$ of the first terminal based on the order information. The order information may include the user terminal's departure, a destination, a user indication, a time of generation of the order, location information of the first terminal, or the like, or any combination thereof. The subscription probability calculation unit 341 may then search the pre-established order snatching attenuation character $f_0(t)$ of the first terminal. The probability $P_{sr}$ of the order information being subscribed may be determined as Equation 9:

$$P_{sr}=1-(1-s(t_0)f_0(t))^* \ldots *(1-s(t_n)f_n(t)), \quad \text{(Equation 9)}$$

wherein $s(t_n)$ may indicate the initial order snatching rate of the $(N+1)^{th}$ terminal, n may be a positive integer greater than or equal to 0, and $f_n(t)$ may represent the order snatching attenuation character of the $(N+1)^{th}$ terminal. In some embodiments, $f_0(0), \ldots, f_n(0)$ may be set as 1.

To facilitate understanding of the present disclosure, an example of the subscription probability calculation may be illustrated. If order information is sent to the first terminal, the second terminal, and the $(N+1)^{th}$ terminal at $t_0$, $t_1$, and $t_n$, respectively, the probability of the order being subscribed at $t(n+1)$ may be calculated according to the initial order snatching rate and the order snatching attenuation character of the (N+1) terminals. The influence of order spread history to the order subscription probability may then be predicted accurately.

In some embodiments, the comparison unit 351 may be configured to compare the subscription probability with a preset threshold to obtain a comparison result.

In some embodiments, the judgment unit 352 may be configured to determine whether to send the order information to the $N^{th}$ terminal or not based on the comparison result. N may be a positive integer greater than or equal to 2. The terminals from the first terminal to the $N^{th}$ terminal may all be used to provide an operation service for the user terminal.

In some embodiments, when the subscription probability is lower than the preset threshold, the judgment unit 352 may send the order information to the $N^{th}$ terminal. The judgment unit 352 may also obtain the initial order snatching rate and the order snatching attenuation character of the $N^{th}$ terminal. The initial order snatching rate of the $N^{th}$ terminal may be the initial order snatching rate generated based on the order information. The order snatching attenuation character of the $N^{th}$ terminal may be acquired in advance based on the order-related historical data of the $N^{th}$ terminal. The subscription probability of the order information being subscribed may be obtained based on the initial order snatching rate and the order snatching attenuation character of all the terminals that are used to send the order information. The subscription probability may then be compared with the preset threshold.

In some embodiments, the order allocation system 110 may also include a presetting unit that may be configured to establish the order snatching attenuation character of each terminal based on the order-related historical data of the terminal. Specifically, regarding each terminal, the presetting unit may obtain the order-related historical data including order spreading time information and order snatching time information of multiple orders corresponding to each terminal. The order spreading time information may be a time point of the order information being spread to the terminal. The order snatching time information may be a time point of the order information being subscribed by the terminal. The order snatching attenuation character of the terminal may be obtained based on the historical data.

In some embodiments, the presetting unit may also analyze a value difference between the order spreading time information and the order snatching time information corresponding to order information in the historical data. The presetting unit may determine a time-based order snatching attenuation character of the terminal. The presetting unit may then obtain the order snatching attenuation character of the terminal.

In some embodiments, the order allocation system 110 may also include a redundancy eliminating unit. The redundancy eliminating unit may be configured to remove redundant data in the historical data. The redundant data may include information regarding multiple spreading time points when the same order information is spread to the same terminal. The redundant data may also include information regarding multiple order snatching time points when the same terminal subscribes to the same order information. Specifically, if there are multiple order spreading time points when the same order information is spread to the same terminal, the latest order spreading time information may be reserved among the multiple order spreading time points. If there are multiple order snatching time points when the same terminal subscribes to the same order information, the earliest order snatching time information may be reserved among the multiple order snatching time points.

It should be noted that the above description of the order allocation system 110 in FIG. 22 is merely provided for the purpose of illustration, and not intended to limit the scope of the present disclosure. For persons having ordinary skills in the art, various modifications and variations in form and detail may be conducted under the teaching of the present disclosure. However, those modifications and variations may not depart from the spirit and scope of this disclosure. Modules may be combined in various ways, or connected with other modules as sub-systems. For example, the comparison unit 351 and the judgment unit 352 may be combined into an analysis unit which may be used for the comparison and judgment of the subscription probability. As another example, the order allocation system 110 may directly screen and allocate the existing orders without the order receiving unit 231. All such modifications and variations are within the protection scope of the present disclosure.

Figure 23:
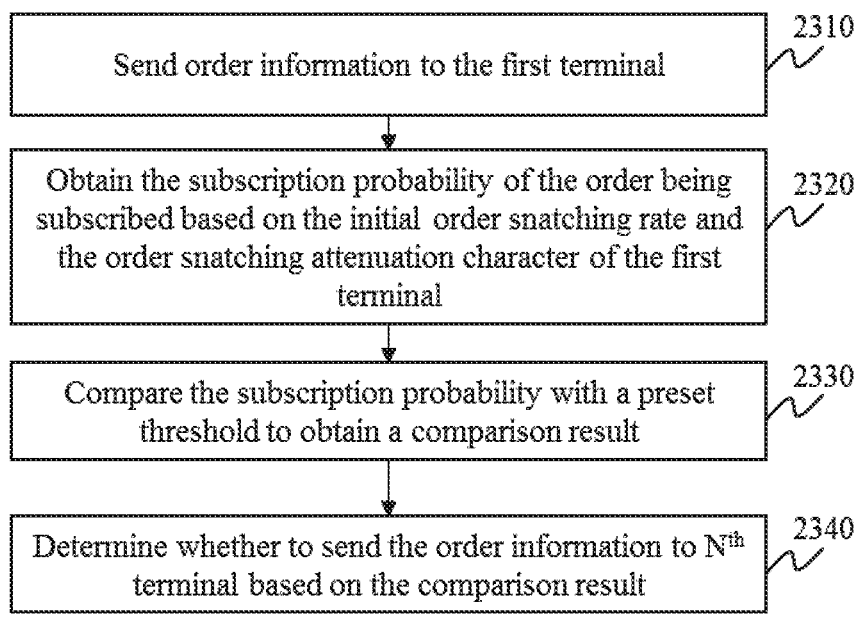
FIG. 23 is a flowchart of an exemplary process for allocating orders according to some embodiments of the present disclosure.

FIG. 23 is a flowchart of an exemplary process for allocating orders according to some embodiments of the present disclosure. The process may include the following steps.

In step 2310, the order information may be generated based on the taxi-booking request and sent to the first terminal. For example, the sending unit 232 may be configured to send the order information generated based on the taxi-booking request obtained by the receiving unit 231 to the first terminal. Specifically, the order information may be sent to the first terminal based on an order allocation strategy. The order information may include the preset scope predetermined based on the departure location. The order information may be sent to any terminal in the preset scope.

In step 2320, the subscription probability of the acquired order information being subscribed may be determined based on the initial order snatching rate and the order snatching attenuation character of the first terminal. For example, the subscription probability calculation unit 341 may determine the subscription probability of the acquired order information being subscribed based on the initial user order snatching rate and the order snatching attenuation character of the first terminal. The initial order snatching rate of the first terminal may be an initial order snatching rate generated based on the order information. Specifically, the subscription probability calculation unit 341 may be configured to generate the initial order snatching rate $s(t_0)$ of the first terminal based on the order information such as the user terminal's departure, destination, user indication, order generating time, location information of the first terminal, or the like, or any combination thereof. The subscription probability calculation unit 341 may then search the pre-established order snatching attenuation character $f_0(t)$ of the first terminal and obtain the subscription probability $P_{sr}$ of the acquired orders being subscribed using the subscription probability computational equation. Relevant descriptions of the subscription probability calculation may be found in the embodiments of the system 110 in the present disclosure.

In step 2330, the comparison result may be obtained by comparing the subscription probability with a preset threshold. For example, the comparison unit 351 may be configured to obtain the comparison result by comparing the subscription probability with the preset threshold. The preset threshold may be set according to the required order probability. For example, if the required subscription probability is 95%, the preset threshold may be set as 95%. If the current subscription probability is greater than or equal to 95%, sending of the order information to other terminals may be stopped. If the current subscription probability is lower than 95%, the order information may be continually sent to other terminals.

In step 2340, whether to send the order information to the $N^{th}$ terminal or not may be determined based on the comparison result. For example, the judgment unit 352 may determine whether to send the order information to the $N^{th}$ terminal or not according to the comparison result obtained in step 2330. N may be a positive integer greater than or equal to 2. The terminals from the first terminal to the $N^{th}$ terminal may all be used for providing the operation service for the user terminal. Specifically, if the subscription probability is lower than the preset threshold, the order information may be continually sent to another terminal. If the subscription probability is greater than or equal to the preset threshold, sending the order information may be stopped.

In some embodiments, step 2340 may further include the following steps. When the subscription probability is lower than the preset threshold, the order information may be sent to the $N^{th}$ terminal. The initial order snatching rate and the order snatching attenuation character of the $N^{th}$ terminal may be obtained. The subscription probability of the order being subscribed may be obtained according to the initial order snatching rate and the order snatching attenuation character of all the terminals that send the order information. The subscription probability and the preset threshold may then be compared. The initial order snatching rate of the $N^{th}$ terminal may be the initial order snatching rate generated based on the order information. The order snatching attenuation character of the $N^{th}$ terminal may be obtained in advance according to the order-related historical data of the $N^{th}$ terminal. If the subscription probability is still lower than the preset threshold, the order information may be continually sent to other terminals until the accumulated subscription probabilities of the order information reached the preset threshold.

In some embodiments, the taxi-booking request sent from the user terminal may be received before step 2310.

In some embodiments, before step 2310, the order snatching attenuation character of the terminal may be established according to the order-related historical data of each terminal. Specifically, following steps may be included. Regarding each terminal, the historical data of the terminal corresponding to the order spread time information and the order snatching time information of multiple orders may be obtained. The order snatching attenuation character of the terminal may then be obtained according to the historical data. The order spread time information may be the time point of the order information being spread to the terminal. The order snatching time information may be the time point of the terminal subscribing the order information. In some embodiments, the order snatching attenuation character of each terminal may be established when each terminal has sufficient historical data of order snatching. If the historical data of order snatching is deficient, regarding different cities and different order types, the time decay curve of the order information being subscribed by terminals of each city may be determined and obtained using the user terminal ID as a key value. With the order snatching attenuation character of the terminal being replaced by the time decay curve, the subscription probability may be further determined according to the curve. The order type may include a booking order, a real-time order, etc.

In some embodiments, when there is redundant data in the historical data, the redundant data in the historical data may be removed. The redundant data may include information regarding multiple order spreading time points when the same order information is spread to the same terminal. The redundant data may include information regarding multiple order snatching time points when the same terminal subscribes to the same order information. Specifically, if there are multiple order spreading time points when the same order information is spread to the same terminal, the latest order spreading time information may be reserved for the multiple order spreading time points. If there are multiple order snatching time points when the same terminal subscribes to the same order information, the earliest order snatching time information may be reserved for the multiple order snatching time points.

In some embodiments, after the redundant information in the historical data is removed, the order snatching attenuation character may be obtained according to the historical data without the redundant data. Specifically, the difference between the order spread time information and the order snatching time information corresponding to order information of the historical data may be analyzed. The character of the order snatching probability attenuating with a time of the terminal may be determined. The order snatching attenuation character of the terminal may then be obtained.

Figure 24:
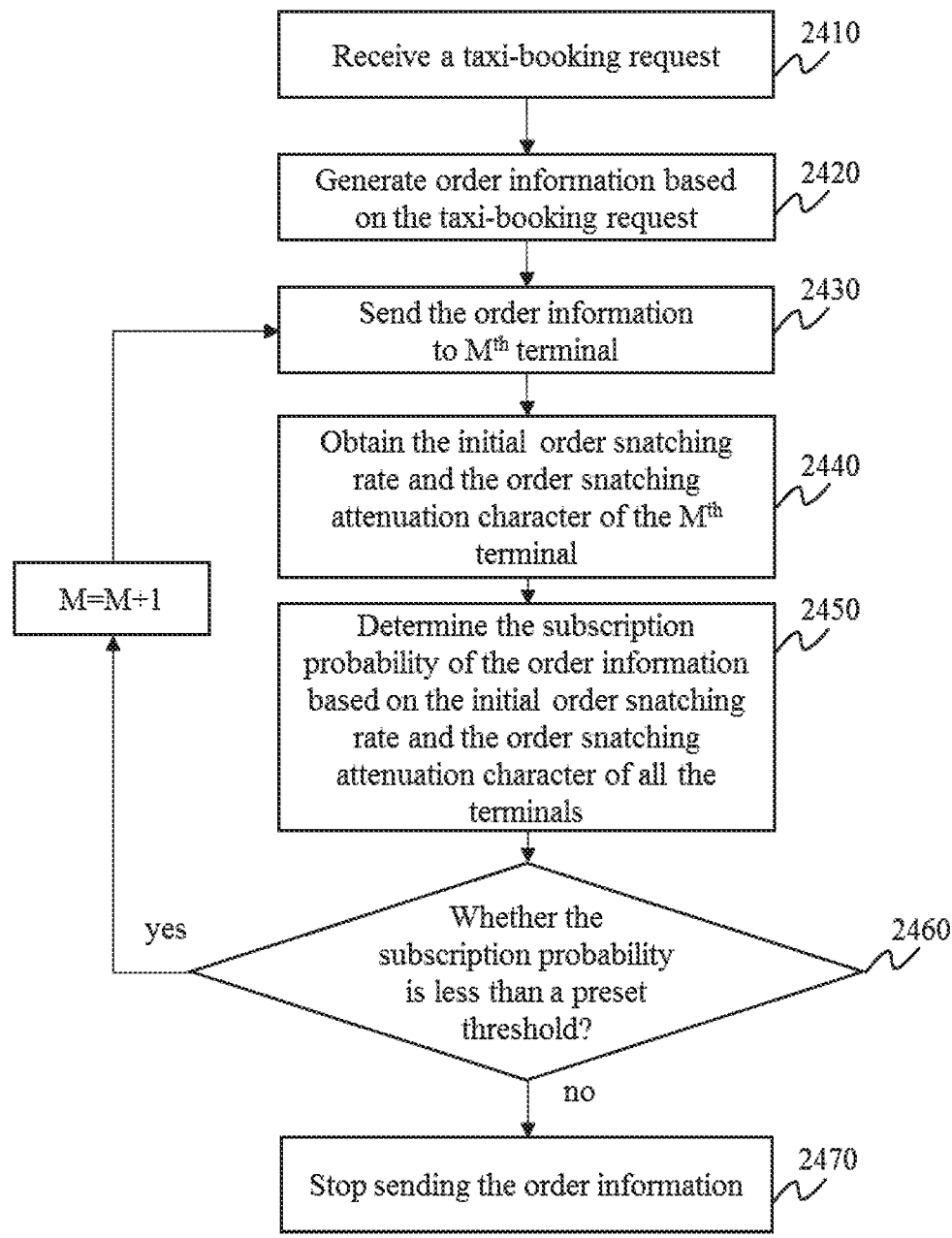
FIG. 24 is a flowchart of an exemplary process for allocating orders according to some embodiments of the present disclosure.

FIG. 24 is a flowchart of an exemplary process for allocating orders according to some embodiments of the present disclosure. The process may include the following steps.

In steps 2410 and 2420, the order information may be generated according to the taxi-booking request. For example, the receiving unit 231 may be configured to receive the taxi-booking request sent from the user terminal and generate the order information according to the taxi-booking request.

In step 2430, the order information may be sent to the $M^{th}$ terminal. For example, the sending unit 232 may be configured to send the order information to the $M^{th}$ terminal; wherein M may be a positive integer greater than or equal to 1.

In step 2440, the initial order snatching rate and the order snatching attenuation character of the $M^{th}$ terminal may be obtained. Relevant descriptions of the initial order snatching rate and the order snatching attenuation character may be found in descriptions elsewhere in the present disclosure.

In step 2450, the subscription probability of the order being subscribed may be determined based on the initial order snatching rate and the order snatching attenuation character of all the terminals that send the order information. For example, the subscription probability calculation unit 341 may be configured to calculate the subscription probability of the order being subscribed according to the initial order snatching rate and the order snatching attenuation character of all the terminals that send the order information. Relevant descriptions of the prediction of the subscription probability may be found in descriptions elsewhere in the present disclosure.

In step 2460, the subscription probability may be compared with the preset threshold. For example, the comparison unit 351 may be configured to compare the subscription probability with the preset threshold. If the subscription probability is lower than the preset threshold, the calculation M=M+1 may be performed, and the process may loop back to step 2430. If not, the process may proceed to step 2470 and stop sending the order information.

It should be noted that the above description of the order allocation process in FIG. 23 and FIG. 24 is merely provided for the purpose of illustration, and not intended to limit the scope of the present disclosure. For persons having ordinary skills in the art, various modifications and variations in form and detail may be conducted under the teaching of the present disclosure. However, those modifications and variations may not depart from the spirit and scope of this disclosure. For example, steps may be integrated in various ways. As another example, the preset threshold may be manually updated at any time. The preset threshold may also be automatically updated according to system feedback information. As still another example, the historical data may also be updated or replaced at any time. All such modifications and variations are within the protection scope of the present disclosure.

Figure 25:
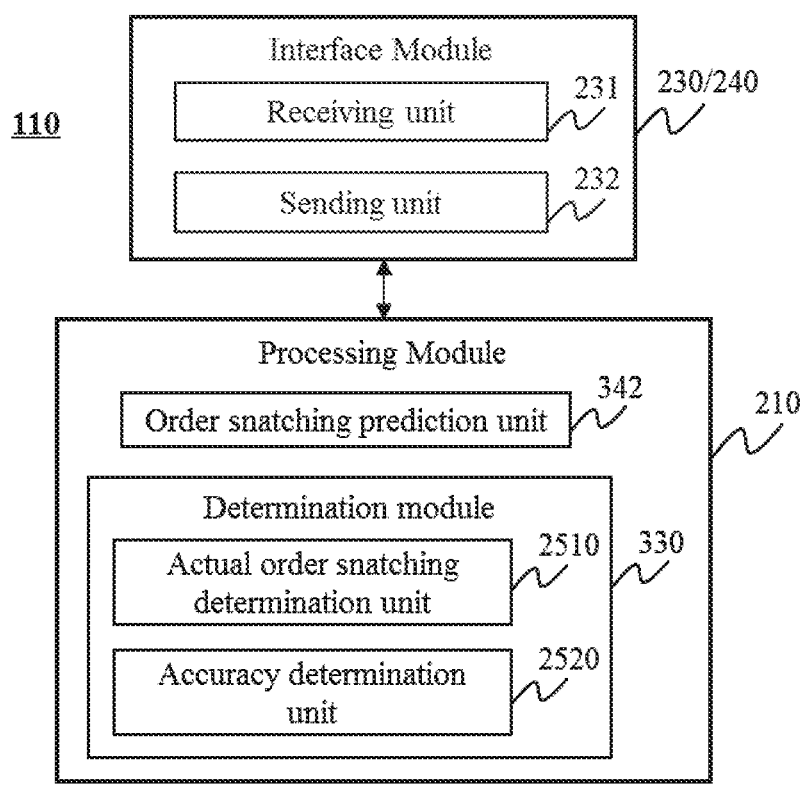
FIG. 25 is a schematic diagram of the order allocation system according to some embodiments of the present disclosure.

FIG. 25 is a schematic diagram of the order allocation system 110 according to some embodiments of the present disclosure. As shown in FIG. 25, the order allocation system 110 may include one or more interface modules 230/240 and processing modules 210. The interface module 230/240 may further include one or more receiving units 231 and sending units 232. The processing module 210 may further include one or more order snatching prediction units 342 and determination modules 330. The determination module 330 may further include one or more actual order snatching determination units 2510 and accuracy determination units 2520. Relevant descriptions of the interface module 230/240, the receiving unit 231, and the sending unit 232 may be found in descriptions elsewhere in the present disclosure.

In some embodiments, the order snatching prediction unit 342 may be configured to predict a probability of a user conducting an order snatching operation regarding an order. The actual order snatching determination unit 2510 may be configured to determine a probability of a user conducting the order snatching operation regarding the order. The accuracy determination unit 2520 may be configured to determine an accuracy of the prediction based on the predicted probability and the determined probability.

In some embodiments, the order snatching prediction unit 342 may include an extraction unit and a prediction unit. The extraction unit may be configured to extract features of the order. The prediction unit may be configured to predict a probability of the user performing an order snatching operation on the order based on prediction weights corresponding to the features.

In some embodiments, the actual order snatching determination unit 2510 may include a first determination unit, a second determination unit, and a third determination unit. The first determination unit may be configured to determine the number of order snatching operations that a user performs regarding an order. The second determination unit may be configured to determine times that the order is broadcasted to the user. The third determination unit may be configured to determine a probability that the user performs an order snatching operation regarding an order based on the number of order snatching operations and the times of broadcast.

In some embodiments, the accuracy determination unit 2520 may include a fourth determination unit. The fourth determination unit may be configured to designate a relative difference between the predicted probability and the determined probability as an accuracy of the prediction.

In some embodiments, the actual order snatching determination unit 2510 may further include a fifth determination unit, a sixth determination unit, and a seventh determination unit. The fifth determination unit may be configured to determine the number of order snatching operations that a user performs regarding multiple orders. The sixth determination unit may be configured to determine times that the multiple orders are broadcasted to the user. The seventh determination unit may be configured to determine a probability that the user performs order snatching operations on multiple orders based on the number of order snatching operations and the times of broadcast.

In some embodiments, the accuracy determination unit 2520 may include an eighth determination unit and a ninth determination unit. The eighth determination unit may be configured to determine an average of multiple predicted probabilities corresponding to multiple orders. The ninth determination unit may be configured to designate a relative difference between the average and the determined probability as the accuracy of the prediction.

In some embodiments, the actual order snatching determination unit 2510 may include a ranking unit, a first division unit, and a first acquisition unit. The ranking unit may be configured to rank orders ascendingly based on the predicted probabilities. The first division unit may be configured to divide the ranked orders into multiple order groups. The first acquisition unit may be configured to obtain multiple orders from one of the order groups.

In some embodiments, the accuracy determination unit 2520 may include a tenth determination unit and an eleventh determination unit. The tenth determination unit may be configured to determine a predicted probability corresponding to each of the multiple order groups and determine a relative difference between the predicted probability and the corresponding determined probability. The eleventh determination unit may be configured to designate an average of the relative differences as the accuracy of the prediction.

In some embodiments, the accuracy determination unit 2520 may include a twelfth determination unit and a thirteenth determination unit. The twelfth determination unit may be configured to respectively determine a relative difference between a predicted probability and a determined probability corresponding to each of the multiple order groups. The thirteenth determination unit may be configured to designate a root mean square value of the relative differences as the accuracy of the prediction.

In some embodiments, the actual order snatching determination unit 2510 may include a second ranking unit, a second division unit, and a fourteenth determination unit. The second ranking unit may be configured to ascendingly rank spreading orders broadcasted to each user. The spreading orders broadcasted to each user may be ranked based on the predicted probability that each user performs the order snatching operation regarding the spreading orders. The second division unit may be configured to divide the ranked spreading orders into multiple spreading order groups. The fourteenth determination unit may be configured to determine a probability that the corresponding user performs the order snatching operation regarding multiple orders from one of the spreading order groups, according to each of the multiple spreading order groups.

In some embodiments, the accuracy determination unit 2520 may include a fifteenth determination unit and a sixteenth determination unit. The fifteenth determination unit may be configured to determine a relative difference between the predicted probability and the determined probability corresponding to each spreading order group. The sixteenth determination unit may be configured to designate an average of the relative differences as the accuracy of the prediction.

In some embodiments, the accuracy determination unit 2520 may include a seventeenth determination unit and an eighteenth determination unit. The seventeenth determination unit may be configured to determine a relative difference between the predicted probability and the determined probability corresponding to each spreading order group. The eighteenth determination unit may be configured to designate a root mean square value of the relative differences as the accuracy of the prediction.

It should be noted that the above description of the order allocation system 110 in FIG. 25 is merely provided for the purpose of illustration, and not intended to limit the scope of the present disclosure. For persons having ordinary skills in the art, various modifications and variations in form and detail may be conducted under the teaching of the present disclosure. However, those modifications and variations may not depart from the spirit and scope of this disclosure. Modules/units may be combined in various ways or connected with other modules as sub-systems. For example, determination of all actual order snatching rates and accuracy may be conducted in one module. As another example, the eighteen determination units do not imply that there must be eighteen units. A determination unit may perform multiple determination tasks. In some embodiments, a determination task may be assigned to multiple determination units. All such modifications and variations are within the protection scope of the present disclosure.

Figure 26:
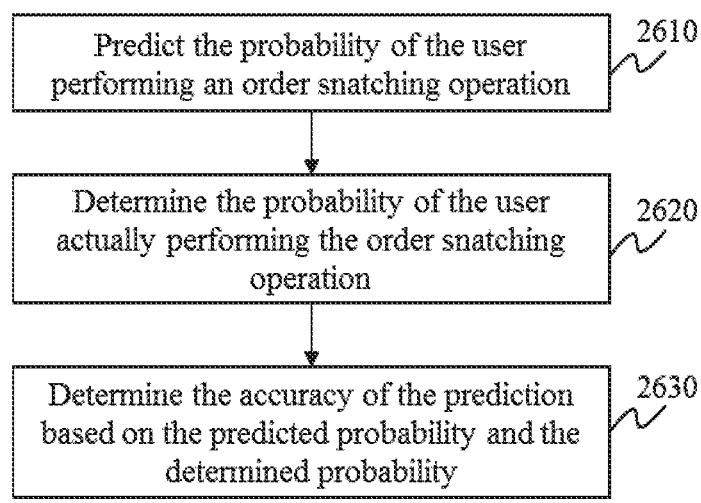
FIG. 26 is a flowchart of an exemplary process for allocating orders according to some embodiments of the present disclosure.

FIG. 26 is a flowchart of an exemplary process for allocating orders according to some embodiments of the present disclosure. The process may include the following steps.

In step 2610, the probability of the user performing an order snatching operation regarding an order may be predicted. For example, the order snatching prediction unit 342 may be configured to predict the probability of the user performing the order snatching operation regarding the order. In some embodiments, the order snatching probability may be predicted by the extracted order features and a preset weighting factor corresponding to the features. Different weighting factors may be allocated to the order features according to the preset prediction method. The weighting factors may be determined by the corresponding features in the historical orders based on the machine learning model.

For convenience, the prediction process may be illustrated below. For example, according to the machine learning model, if the distance between the starting point and the user of the historical order has a higher correlation to the probability of the order snatching operation being performed for the historical order, the greater weighting factor may be allocated to the feature that indicates the distance between the starting point and the user of the order.

In step 2620, the probability of the user performing the order snatching operation regarding an order may be determined. For example, the actual order snatching rate determination unit 2510 may be configured to determine the probability of the user performing the order snatching operation regarding the order. In some embodiments, the times of the order being broadcasted to the user may be determined correspondingly during the process of broadcasting an order to multiple users in the preset scope around. The actual order snatching probability of the user regarding the order may then be determined according to the number of order snatching operations, the times of broadcast, and the number of the order snatching operations performed. For convenience, an example may be illustrated. Merely by way of example, the order may be broadcasted to 100 users in the preset scope around. If the order is broadcasted to the 100 users, the times of broadcast is 100. Meanwhile, if 5 of the 100 users perform the order snatching operation, the number of order snatching operations is 5. The actual order snatching probability of the user regarding the order may then be a ratio of the number of order snatching operations to the times of broadcast, i.e., 5%.

In step 2630, the accuracy of the prediction may be determined based on the predicted probability and the determined probability. For example, the accuracy determination unit 2520 may be configured to determine the accuracy of the prediction according to the predicted probability and the determined probability. Specifically, the relative difference between the predicted probability and the determined probability may be designated as the accuracy of the prediction. For convenience, an example may be illustrated. Merely by way of example, the predicted probability may be 6%, while the determined probability may be 5%. The accuracy of the prediction may be determined according to equation 10:

$$PB=|A-R|/R, \qquad \text{(Equation 10)}$$

wherein PB may indicate the relative difference of the predicted probability and the determined probability, i.e., the accuracy of the prediction, A may be the predicted probability, and R may be the determined probability.

The accuracy of the prediction being determined as the above equation may then be |6%-5%|/5%=0.2.

In some embodiments, the times of multiple orders being broadcasted to multiple users and the number of order snatching operations performed regarding the multiple orders may be determined respectively, during the process of multiple orders being broadcasted to the users in the preset scope around. The actual order snatching probability may then be determined according to the number of order snatching operations and the times of broadcast. For example, if 100 orders are broadcasted to 100 users nearby, the times of broadcast for the 100 orders may be 10000. Meanwhile, for each order of the 100 orders, there may be five users of the 100 users performing the order snatching operations. The number of order snatching operations may then be 500. The actual order snatching probability may be a ratio of the number of the order snatching operations performed to the times of broadcast, i.e., 5%.

In some embodiments, multiple orders may be used as a whole to perform statistics analysis to the times of broadcast and the number of order snatching operations. The actual order snatching probability may be determined according to the times of broadcast and the number of order snatching operations.

In some embodiments, the actual order snatching probability may also be determined by other ways. For example, the actual order snatching probability of the user regarding each order among multiple orders may be determined respectively. The average value of the probabilities may be further determined. For example, 100 orders are sent to 100 users. If the predicted probability of 50 orders thereof is 6%, the predicted probability of the 30 orders thereof may be 5.66%. The predicted probability of other 20 orders thereof may be 5%. The average value of the predicted probabilities of the 100 orders may then be (50×6%+30×5.66%+20×5%)/100=5.7%. The relative difference of the predicted probability (e.g., 5.7%) and the determined probability (e.g., 5%) may be designated as the accuracy of the prediction. The accuracy of the prediction may be determined based on Equation 10, i.e., 0.14.

Figure 27:
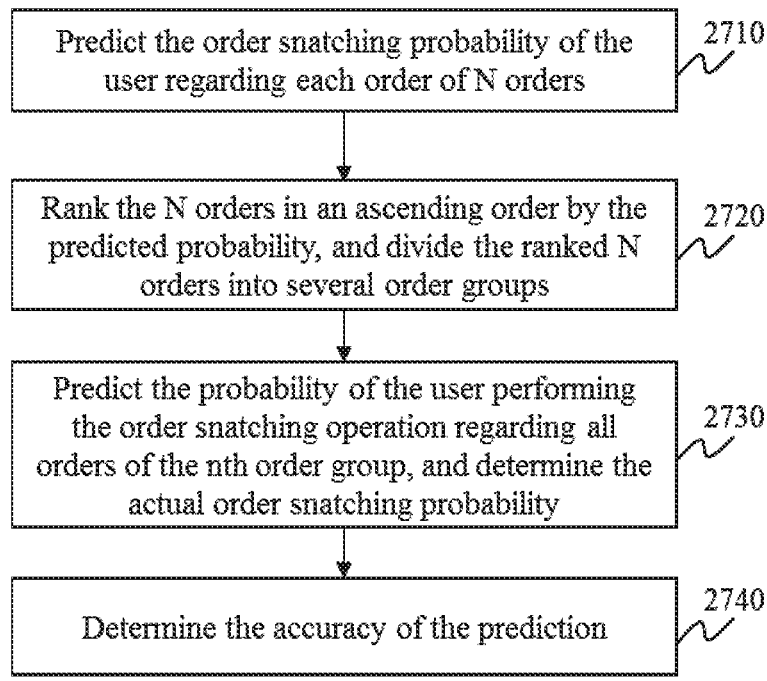
FIG. 27 is a flowchart of an exemplary process for allocating orders according to some embodiments of the present disclosure.

FIG. 27 is a flowchart of an exemplary process for allocating orders according to some embodiments of the present disclosure. The process of order allocation may be illustrated by taking N orders as an example. The process may include the following steps.

In step 2710, the order snatching probability of the user regarding each order of the N orders may be predicted. For example, the order snatching prediction unit 342 may be configured to predict the order snatching probability of the user regarding each order of the N orders. Relevant descriptions of the prediction process may be referred to as illustrated in step 2610.

In step 2720, the N orders may be ranked in ascending order by the predicted probability. The ranked N orders may then be divided into several order groups. Each group may have a larger number of orders, such as k. Each group may be illustrated as follows:

Group 1: $P_1, P_2, P_3, \ldots, P_k$

Group 2: $P_{k+1}, P_{k+2}, P_{k+3}, \ldots, P_{2k}$

...

Group i: $P_{(i-1)k+1}, P_{(i-1)k+2}, P_{(i-1)k+}, \ldots, P_{ik}$ wherein P may indicate the predicted probability of the user performing the order snatching operation regarding the corresponding order.

In step 2730, taking the $n^{th}$ order group as a whole as an example, the probability of the user performing the order snatching operation regarding all orders of the $n^{th}$ order group may be predicted based on Equation 11:

$$A_i = \left(\sum_{j=1}^{k} P_{(i-1)*k+j}\right)/k. \qquad \text{(Equation 11)}$$

The actual order snatching probability of the user regarding all orders in $i^{th}$ order group may be determined based on Equation 12:

$$R_i = Q_i/B_i, \qquad \text{(Equation 12)}$$

wherein $A_i$ may indicate the predicted probability of the user performing the order snatching operation regarding the orders in the $i^{th}$ order group, $R_i$ may indicate the determined probability of the user performing the order snatching operation regarding the orders in the $i^{th}$ order group, $Q_i$ may indicate the number of order snatching operations actually performed by the user regarding the orders in the $i^{th}$ order group, and $B_i$ may indicate the times of the orders in the $i^{th}$ order group being broadcasted to the user.

In step 2740, the accuracy of the prediction may be determined. For example, the accuracy determination unit 2520 may be configured to designate the average value of the probability differences as the accuracy of the prediction according to equation 13 as follows:

$$APB = \left[\sum_{i=1}^{n} (|A_i - R_i|/R_i)\right]/n, \quad \text{(Equation 13)}$$

wherein APB may indicate the average value of the probability differences and further indicates the accuracy of the prediction. $A_i$ may indicate the predicted order snatching probability of the user regarding the orders in the $i^{th}$ order group. $R_i$ may indicate the actual determined order snatching probability of the user regarding the orders in the $i^{th}$ order group. n may indicate the group number of the order groups described above.

In some embodiments, the accuracy of the prediction may also be determined as the root-mean-square-value of the probability difference using equation 14 as follows:

$$APB = \left[\sum_{i=1}^{n} (|A_i - R_i|/R_i)^2 /n\right]^{1/2}, \quad \text{(Equation 14)}$$

wherein the meaning of the corresponding symbols may be referred to as illustrated in the equations described above.

It should be noted that the above description of the order allocation process in FIG. 26 and FIG. 27 is merely provided for the purpose of illustration, and not intended to limit the scope of the present disclosure. For persons having ordinary skills in the art, various modifications and variations in form and detail may be conducted under the teaching of the present disclosure. For example, steps may be integrated in various ways. As another example, the orders may be ranked in a descending sequence or may not be ranked. As still another example, accurate equations are not limited to the equations described above. For those skilled in the art, the equations may be varied or adjusted according to actual needs. All such modifications and variations are within the protection scope of the present disclosure.

Figure 28:
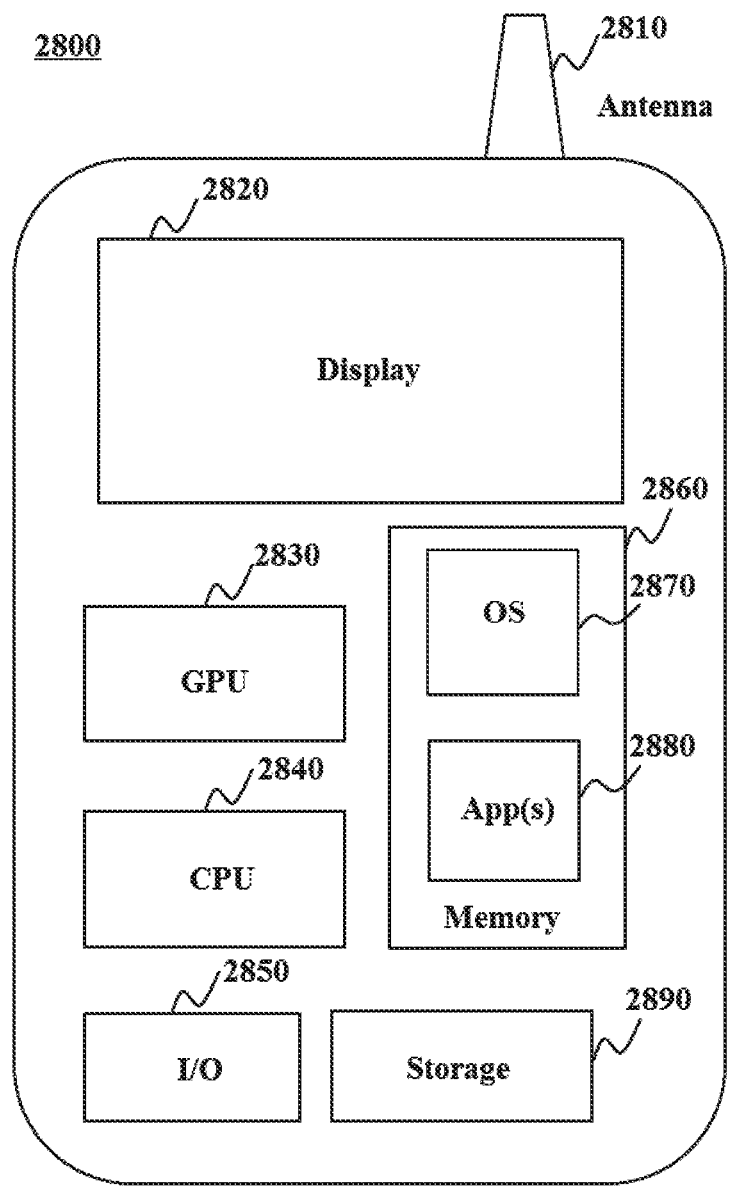
FIG. 28 is a schematic diagram of the structure of a mobile device, which can implement the system according to some embodiments of the present disclosure.

FIG. 28 is a schematic diagram of the structure of a mobile device according to some embodiments of the present disclosure. The mobile device may be used to implement the system disclosed in the present disclosure. In this embodiment, a mobile device 2800 for displaying and interacting with location-related information may include but is not limited to a smartphone, a tablet computer, a music player, a portable gaming machine, a global positioning system (GPS) receiver, a wearable computing device (e.g., eyeglasses, watches, etc.), or other forms that may be found in descriptions elsewhere of the present disclosure. The mobile device 2800 in this embodiment may include one or more central processing units (CPUs) 2840, graphical processing units (GPUs) 2830, a display 2820, a memory 2860, an antenna 2810 (e.g., a wireless communication unit), a storage unit 2890, and one or more input/output (I/O) devices 2850. Any other suitable components such as system buses or controllers (not shown in the figure) may also be included in the mobile device 2800. As shown in FIG. 28, a mobile operating system 2870 (such as iOS, Android, Windows Phone, etc.) and one or more applications 2880 may be loaded into the memory 2860 from the storage unit 2890 and may be executed by the central processing unit 2840. The applications 2880 may include a browser or other mobile applications that are suitable for receiving and processing order information on the mobile device 2800. The interaction of the order information with respect to users may be obtained by the input/output system devices 2850 and may be provided to the order allocation system 110, and/or other components of the system 100, e.g., via the network 150.

In order to implement the different modules, units, and their functions as described in the previous disclosure, a computer hardware platform may be used as a hardware platform (e.g., the order allocation system 110, and/or other components of the system 100 described in FIG. 1-27) for one or more of the elements described above. The hardware elements, operating systems, and programming languages of such computers are common in nature. It is assumed that those skilled in the art are familiar with these techniques and may use the techniques described herein to provide the required information for on-demand services. A computer containing user interface elements may be used as a personal computer (PC) or other types of workstations or terminal devices, and may also be used as servers after being properly programmed. It may be appreciated that those skilled in the art will be familiar with such structures, procedures, and general operations of such computer equipment, and therefore no additional explanation is required for all figures.

Figure 29:
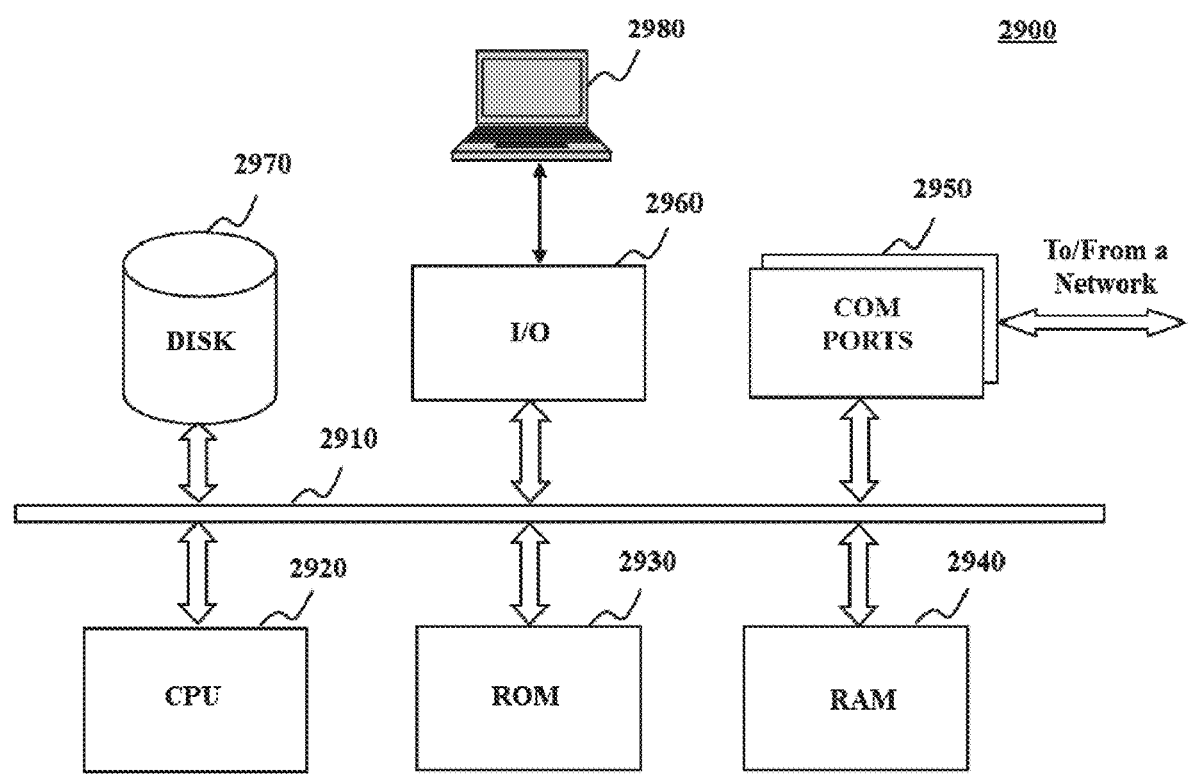
FIG. 29 is a schematic diagram of the architecture of a computer device, which can implement the system according to some embodiments of the present disclosure.

FIG. 29 is a schematic diagram of the architecture of a computer device according to some embodiments of the present disclosure. The computer device may be used to implement the system disclosed in the present disclosure. The system in the present embodiment may use a functional block diagram to explain a hardware platform containing a user interface. The computer may be a general-purpose computer or a specific-purpose computer. Both computers may be configured to implement the system in this embodiment. The computer 2900 may be used to implement any unit of the current order allocation. For example, the order allocation system 110 may be implemented by the computer such as a computer 2900 through its hardware devices, software programs, firmware, or the like, or any combination thereof. For convenience, only one computer is depicted in FIG. 29, but the related computer functions described in this embodiment to provide the required information for the on-demand services may be implemented by a set of similar platforms in a distributed mode, which may decentralize a processing load of the system.

The computer 2900 may include a communication port 2950 that may be connected with a network to implement data communication. The computer 2900 may also include a central processing unit (CPU) that may also include one or more processors to conduct program instructions. The exemplary computer platform may include an internal communication bus 2910, a program storage unit in different forms, and a data storage unit. For example, a hard disk 2970, a read only memory (ROM) 2930, a random-access memory (RAM) 2940, various data files that may be used for computer processing and/or communication, and possible program instructions executed by the CPU. The computer 2900 may also include an input/output component 2960 that supports input/output data streams between the computer and other components (e.g., the user interface 2980). The computer 2900 may also receive programs and data via a communication network.

The different aspects of the order allocation process and/or the method of implementing other steps by programs are described above. The programming part of the technology may be considered to be a "product" or "article of manufacture" in the form of executable code and/or related data, which may participate or may be implemented by a computer-readable medium. A tangible and permanent storage medium may include any computer, any processor, similar devices, or any memories or storages used by related modules. For example, a variety of semiconductor memories, tape drives, disk drives, or similar devices that may provide storage function for a software at any time.

All software or a part thereof may sometimes communicate via a network such as the Internet or other communication networks. Such communications may load the software from one computer device or processor to another. For example, software may be loaded from a management server or a host computer of an on-demand service system to a hardware platform in computer environment, other computer environments that implement the system or a system that provides similar functions relating to the required information for the on-demand service. Thus, another medium of delivering software elements may also be used as a physical connection between local devices, such as light waves, radio waves, electromagnetic waves, etc., which is spread via cables, optic cables, or air. Physical media such as cables, wireless connections, optic cables, which is used to carry the carrier may also be considered as the medium that hosts the software. Unless otherwise limited by tangible "storage" media, other terms that refer to a computer or machine "readable media" may indicate media that participate in the procedure of conducting any instructions by a processor.

Computer-readable media may take many forms that may include but are not limited to tangible storage media, carrier wave media, or physical transmission media. Stable storage media may include optical disks, disks, or storage systems used in other computers or similar devices which are capable of implementing the function of the system components described in the figure. Unstable storage media may include dynamic memory, such as a main memory of a computer platform. Tangible transmission media may include coaxial cables, copper cables, optical fibers, or lines that form a bus within a computer system. The carrier wave transmission media may transmit electrical signals, electromagnetic signals, acoustic signals, or optical wave signals, which may be generated by a radio frequency or infrared data communication method. Common computer-readable media may include hard disks, floppy disks, tapes, or any other magnetic media. Common computer-readable media may include CD-ROMs, DVDs, DVD-ROMs, or any other optical media. Common computer-readable media may include punched cards, or any other physical storage media containing an orifice mode. Common computer-readable media may also include RAMs, PROMs, EPROMs, FLASH-EPROMs, or any other memory chips or magnetic tapes. Common computer-readable media may still include carrier waves or cables which are used to transmit data or instructions, connection equipment which is used to transmit carrier waves, or any other program codes and/or data that may be read by a computer. For the forms of these computer-readable media, multiple forms may occur at the time of processors conducting instructions or delivering one or more results.

It will be understood for those skilled in the art that various modifications and variations may be made to the disclosed contents of this disclosure. For example, the different system components described above are implemented by hardware devices, but may also be implemented only by software solutions, e.g., install the system on an existing server. In addition, the provision of the location information disclosed herein may be achieved by firmware, a combination of firmware/software, a combination of firmware/hardware, or a combination of hardware/firmware/software.

The foregoing describes the present disclosure and/or some embodiments. According to the above-described contents, the present disclosure may also be modified in various ways. The subject matter disclosed herein may be implemented in different forms and examples, and the present disclosure may be applied to a large number of applications. All applications, modifications, and variations as claimed in the following claims are intended to be within the scope of this disclosure.

What is claimed is:

1. A system, comprising:
    at least one storage medium including a set of instructions;
    at least one processor in communication with the at least one storage medium, wherein when executing the set of instructions, the at least one processor is directed to:
    receive first electrical signals encoding order information and user information from a terminal of an order requestor and terminals of order recipients via a network, wherein the user information includes information related to an order requestor and information related to order recipients, wherein the order information and the user information are associated with an order and include at least one of location information or time information, the location information including location of the order requester and location of each of the order recipients determined using positioning technology;
    determine a road distance between the order requester and each of the order recipients according to a traffic map information of an area where the order requester is located, the location of the order requester, and the location of each of the order recipients;
    determine an order snatching probability of each of the order recipients based on the road distance and a pre-established prediction model;
    operate logical circuits in the at least one processor to determine at least one service provider from the order recipients based on the order snatching probability of each of order recipients; and
    send the order information to a terminal of the at least one service provider via the network for displaying on an interface of the terminal of the at least one service provider,
    wherein the pre-established prediction model is generated by:
    obtaining a plurality of historical orders of the user in a preset time period;
    obtaining feature information of each of the plurality of historical orders and historical road distance of each of the plurality of historical orders; and
    determining the pre-established prediction model by training a regression model using the feature information of each of the plurality of historical orders and the historical road distance of each of the plurality of historical orders, wherein the historical road distance is taken as a predictive variable, and order snatching results representing whether the historical orders are snatched or not is taken as a target variable.

2. The system of claim 1, wherein the time information includes at least one of an order spread time or an order snatching time associated with each of the order recipients.

3. The system of claim 1, wherein the location information further includes at least one of a departure location, an original location, a destination, or a geographical region.

4. The system of claim 3, wherein the at least one processor is further directed to:
  operate the logical circuits in the at least one processor to obtain at least one of an order spread region of the order or an order receiving range of each of the order recipients;
  operate the logical circuits in the at least one processor to obtain a number of orders within the order spread region; and
  operate the logical circuits in the at least one processor to obtain an order density based on at least one of the order spread region, the order receiving range, or the number of orders.

5. The system of claim 1, wherein the at least one processor is further directed to:
  operate the logical circuits in the at least one processor to determine an accuracy of the order snatching probability.

6. The system of claim 5, wherein the at least one processor is further directed to:
  operate the logical circuits in the at least one processor to determine an actual order snatching probability of the order recipients for the order; and
  operate the logical circuits in the at least one processor to determine the accuracy of the order snatching probability based on the predicted order snatching probability and the actual order snatching probability of the order recipients.

7. The system of claim 1, wherein the generation of the pre-established prediction model further comprising optimizing the pre-established prediction model using machine learning algorithms according to related feature information of related orders obtained in real time online and related road distance corresponding to the related orders.

8. The system of claim 1, wherein the regression model is a linear regression model.

9. The system of claim 8, wherein the linear regression model includes one of a logistic regression model and a support vector machine model.

10. The system of claim 1, wherein the road distance includes a straight line distance between the order requester and each of the order recipients or an actual vehicle driving distance from each of the order recipients to the order requester.

11. A method implemented on a computing device having at least one processor, at least one computer-readable storage medium, and a communication platform connected to a network, comprising:
  receiving first electrical signals encoding order information and user information from a terminal of an order requestor and terminals of order recipients via a network, wherein the user information includes information related to an order requestor and information related to order recipients, wherein the order information and user information are associated with an order and include at least one of location information or time information, the location information including location of the order requester and location of each of the order recipients using positioning technology;
  determining a road distance between the order requester and each of the order recipients according to a traffic map information of an area where the order requester is located, the location of the order requester, and the location of each of the order recipients;
  determining an order snatching probability of each of the order recipients based on the road distance and a pre-established prediction model;
  operating logical circuits in the at least one processor to determine at least one service provider from the order recipients based on the order snatching probability of each of order recipients; and
  sending the order information to a terminal of the at least one service provider via the network for displaying on an interface of the terminal of the at least one service provider,
  wherein the pre-established prediction model is generated by:
  obtaining a plurality of historical orders of the user in a preset time period;
  obtaining feature information of each of the plurality of historical orders and historical road distance of each of the plurality of historical orders; and
  determining the pre-established prediction model by training a regression model using the feature information of each of the plurality of historical orders and the historical road distance of each of the plurality of historical orders, wherein the historical road distance is taken as a predictive variable, and order snatching results representing whether the historical orders are snatched or not is taken as a target variable.

12. The method of claim 11, wherein the time information includes at least one of an order snatching time of each of the order recipients.

13. The method of claim 11, wherein the location information further includes at least one of a departure location, an original location, a destination, or a geographical region.

14. The method of claim 13, further comprising:
  operating the logical circuits in the at least one processor to obtain at least one of an order spread region of the order or an order receiving range of each of the order recipients, and a number of orders;
  operating the logical circuits in the at least one processor to obtain an order density based on at least one of the order spread region or the order receiving range, and the number of orders; and
  operating the logical circuits in the at least one processor to determine the at least one service provider based on the order density.

15. The method of claim 11, further comprising:
  operating the logical circuits in the at least one processor to determine an accuracy of the order snatching probability.

16. The method of claim 15, further comprising:
  operating the logical circuits in the at least one processor to obtain a predicted order snatching probability of the order recipients for the order;
  operating the logical circuits in the at least one processor to determine an actual order snatching probability of the order recipients for the order; and
  operating the logical circuits in the at least one processor to determine the accuracy of the order snatching probability based on the predicted order snatching probability and the actual order snatching probability of the order recipients.

\* \* \* \* \*